United States Patent
Rassaf et al.

(10) Patent No.: US 12,540,166 B2
(45) Date of Patent: Feb. 3, 2026

(54) BNIP3 PEPTIDES FOR TREATMENT OF REPERFUSION INJURY

(71) Applicant: Bimyo GmbH, Monheim (DE)

(72) Inventors: Tienush Rassaf, Essen (DE); Ulrike Hendgen-Cotta, Dinslaken (DE)

(73) Assignee: Bimyo GmbH, Monheim (DE)

( * ) Notice: Subject to any disclaimer, the term of this patent is extended or adjusted under 35 U.S.C. 154(b) by 831 days.

(21) Appl. No.: 17/608,655

(22) PCT Filed: May 8, 2020

(86) PCT No.: PCT/EP2020/062926
§ 371 (c)(1),
(2) Date: Nov. 3, 2021

(87) PCT Pub. No.: WO2020/229362
PCT Pub. Date: Nov. 19, 2020

(65) Prior Publication Data
US 2022/0220174 A1    Jul. 14, 2022

(30) Foreign Application Priority Data
May 10, 2019 (EP) .................................... 19173715

(51) Int. Cl.
| | | |
|---|---|---|
| C07K 14/47 | (2006.01) | |
| A61K 38/00 | (2006.01) | |
| A61P 9/10 | (2006.01) | |
| G01N 33/543 | (2006.01) | |
| G01N 33/68 | (2006.01) | |

(52) U.S. Cl.
CPC ............ C07K 14/4747 (2013.01); A61P 9/10 (2018.01); G01N 33/54306 (2013.01); G01N 33/6872 (2013.01); *A61K 38/00* (2013.01)

(58) Field of Classification Search
CPC ... C07K 14/4747; C07K 2319/10; A61P 9/10; G01N 33/6872
See application file for complete search history.

(56) References Cited

U.S. PATENT DOCUMENTS

| | | | | |
|---|---|---|---|---|
| 7,393,637 B2 * | 7/2008 | Gibson | ............ | G01N 33/57496 435/7.1 |
| 7,745,391 B2 * | 6/2010 | Mintz | ..................... | A61P 37/00 514/19.3 |
| 2004/0152650 A1 * | 8/2004 | Webster | .............. | C07K 14/4747 435/375 |

FOREIGN PATENT DOCUMENTS

| | | |
|---|---|---|
| WO | 02-02743 A2 | 1/2002 |
| WO | 2004/009780 A2 | 1/2004 |

OTHER PUBLICATIONS

Anonymous, Retro inverso peptides Byosin, Jun. 1, 2014, 1 page.
Arai, M. et al., "An anti-CD18 antibody limits infarct size and preserves left ventricular function in dogs with ischemia and 48-hour reperfusion," J Am Coll Cardiol, vol. 27(5): 1278-1285 (1996).
Argaud, L. et al., "Specific inhibition of the mitochondrial permeability transition prevents lethal reperfusion injury," J Mol Cell Cardiol, vol. 38(2):367-374 (2005).
Atar , D. et al., "Effect of intravenous TRO40303 as an adjunct to primary percutaneous coronary intervention for acute ST-elevation myocardial infarction: MITOCARE study results," Eur Heart J, vol. 36(2):112-119 (2015).
Baines, C. "The cardiac mitochondrion: Nexus of stress Annu Rev Physiol," vol. 72: 61-80 (2010).
Baines, C. et al., "Voltage-dependent anion channels are dispensable for mitochondrial-dependent cell death," Nat Cell Biol, vol. 9(5): 550-555 (2007).
Basso, E. et al., "Properties of the permeability transition pore in mitochondria devoid of cyclophilin D ," J Biol Chem, vol. 280(19):18558-18561 (2005).
Bonora, M. et al., "Role of the c subunit of the F0ATP synthase in mitochondrial permeability transition," Cell Cycle, vol. 12(4):674-683 (2013).
Cahill, T. et al., "Heart failure after myocardial infarction in the era of primary percutaneous coronary intervention: Mechanisms, incidence and identification o patients at risk," World J Cardiol, vol. 9:407-415 (2017).
Chaanine, A. et al., "FOXO3a regulates BNIP3 and modulates mitochondrial calcium, dynamics, and function in cardiac stress," Am J Physiol Heart Circ Physiol, vol. 311(6):H1540-H1559 (2016).
Chaanine, A. et al., "Potential role of BNIP3 in cardiac remodeling, myocardial stiffness, and endoplasmic reticulum: Mitochondrial calcium homeostasis in diastolic and systolic heart failure," Circ Heart Fail, vol. 6:572-583 (2013).
Chi, L.G. et al., "Effect of superoxide disimutase on myocardial infarct size in the canine heart after 6 hours of regional ischemia and reperfusion: A demonstration of myocardial salvage," Circ Res, vol. 64(4): 665-675 (1989).
Christia, P. et al., Targeting inflammatory pathways iin myocardial infarction, Eur J Clin Invest, vol. 43: 986-995 (2013).
Cung, T-T., et al., "Cyclosporine before PCI in patients with acute myocardial infarction," N Engl J Med, vol. 373(11):1021-1031 (2015).
Diwan, A. et al., "Inhibition of ischemic cardiomyocyte apoptosis through targeted ablation of Bnip3 restrains postinfarction remodeling in mice," J Clin Invest, vol. 117(10):2825-2833(2007).
Dominguez, C. et al., "Haddock: A protein-protein docking approach based on biochemical or biophysical Information," J Am Chem Soc, vol. 125(7): 1731-1737 (2003).

(Continued)

*Primary Examiner* — Julie Ha
*Assistant Examiner* — Kristina M Hellman
(74) *Attorney, Agent, or Firm* — Garrett H. Anderson

(57) ABSTRACT

The invention provides peptides capable of inhibiting the individual activity and inter-pathway communication of BNIP3, BAX and mitochondria. The peptides can be used in methods of treating a disease or condition in a subject in which it is desirable to prevent cell damage and cell death.

18 Claims, 21 Drawing Sheets

Specification includes a Sequence Listing.

(56) References Cited

OTHER PUBLICATIONS

Gibson, C-M., et al., "Embrace STEMI study: A phase 2a trial to evaluate the safety, tolerability, and efficacy of Intravenous MTP-131 on reperfusion injury in patients undergoing primary percutaneous coronary intervention," Eur Heart J, vol. 37(16):1296-1303 (2016).
Giorgio, V. et al., "Dimers of mitochondrial ATP synthase form the permeability transition pore," Proc Natl Acad Sci, vol. 110(15):5887-5892 (2013).
Gottlieb, R., "Cell death pathways in acute ischemia/reperfusion injury," J Cardiovasc Pharmacol, vol. 16(3-4): 233-238 (2011).
Hamacher-Brady, A. et al., "Response to myocardial ischemia/reperfusion injury involves Bnip3 and autophagy," Cell Death Differ, vol. 14(1):146-157 (2007).
Hausenloy, D. et al., "Myocardial ischemia-reperfusion injury: a neglected therapeutic target," J Clin Invest, vol. 123(1): 92-100 (2013).
Hendgen-Cotta, U. et al., "Cytosolic BNIP3 dimer interacts with mitochondrial BAX forming heterodimers in the mitochondrial outer membrane under basal conditions," Int J Mol Sci, vol. 18(4): 687 (2017).
Hendgen-Cotta, U. et al., "Nitrite reductase activity of myoglobin regulates respiration and cellular viability in myocardial ischemia-reperfusion injury," Proc Natl Acad Sci, vol. 105(29): 10256-10261 (2008).
Hochhauser, E. et al., "Bax ablation protects against myocardial ischemia-reperfusion injury in transgenic mice," Am J Physiol Heart Circ Physiol, vol. 284(6):H2351-9 (2003).
Hou, Q. et al., "Bax translocates from cytosol to mitochondria in cardiac cells during apoptosis, Development of a GFP-Bax-stable H9c2 cell line for apoptosis analysis," Am J Physiol heart Circ Physiol, vol. 289(1):H477-H487 (2005).
Kokoszka, J. et al., "The ADP/ATP translocator is not essential for the mitochondrial permeability transition pore," Nature, vol. 427(6973): 461-465 (2004).
Kubli, D. et al., "Bnip3 functions as a mitochondrial sensor of oxidative stress during myocardial ischemia and reperfusion," AmJP Hear Circ Physiol, vol. 295(5):H2025-H2031 (2008).
Kubli, D. et al., "Bnip3 mediates mitochondrial dysfunction and cell death through Bax and Bak," Biochem J, vol. 405 (3):407-415(2007).
Kwong, J.Q. et al., "Genetic deletion of the mitochondrial phosphate carrier desensitizes the mitochondrial permeability transition pore and causes cardiomyopathy," Cell Death Differ, vol. 21(8):1209-1217 (2014).
Luedike, P. et al., "Cardioprotection through S-nitros(yl)ation of macrophage migration inhibitory factor," Circulation, vol. 125: 1880-1889 (2012).
Oberst, A.et al., "Living with death: The evolution of the mitochondrial pathway of apoptosis in animals," Cell Death Differ, vol. 15(7):1139-1146 (2008).
Ong, S. et al., "The mitochondrial permeability transition pore and its role in myocardial ischemia reperfusion injury," J Mol Cell Cardiol, vol. 78: 23-34 (2015).
Ow, Y-L. et al., "Cytochrome c: Functions beyond respiration," Nat Rev Mol Cell Biol, vol. 9(7):532-542 (2008).
Phillips, J. et al., "Scalable molecular dynamics with NAMD," J Comput Chem, vol. 26:1781-1802 (2005).
Rassaf, T. et al., "Nitrite reductase function of deoxymyoglobin: Oxygen sensor and regulator of cardiac energetics and function," Circ Res, vol. 100(12):1749-1754 (2007).
Ray, R. et al., "BNIP3 heterodimerizes with Bcl-2/Bcl-X(L) and induces cell death independent of a Bcl-2 homology 3 (BH3) domain at both mitochondrial and nonmitochondrial sites," J Biol Chem, vol. 275(2):1439-1448 (2000).

Rupprecht, H. et al., "Cardioprotective effects of the Na(+)/H(+) exchange inhibitor cariporide in patients with acute anterior myocardial infarction undergoing direct PTCA," Circulation vol. 101(25): 2902-2908 (2000).
Sali et al., Comparative protein modelling by satisfaction of spatial restrains J Mol Biol, vol. 234: pp. 779-815, 1993.
Schaller, S. et al., "TRO40303, a new cardioprotective compound, inhibits mitochondrial permeability transition," J Pharmacol Exp Ther, vol. 333(3): 696-706 (2010).
Shoji-Kawata, S. et al., Identification of a candidate therapeutic autophagy-inducing peptide, Nature, vol. 494 (7436):201-206 (2013).
Skyschally, A. et al., "Cyclosporine A at reperfusion reduces infarct size in pigs," Cardiovasc Drugs Ther, vol. 24 (1):85-87 (2010).
Szeto, H., "First-class in cardiolipin-protective compound as a therapeutic agent to restore mitochondrial bioenergetics," Br J Pharmacol, vol. 171(8):2029-2050 (2014).
Totzeck, M. et al., "Nitrite regulates hypoxic vasodilation via myoglobin-dependent nitric oxide generation," Circulation, vol. 126(3): 325-334 (2012).
Trott, O. et al., "AutoDock Vina: Improving the speed and accuracy of docking with a new scoring function, efficient optimization, and multithreading," J Comput Chem, vol. 31(2): 455-461 (2010).
Van den Berg et al., Protein transduction domain delivery of therapeutic macromolecules Curr Opin Biotechnol, vol. 22: pp. 888-893, 2011.
Wei, M.C. et al., "Proapoptotic BAX and BAK: A requisite gateway to mitochondrial dysfunction and death," Science, vol. 292(5517):727-730 (2001).
Whelan, R. et al., "Bax regulates primary necrosis through mitochondrial dynamics," Proc Natl Acad Sci, vol. 109(17): 6566-6571 (2012).
Williams, F. et al., "Effect of duration of ischaemia on reduction of myocardial infarct size by inhibition of neutrophil accumulation using an anti CD18 monoclonal antibody," Br J Pharmacol, vol. 111(4):1123-1128 (1994).
Wolter, K.G. et al., "Movement of Bax from the cytosol in mitochondria during apoptosis," J Cell Biol, vol. 139(5):1281-1292 (1997).
Yellon, D. et al., "Myocardial reperfusion injury," N Engl J Med, vol. 357(1):1121-1135 (2007).
Witkowski A. et al., "Conversion of a beta-KetoacylSynthase to a Malonyl Decarboxylase by Replacement of the Active-Site Cysteine with Glutamine," Biochemistry, vol. 38: 11643-11650 (1999).
Zhang, J. et al., "Role of BNIP3 and NIX in cell death, autophagy, and mitophagy," Cell Death Differ., vol. 16(7): 939-946 (2009).
Zhu, Y. et al., "Modulation of Serines 17 and 24 in the LC3-interacting Region of Bnip3 Determines Pro-survival Mitophagy versus Apoptosis," The Journal of Biological Chemistry, vol. 288(2):1099-1113 (2013).
Tang et al., A stabilized retro-inverso peptide ligand of transferrin receptor for enhanced liposome-based hepatocellular carcinoma-targeted drug delivery, Acta Biomaterialia 83 (2019) 379-389, https://doi.org/10.1016/j.actbio.2018.11.002.
Avila, Samuel Monica, et al., Carvedilol for Prevention of Chemotherapy-Related Cardiotoxicity, JACC vol. 71, No. 20, May 22, 2018, 10 pages.
Canty, Jr. John M., Coronary Blood Flow and Myocardial Ischemia, Chapter 52, Braunwald's Heart Disease; A Textbook of Cardiovascular Medicine, 2019, 27 pages.
Ernst Edzard, Complementary and Alternative Approaches to Management of Patients with Heart Disease, Chapter 51, Braunwald's Heart Disease; A textbook of Cardiovascular Medicine, 6 pages.
Gulati, Getta et al., Prevention of cardiac dysfunction during adjuvant breast cancer therapy (PRADA): a 2 3 2 factorial, randomized, placebo-controlled, double-blind clinical trial of candesartan and metoprolol, European Heart Journal (2016) 37, 1671-1680.
Pituskin, Edith et al., Multidisciplinary Approach to Novel Therapies in Cardio-Oncology Research (Manticore 101-Breast): A Randomized Trial for the Prevention of Trastuzumab-Associated Cardiotoxicity, Journal of Clinical Oncology, vol. 35 No. 8; Mar. 10, 2017, 10 pages.

* cited by examiner

A

Vehicle / TAT-BNIP3

B

C

Figure 3 - continued
D
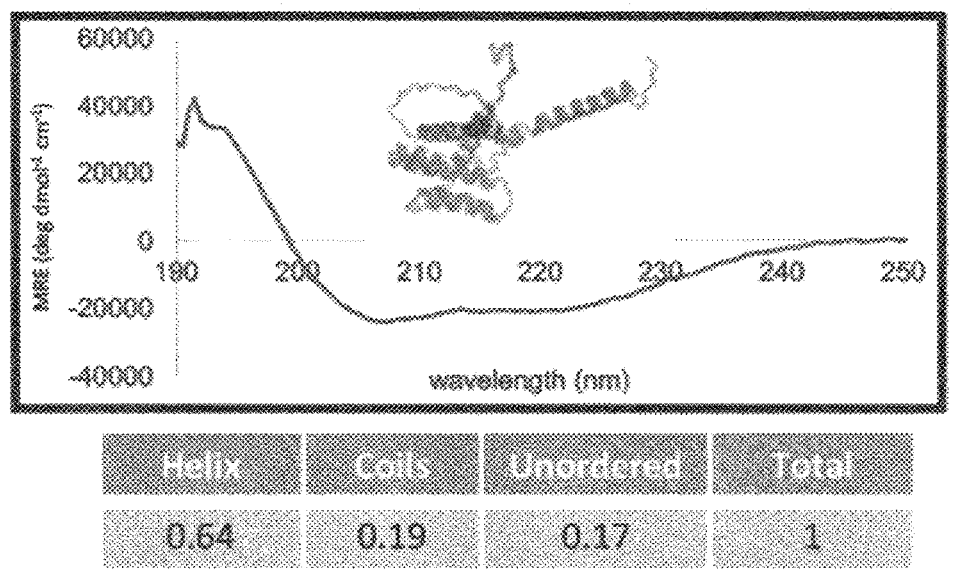
| Helix | Coils | Unordered | Total |
|---|---|---|---|
| 0.64 | 0.19 | 0.17 | 1 |
E
BAX: WGRVVALFYFASKLVLKALC (107-126)
BNIP3: MSQSGEENLQGSWVELHFSN (1-20)
VFELIRTIMGWTLDFLRERL (129)
MSQSGEENLQGSWVELHFSN (1-20)
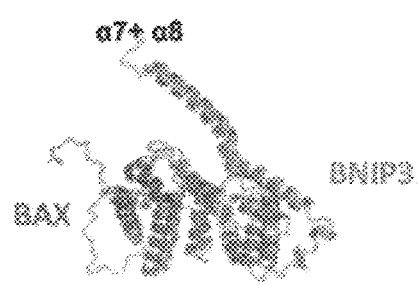
RLLVWIQDQGGWEGLLSYFG (147-166)
MSQSGEENLQGSWVELHFSN (1-20)

Figure 3 - continued
F
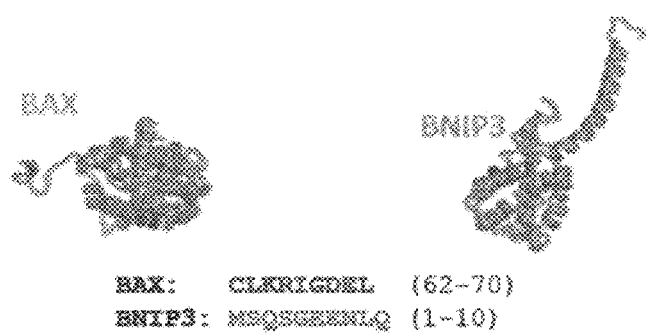
BAX: CLKRIGDEL (62-70)
BNIP3: MSQSGEERLQ (1-10)
G
TAT structure - GRKKRRQRRRPQ
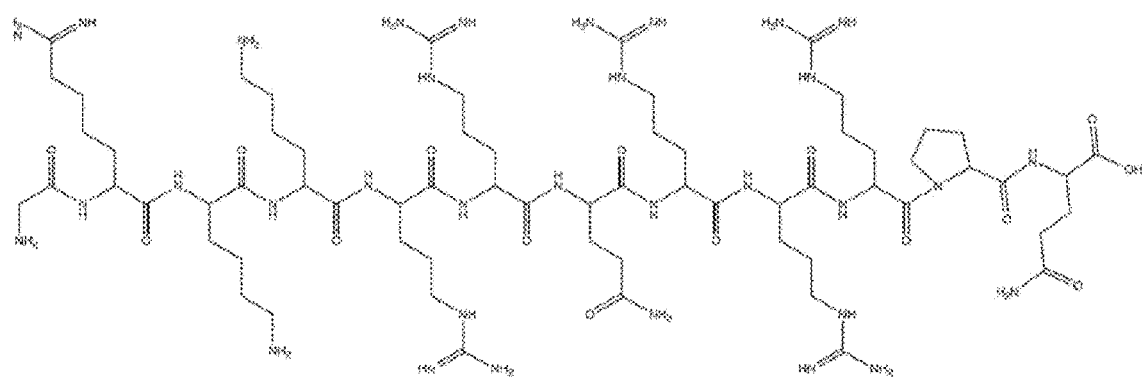

Figure 3 - continued
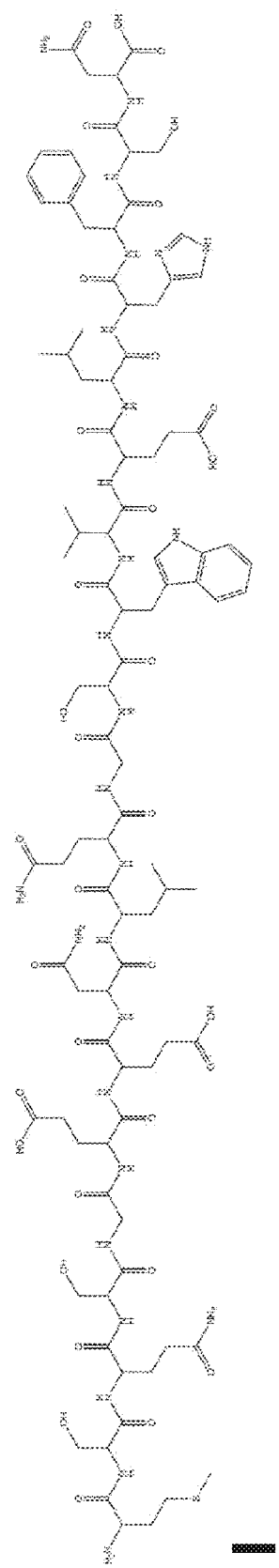
H  BNIP3-20A structure - MSQSGEENLQGSWVELHFSN
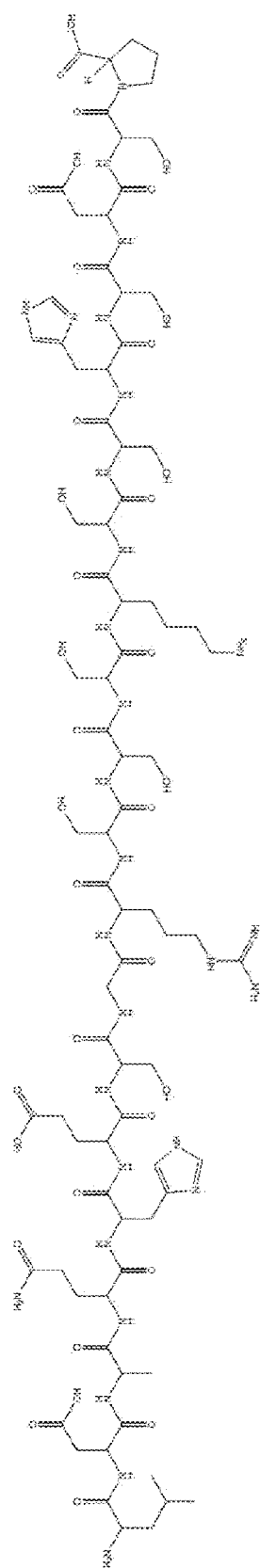
I  BNIP3-20C structure - LDAQHESGRSSSKSSHCDSP Figure 3 - continued
J
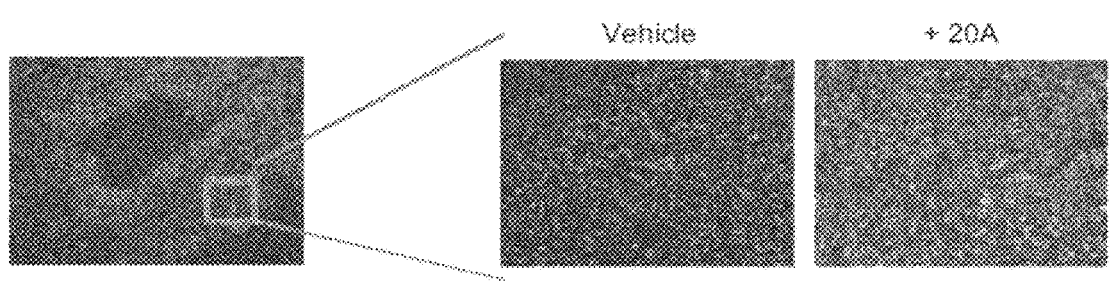
K
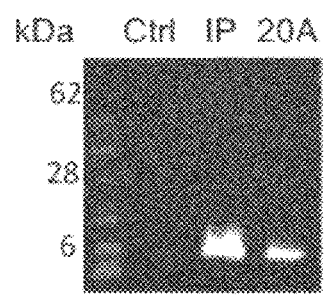

A

B

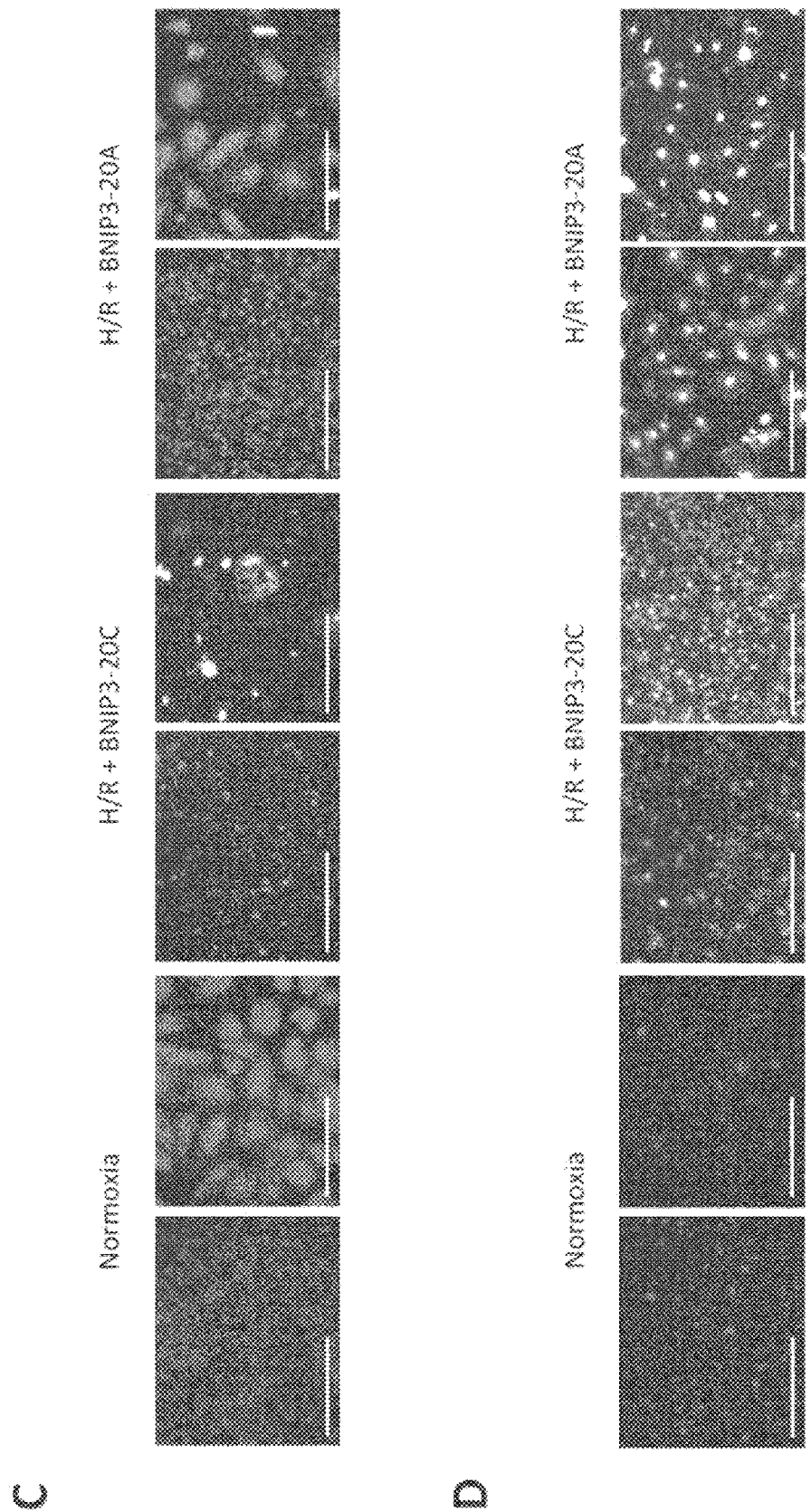
Figure 5 - continued

A BNIP3-8B structure - WVELHFFN

B BNIP3-8C structure - WVELAASN

C

| Helix | Strands | Turns | Unordered | Total |
|---|---|---|---|---|
| 0.06 | 0.35 | 0.23 | 0.36 | 1 |

A

I/R$_{10}$ + BNIP3-8B
total = 100 %

B

A

Serum

B

Plasma

C

Whole blood

Figure 9 - continued
D
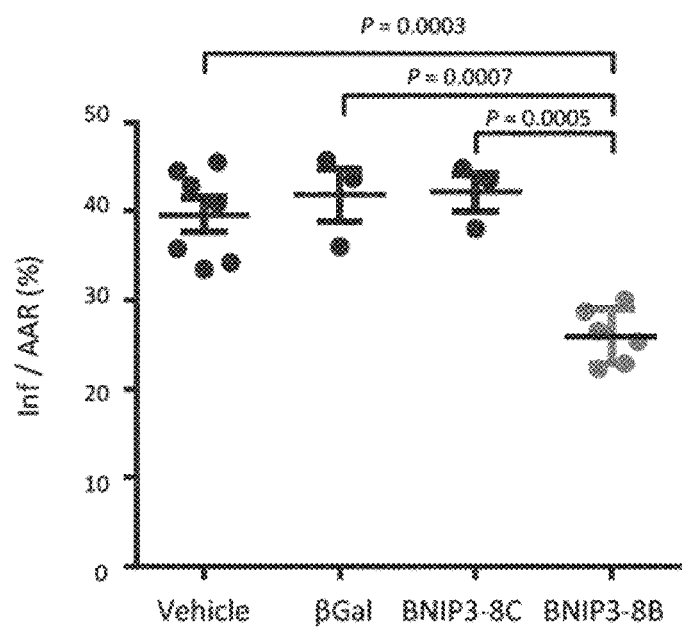
E
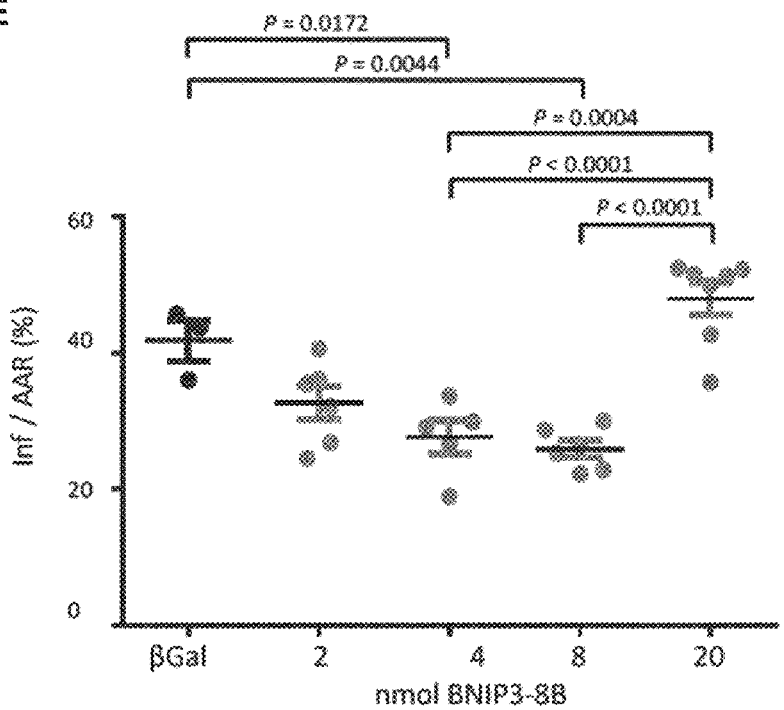

A

B

Figure 10 – continued
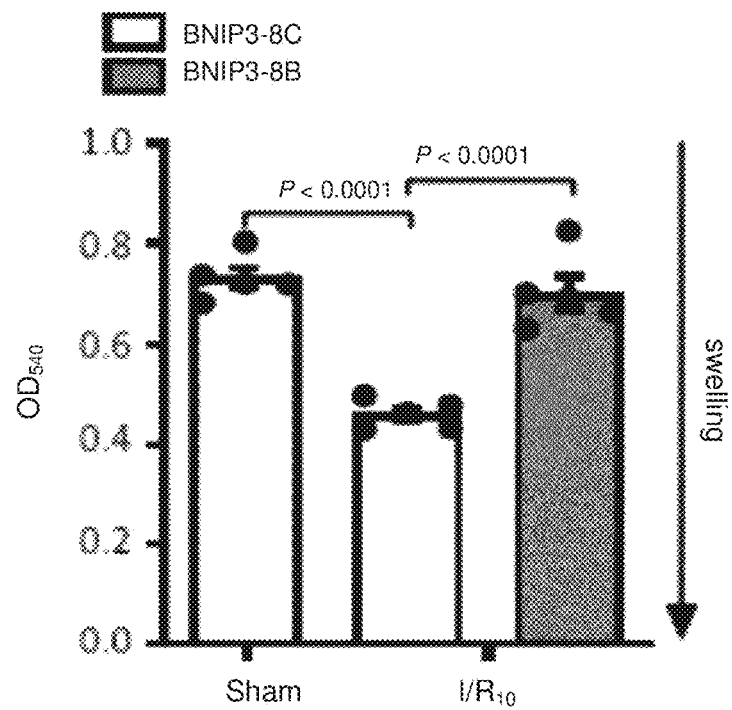
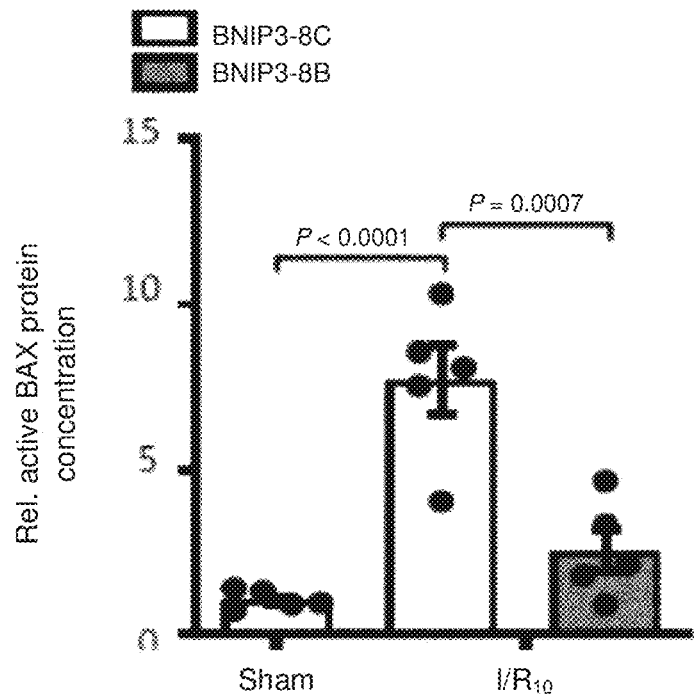

Figure 10 – continued
E
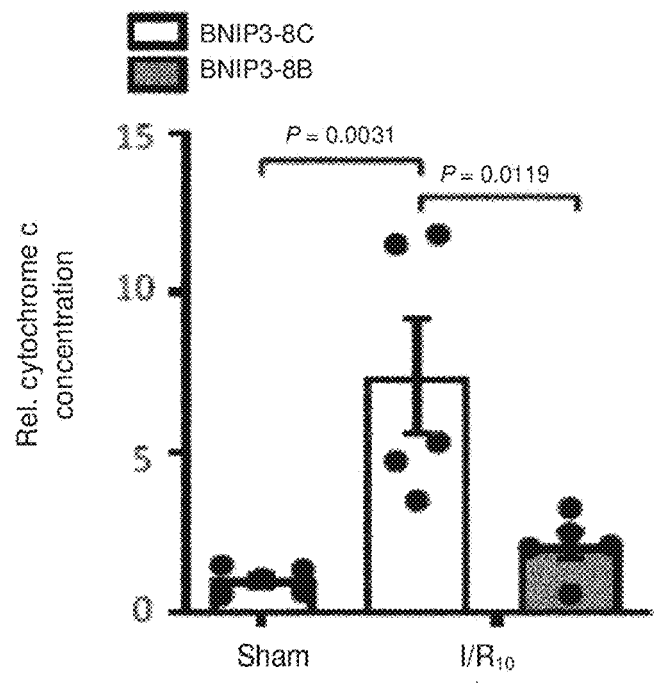
F
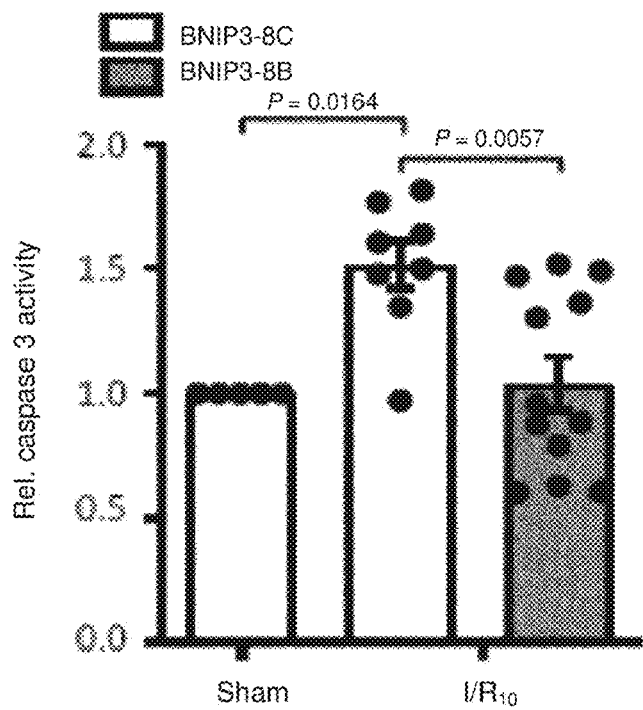

A

B

C

BNIP3 PEPTIDES FOR TREATMENT OF REPERFUSION INJURY

RELATED INFORMATION PARAGRAPH

This application is a 35 U.S.C. 371 national stage filing of International Application No. PCT/EP2020/062926, filed on May 8, 2020, which claims the benefit of the priority date of European Application No. 19173715.4, filed on May 10, 2019, the content of which is hereby incorporated by reference in its entirety.

SEQUENCE LISTING

The instant application contains a Sequence Listing which has been submitted electronically in ASCII format and is hereby incorporated by reference in its entirety. Said ASCII copy, created on Jul. 16, 2024, is named KNJ-056US_SL and is 29,899 bytes in size.

FIELD OF THE INVENTION

The present invention is directed to the treatment of reperfusion injury. IN particular, the present invention provides BNIP3-derived peptides which prevent cell damage and cell death by reducing the activity of BNIP3 and BAX at the mitochondria.

BACKGROUND OF THE INVENTION

The occlusion of a vessel causes cessation of blood to part of the tissue, which leads in particular to insufficient oxygen supply, reduced availability of nutrients and inadequate removal of metabolic waste wreaking havoc on cells with subsequent deaths of cells. Whereas the acute occlusion is not predictable or avoidable, the restoration of vessel patency is feasible and essential for the outcome of the patients[1]. A timely reperfusion regimen is the recommended therapy but the rapid restoration of blood and particularly $O_2$ supply imposes injury upon the tissue with no current treatment available. The early phase of reperfusion is characterized by a high level of oxygen leading to hyperoxic conditions, a burst of reactive oxygen species and an increased calcium level without acidosis. The pathology of reperfusion injury has been recognized in the heart, brain, liver, and kidney and is associated with serious clinical manifestations, including myocardial hibernation, acute heart failure, cerebral dysfunction, gastrointestinal dysfunction, renal dysfunction, systemic inflammatory response syndrome, and multiple organ dysfunction syndrome. Therefore, reperfusion injury is a critical medical condition that poses an important therapeutic challenge. Myocardial infarction (MI) is a sudden, temporally unpredictable event in which reperfusion is essential for survival, but determines up to 50% of the final infarct size[2]. This fate also applies to transplanted organs. MI is the most common cause of heart failure cases, therefore therapeutic interventions to reduce reperfusion injury present an opportunity to salvage viable myocardium, limit MI size, preserve heart function and impact the incidence of heart failure[3]. In the reperfusion-induced infarct progression two forms of cell death, namely necrosis and apoptosis, play an essential role. A predomination of necrotic cardiomyocyte death could be observed in the initial infarct area. Necrosis induces downstream tissue responses such as inflammation, matrix remodeling, and later fibrosis[4]. Apoptosis occur in the infarct and the peri-infarct area and is a major component of early post-infarct remodeling[5].

Cardiac damage is also a critical issue for cancer patients. Due to advances in screening and treatment strategies, the population of cancer survivors has steadily grown over the last three decades. Overall 5-year survival improved to 50-70% for ten year follow-ups. As a result, there is a growing prevalence of cancer therapy side effects, notably cardiovascular toxicity. Conventional chemotherapy (e.g. anthracyclines) are commonly used therapies for many cancer that have been widely recognized as contributors to asymptomatic and symptomatic declines in left ventricular ejection fraction (LVEF), cardiomyopathy, and heart failure (HF). Cancer-mediated cardiomyopathy is characterized by a dose-dependent decrease in LV systolic function mediated by reactive oxygen species (ROS) that is typically irreversible. Currently, neither approaches to prevent nor therapies exists to effectively reduce cardiotoxic side effects (for example reduction in heart function, cardiomyopathy etc.) in patients undergoing anthracyline chemotherapy or other cancer therapies. Several studies aimed to address this medical need but revealed only partial results/benefits. The CECCY trial failed to show a benefit of carvedilol in breast cancer patients, however, protection by reduction of troponin was shown[6]. The PRADA trial assessed candesartan and metoprolol and revealed a significant benefit for candesartan for the prevention of cardiomyopathy, despite the study being not sufficiently powered according to the current definition of cardiotoxicity[7]. The primary outcome of the MANTICORE trial was change in left ventricular diameter. Neither beta-blocker nor ACE-inhibitor had a significant impact on this outcome measure, but significantly prevented heart failure as secondary outcome[8]. Taken together, while existing literature points towards a potential benefit of heart failure therapy, currently no study has in depth evaluated the value of state-of-the-art heart failure therapy as defined by current guidelines in the prevention of cardiotoxicity in cancer patients.

Mitochondria are central to both necrotic and apoptotic signalling[9]. These include disruption of electron transport, oxidative phosphorylation, and ATP synthesis, DNA fragmentation, protein and lipid damage, and the excessive generation of ROS.

The defining event of necrosis at the mitochondria is the opening of a pore in the mitochondrial inner membrane (MIM), the so-called mitochondrial permeability transition pore (mPTP). This creates an energetic collapse and rapid exchange of solutes with an influx of osmolytes into the mitochondria. The subsequent swelling of the matrix leads to rupture of the mitochondrial outer membrane, cellular swelling and cell disruption[10]. Necrotic stimuli, such as $Ca^{2+}$, are suggested to trigger opening of the mPTP and can be potentiated by ROS[10]. Despite extensive investigation, the components of the mPTP remain unknown, with transgenic animal studies excluding several putative components including the adenine nucleotide translocase[11], the voltage-dependent anion channel[12], the mitochondrial phosphate carrier[13] (SLC25A3), and cyclophilin D[14]. Most recently, the c-subunit of the ATP synthase has been suggested to form the pore in the inner membrane[15,16]. Preventing mPTP opening using pharmacological inhibitors such as cyclosporine A has been reported to reduce infarct size in pre-clinical models of I/R injury[17,18]. In larger clinical trials, its effect was neutral[19]. The mitochondria-targeting peptide, elamipretide (formerly called Bendavia or MTP-131) as well as the mitochondrial targeting drug, TRO40303, have been demonstrated in animal studies to reduce infarct size by attenuating the production of mitochondrial-derived ROS when administered at the onset of reperfusion[20-22]. However, in STEMI patient studies intravenous elamipretide[20] as well as TRO40303, both administered prior to PPCI, failed to reduce infarct size[23]. Notably, more adverse events were reported in patients receiving TRO40303 when compared with the placebo arm, thereby limiting the clinical application of this therapeutic approach. Equally futile appeared $Na^+/H^+$ exchange inhibitors[24], antioxidants such as superoxide dismutase[25], and various anti-neutrophil antibodies[26,27].

Apoptotic cell death occurring in the infarct and peri-infarct area is initiated by mitochondrial outer membrane (MOM) permeabilization enabling the release of pro-apoptotic proteins, such as cytochrome c, apoptosis inducing factor, SMAC/DIABLO (Second Mitochondria-derived Activator of Caspases/Direct IAP Binding Protein with Low PI), and endonuclease G from the intermembrane space into the cytosol leading to the onset of cell death cascades via caspases and DNA fragmentation[28-30].

The pro-death BCL-2 proteins BNIP3 (BCL-2 adenovirus E1B 19 kDa interacting protein-3) and BAX (BCL-2 associated X protein) induce MOM permeabilization and represent mediator and down-stream effector of mitochondrial apoptosis by translocation into the MOM and forming heterodimers[31-35]. In addition, BNIP3 and BAX regulate perturbation of the MIM, thereby functioning as crucial activators of necrosis[5,36].

The present invention addresses the need for an optimal amelioration of both the acute injury in the central infarct zone and the subsequent cell death in immediately surrounding areas by providing an inhibitor of BNIP3 and BAX interaction activity, which interrupts the intra- and inter-pathway communication between BNIP3, BAX and mitochondria as individuals or triangle to treat reperfusion injury in heart, brain, liver and kidney and other indications in which the perturbation of mitochondria leads to cell damage and cell death, such as, for example heart failure, organ transplantation, cardiac arrest or due to surgical and pharmacological intervention as well as stroke-, cancer- and cancer therapy-induced cardiac damage.

SUMMARY OF THE INVENTION

The present invention provides peptides which bind to BNIP3 and BAX as monomers as well as to their homo- and hetero-oligomers representing a broad-spectrum activity by circumventing individual activities and oligomer activities. The efficacy is not restricted to an organ or a species, as evidenced by protecting heart and brain tissue as well as human ventricular cardiomyocytes derived from human induced pluripotent stem cells against reperfusion injury. Myocardial infarct size was also markedly reduced in swine.

The peptides are derived from the N-terminal portion of BNIP3 and an 8 amino acid stretch consisting of amino acids 13 to 20 of BNIP3 proofed to be most active. It was highly surprising that such a short peptide was able to inhibit BNIP3 and BAX activities, block formation of homo- and hetero-oligomerization of these proteins, and induce conformational changes in these homo- and hetero-oligomer within the cell. Certain mutations in the peptide sequence even enhanced its efficacy.

In view of these results, the present invention provides in a first aspect a peptide comprising
(i) a cellular uptake signal; and
(ii) a BNIP3 fragment comprising positions 13 to 20 of BNIP3 or an amino acid sequence derived therefrom.

The peptide especially has a length of 50, in particular 40, amino acids or less.

In a second aspect, the present invention provides a pharmaceutical composition comprising the peptide according to the first aspect and its use in the treatment of reperfusion-related and/or mitochondria-related disorders, as well as cancer therapy-induced cardiotoxicity and prevention of such.

In a third aspect, the invention provides a method for preventing cell damage or cell death, comprising contacting the cell with the peptide according to the first aspect.

The invention is further directed in a fourth aspect to a method of screening for a compound suitable for prevention of reperfusion injury and/or mitochondria-related disorders and/or cancer therapy-induced cardiotoxicity, comprising
(i) providing one or more candidate compounds;
(ii) determining the ability of the candidate compounds to interfere with the binding of BNIP3 and BAX;
(iii) selecting those candidate compounds which interfere with the binding of BNIP3 and BAX.

Other objects, features, advantages and aspects of the present invention will become apparent to those skilled in the art from the following description and appended claims. It should be understood, however, that the following description, appended claims, and specific examples, which indicate preferred embodiments of the application, are given by way of illustration only. Various changes and modifications within the spirit and scope of the disclosed invention will become readily apparent to those skilled in the art from reading the following.

DETAILED DESCRIPTION OF THE INVENTION

Figure 1:
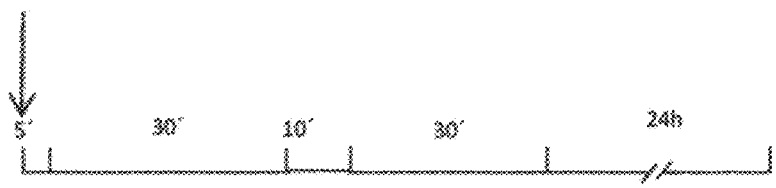
FIG. 1. Deletion of BNIP3 in mice reduces myocardial infarct size in vivo. A Schematic of the in vivo ischemia/reperfusion model. B Schematic of a heart section depicting non-ischemic area (remote), ischemic area (area at risk, AAR), infarct area (white, embedded in AAR). C Infarct sizes post 24 h of reperfusion in wild-type, BNIP3 deficient (Bnip3$^{-/-}$) and Bnip3$^{-/-}$ mice treated with indicated TAT-BNIP3 doses (n=3-7 mice). AAR-area at risk; Inf-infarct. Data are mean±s.e.m. Statistical analyses are two-way analysis of variance (ANOVA) with Bonferroni's correction.
Figure 1:
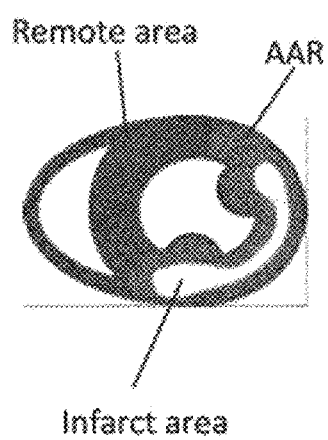
Figure 1:
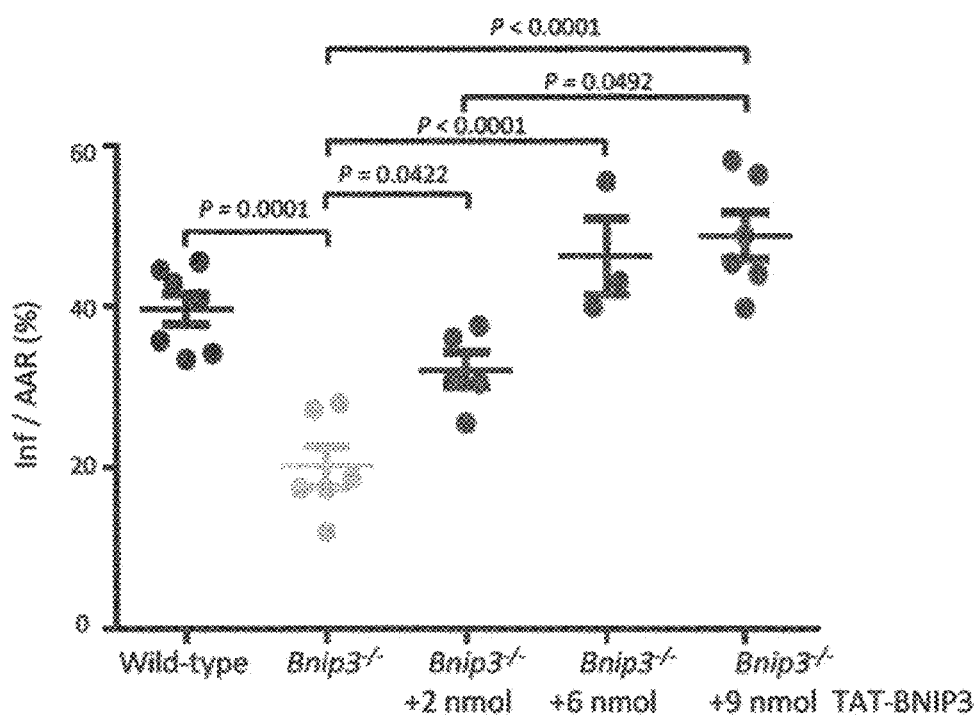

The invention provides methods, compounds and compositions of treating a disease or condition in a subject in which it is desirable to inhibit the individual activity and inter-pathway communication of BCL-2 adenovirus E1B 19 kDa interacting protein-3 (BNIP3), BCL-2 associated X protein (BAX) and mitochondria to prevent cell damage and cell death.

In one aspect the invention is a peptide inhibiting the BNIP3, BAX and mitochondria triangle which activates cell damage and cell death cascades. The peptide according to the invention comprises a cellular uptake signal; and a BNIP3 fragment comprising positions 13 to 20 of BNIP3 or an amino acid sequence derived therefrom and especially has a length of 50, in particular 40, amino acids or less.
The BNIP3 Fragment The BNIP3 fragment within the peptide according to the present invention in particular is capable of binding to BAX and/or BNIP3. Especially, the BNIP3 fragment is capable of binding to the BNIP3-binding region of BAX, such as the region of amino acids 108 to 164 of BAX. The BNIP3 fragment is in particular capable of interfering with or inhibiting the interaction of BNIP3 and BAX.

In certain embodiments, the BNIP3 fragment has a length of 20 amino acids or less. Especially, it has a length of 15 amino acids or less or even 10 amino acids or less. In particular embodiments, the BNIP3 fragment has a length of 8 amino acids.

In specific embodiments, the BNIP3 fragment has an amino acid sequence of the BNIP3 protein. The term "BNIP3" as used herein in particular refers to mouse BCL-2 adenovirus E1B 19 kDa interacting protein-3 having the amino acid sequence of SEQ ID NO: 1. The BNIP3 fragment hence may have an amino acid sequence which is identical to a consecutive part of the amino acid sequence of SEQ ID NO: 1 which comprises the sequence of amino acid positions 13 to 20. For example, the BNIP3 fragment may have the amino acid sequence of positions 1 to 20 of SEQ ID NO: 1. In certain embodiments, the BNIP3 fragment has an amino acid sequence selected from the group consisting of positions 4 to 20 of SEQ ID NO: 1, positions 11 to 20 of SEQ ID NO: 1, positions 12 to 20 of SEQ ID NO: 1, and positions 13 to 20 of SEQ ID NO: 1. In specific embodiments, the BNIP3 fragment consists of the amino acid sequence of positions 13 to 20 of SEQ ID NO: 1. In these embodiments, the BNIP3 fragment in particular does not comprise any further amino acid residues. The amino acid sequence of positions 13 to 20 of mouse BNIP3 is identical to the amino acid sequence of positions 73 to 80 of human BNIP3 (SEQ ID NO: 2). Alternative to the amino acid sequences of mouse BNIP3 referred to herein, also the corresponding amino acid sequences of human BNIP3 can be used.

In further embodiments, the BNIP3 fragment has an amino acid sequence which is derived from BNIP3. A target amino acid sequence is "derived" from or "corresponds" to a reference amino acid sequence if the target amino acid sequence shares a homology or identity over its entire length with a corresponding part of the reference amino acid sequence of at least 60%, more preferably at least 70%, at least 80%, at least 90% or at least 95%. In particular embodiments, a target amino acid sequence which is "derived" from or "corresponds" to a reference amino acid sequence is 100% homologous, or in particular 100% identical, over its entire length with a corresponding part of the reference amino acid sequence. A "homology" or "identity" of an amino acid sequence or nucleotide sequence is preferably determined according to the invention over the entire length of the reference sequence or over the entire length of the corresponding part of the reference sequence which corresponds to the sequence which homology or identity is defined. The BNIP3 fragment in particular may be derived from one of the BNIP3 fragments described above. For example, the BNIP3 fragment may have an amino acid sequence which is at least 60% identical, especially at least 70% identical, to an amino acid sequence selected from the group consisting of positions 1 to 20 of SEQ ID NO: 1, positions 4 to 20 of SEQ ID NO: 1, positions 11 to 20 of SEQ ID NO: 1, positions 12 to 20 of SEQ ID NO: 1, and positions 13 to 20 of SEQ ID NO: 1. In specific embodiments, the BNIP3 fragment comprises an amino acid sequence which is at least 60% identical to positions 13 to 20 of SEQ ID NO: 1.

In certain embodiments, the BNIP3 fragment comprises positions 13 to 20 of BNIP3, optionally comprising 1, 2 or 3 amino acid substitutions compared to positions 13 to 20 of BNIP3. BNIP3 especially has the amino acid sequence of SEQ DI NO: 1. In these embodiments, the 1, 2 or 3 amino acid substitutions are preferably present at one or more of the position corresponding to positions 13, 15, 17, 18, 19 and 20 of BNIP3, in particular positions 15, 17 and 19 of BNIP3. In particular, the amino acid substitutions are selected from the group consisting of
 (i) substitution of glutamic acid at position 15 of BNIP3 to phenylalanine, isoleucine, leucine, valine, tyrosine, cysteine, histidine, arginine or threonine,
 (ii) substitution of histidine at position 17 of BNIP3 to valine, and
 (iii) substitution of serine at position 19 of BNIP3 to tyrosine, cysteine, phenylalanine or histidine.

In particular embodiments, the BNIP3 fragment comprises positions 13 to 20 of BNIP3 comprising 1 or 2 amino acid substitutions compared to positions 13 to 20 of BNIP3, wherein the amino acid substitutions are selected from the group consisting of
 (i) substitution of glutamic acid at position 15 of BNIP3 to histidine, isoleucine, leucine, valine or tyrosine, and
 (ii) substitution of serine at position 19 of BNIP3 to tyrosine, cysteine or phenylalanine.

In certain embodiments, serine at position 19 of BNIP3 is substituted to tyrosine, cysteine or phenylalanine, in particular to phenylalanine.

In specific embodiments, the BNIP3 fragment comprises or consists of an amino acid sequence selected from the group consisting of SEQ ID NOs: 3 to 17. In special embodiments, the BNIP3 fragment consists of the amino acid sequence of SEQ ID NO: 7 or 8, especially 8.

The BNIP3 fragment may optionally comprise further amino acid residues derived from BNIP3. Especially, the entire BNIP3 fragment is derived from a consecutive amino acid sequence of BNIP3. In particular, the entire BNIP3 fragment is derived from amino acid positions 1 to 20 of BNIP3 or a part thereof which comprises at least positions 13 to 20 of BNIP3. The BNIP3 fragment may have an amino acid sequence identical to the corresponding part of BNIP3 or may have 1 to 8 amino acid substitutions, especially 1 to 6 amino acid substitutions. The BNIP3 fragment may for example comprise positions 12 to 20 of BNIP3, optionally comprising 1, 2, 3 or 4 amino acid substitutions compared to positions 12 to 20 of BNIP3, or it may comprise positions 4 to 20 of BNIP3, optionally comprising 1, 2, 3, 4, 5 or 6 amino acid substitutions compared to positions 4 to 20 of BNIP3, or it may comprise positions 1 to 20 of BNIP3, optionally comprising 1, 2, 3, 4, 5 or 6 amino acid substitutions compared to positions 1 to 20 of BNIP3. In particular, 1, 2 or 3 of these amino acid substitutions are in positions 13 to 20 and the remaining amino acid substitutions are in positions 1 to 12. In these embodiments, the amino acid substitutions are preferably present at one or more of the position corresponding to positions 4, 11, 12, 13, 15, 17, 18, 19 and 20 of BNIP3, in particular to positions 4, 11, 12, 15, 17 and 19 of BNIP3.

In specific embodiments, the BNIP3 fragment comprises an amino acid sequence selected from the group consisting of SEQ ID NOs: 18 to 30 and 70 to 75.

A substituted amino acid residue in particular is substituted for another naturally occurring amino acid residue. The phrase "substitution" as used herein also includes the use of a chemically derivatized residue in place of a non-derivatized residue provided that such polypeptide exerts the requisite activity. The term "derivative" as used herein refers to a peptide having one or more residues chemically derivatized by reaction of a functional side group. Such derivatized molecules include for example, those molecules in which free amino groups have been derivatized to form amine hydrochlorides, p-toluene sulfonyl groups, carbobenzoxy groups, t-butyloxycarbonyl groups, chloroacetyl groups or formyl groups. Free carboxyl groups may be derivatized to form salts, methyl and ethyl esters or other types of esters or hydrazides. Free hydroxyl groups may be derivatized to form O-acyl or O-alkyl derivatives. The imidazole nitrogen of histidine may be derivatized to form N-im-benzylhistidine. Also included as derivatives are those peptides which contain one or more naturally occurring amino acid derivatives of the twenty standard amino acids. For examples: 4-hydroxyproline may be substituted for proline; 5 hydroxylysine may be substituted for lysine; 3-methylhistidine may be substituted for histidine; homoserine may be substituted for serine; and ornithine may be substituted for lysine.

In some embodiments, the term "substitution" includes a linkage of two or more substituted amino acid residues. In particular, two or more amino acid residues may be substituted with crosslinkable moieties and/or linked and each optionally comprises an additional a-carbon substitution selected from substituted, optionally hetero-lower alkyl, particularly optionally substituted, optionally hetero-methyl, ethyl, propyl and butyl. Furthermore, two substituted amino acid residues may be substituted with homocysteines connected through a disulfide bridge to generate a ring and tail cyclic peptide. Alternatively, two or more substituted amino acid residues may be replaced by a linker. Suitable linkers in this respect include, for example, —$(CH_2)_n$ONHCO$_x$(CH$_2)_m$—, wherein X is $CH_2$, NH or O, and m and n are integers 1-4, forming a lactam peptide; —$CH_2OCH_2CHCHCH_2OCH_2$—, forming an ether peptide; or —$(CH_2)$nCHCH$(CH_2)$m—, forming a stapled peptide.

In certain embodiments, the BNIP3 fragment comprises at least one of the substitutions E15Y, S19F and S19Y with respect to the sequence of BNIP3.

The Cellular Uptake Signal

The cellular uptake signal within the peptide according to the invention is in particular capable of mediating the uptake of the peptide into a target cell. Especially, the cellular uptake signal is capable of mediating uptake into a mammalian cell, in particular a human cell.

In certain embodiments, the cellular uptake signal is a peptide. In particular, the cellular uptake signal is a cell penetrating peptide or protein transduction domain. It may have a length of 5 to 30 amino acids, in particular 8 to 20 amino acids or 10 to 16 amino acids.

The cellular uptake signal may for example be a hydrophilic peptide or an amphiphilic peptide. Examples of cellular uptake signals include the protein transduction domain of the TAT protein of HIV (in particular amino acid residues 48-59), penetratin, antennapedia PTD, SynB1, SynB3, PTD-4, PTD-5, FHV Coat-(35-49), BMV Gag-(7-25), HTLV-II Rex-(4-16), D-Tat, R9-Tat, Transportan, MAP, SBP, FBP, MPG, MPG (ANLS), Pep-1, Pep-2, polyarginines and polylysines. In certain embodiments, the cellular uptake signal is a peptide having an amino acid sequence selected from the group consisting of SEQ ID NOs: 31 to 50.

The cellular uptake signal may be composed of naturally occurring amino acid residues and may optionally be a peptide derivative comprising chemically derivatized amino acid residue as described herein. Furthermore, it may be a peptide mimetic or comprise a D-retro-inverso sequence. In certain embodiments, the cellular uptake signal comprises a D-retro-inverso sequence of a cell penetrating peptide as disclosed herein.

The Peptide

The peptide according to the invention comprises the cellular uptake signal and the BNIP3 fragment. The expression "comprise", as used herein, besides its literal meaning also includes and specifically refers to the expressions "consist essentially of" and "consist of". Thus, the expression "comprise" refers to embodiments wherein the subject-matter which "comprises" specifically listed elements does not comprise further elements as well as embodiments wherein the subject-matter which "comprises" specifically listed elements may and/or indeed does encompass further elements. Likewise, the expression "have" is to be understood as the expression "comprise", also including and specifically referring to the expressions "consist essentially of" and "consist of". The term "consist essentially of", where possible, in particular refers to embodiments wherein the subject-matter comprises 20% or less, in particular 15% or less, 10% or less or especially 5% or less further elements in addition to the specifically listed elements of which the subject-matter consists essentially of.

In certain embodiments, the peptide according to the invention consists of the cellular uptake signal and the BNIP3 fragment.

In further embodiments, the peptide according to the invention comprises the cellular uptake signal, the BNIP3 fragment, and a linker between the cellular uptake signal and the BNIP3 fragment. Especially, the peptide according to the invention consisting of the cellular uptake signal, the BNIP3 fragment, and a linker between the cellular uptake signal and the BNIP3 fragment. The linker may be a peptide linker composed of amino acids, or a chemical linker. The linker in particular has a small size. For example, it is a peptide linker having 10 or less amino acids, such as 8 or less, 6 or less or 5 or less amino acids. A chemical linker for example has a molecular weight of 1,500 Da or less, such as 1,000 Da or less, 750 Da or less or 500 Da or less. In embodiments where the cellular uptake signal is a peptide moiety, the linker preferably is a peptide linker.

In certain embodiments, the peptide according to the invention has a length of 40 amino acids or less. In specific embodiments, the peptide according to the invention has a length of 35 amino acids or less, especially 30 amino acids or less. The peptide according to the invention may for example have a length of 25 amino acids or less, such as about 20 amino acids. Shorter peptides are especially desired because they can more easily be produced, formulated and handled. Therefore, the peptide according to the invention preferably has a length of 35 amino acids or less, especially 25 amino acids or less. This in particular refers to embodiments where the cellular uptake signal is a peptide moiety. In specific embodiments, the peptide according to the invention has a molecular weight of 10,000 Da or less, especially 5,000 Da or less, 4,000 Da or less or 3,000 Da or less.

In certain embodiments, the peptide according to the invention has an amino acid sequence selected from the group consisting of SEQ ID NOs: 51 to 67.

Generally, the peptide according to the invention is composed of naturally occurring L-amino acids. In certain embodiments, the peptide may also include artificial amino acids. For example, the peptide may comprise one or more D-amino acids, E-ß-homo amino acids, and/or N-methylated amino acids; or it may be composed thereof. In certain embodiments, the cellular uptake signal and/or the BNIP3 fragment are the D-retro-inverso sequence, especially the D-retro-inverso sequence of an amino acid sequence described herein. For example, the peptide has the D-retro-inverso sequence of QPRRRQRRKKRG-NSFHLEVWSGQLNEEGSQSM (SEQ ID NO: 68) or QPRRRQRRKKRG-NSFHLEVW (SEQ ID NO: 69).

In certain embodiments, the peptide is acetylated, acylated, formylated, amidated, phosphorylated, sulfated, nitrosated, glycosylated, sumoylated, hydroxylated, alkylated and/or isomerisized. For example, the peptide may comprise an N-terminal acetyl, formyl, myristol, palmitoyl, carboxyl or 2-furosyl group, and/or a C-terminal hydroxyl, amide, ester or thioester group. Furthermore, the peptide may be cyclized.

In specific embodiments, the peptide according to the invention is a peptide mimetic of any of the peptides described herein. The term "peptide mimetic" as used herein refers to structures which serve as substitutes for peptides in interactions between molecules. Peptide mimetics include synthetic structures which may or may not contain amino acids and/or peptide bonds but retain the structural and functional features of a BNIP3 peptide. Peptide mimetics also include molecules incorporating peptides into larger molecules with other functional elements, peptoids, oligopeptoids, and peptide libraries containing peptides of a designed length representing all possible sequences of amino acids corresponding to a peptide of the invention. All of these peptides as well as molecules substantially homologous, complementary or otherwise functionally or structurally equivalent to these peptides may be used for purposes of the present invention.

In certain embodiments, the peptide according to the invention is present in a composition further comprising nanoparticles. Especially, the peptide is present within a nanoparticle. The nanoparticles may be any nanoparticles suitable to encapsulate the peptide. Exemplary nanoparticles include liposomes, nanoemulsions, solid-liquid nanoparticles, nanostructured lipid carriers, polymeric nanoparticles and dendrimers. In certain embodiments, the nanoparticle comprises targeting molecules on its outer surface such as peptides, ligands or antibodies which enable targeting the peptide of the invention to the desired cells or tissues.

In specific embodiments, the nanoparticles enable uptake of the peptide according to the invention into the target cells. In these embodiments, the nanoparticle may perform the task of the cellular uptake signal and in particular be or replace the cellular uptake signal. Hence, the present invention also provides a nanoparticle comprising a BNIP3 fragment as defined herein.

Therapeutic Uses of the Peptide

The invention provides methods, compounds and compositions of treating a disease or condition in a subject in which it is desirable to inhibit the individual activity and inter-pathway communication of BNIP3, BAX and mitochondria comprising administering to the subject the compound in an amount effective to treat the disease or condition in a subject.

The invention also provides pharmaceutical compositions comprising the peptide according to the invention. In particular, the pharmaceutical compositions comprise the peptide according to the invention in unit dosage, administrable form. The invention further provides methods of inhibiting cell damage and cell death, comprising administering to a person in need thereof an effective amount of the peptide according to the invention. The present invention also provides the use of the peptide according to the invention or the pharmaceutical composition comprising the same in medicine, especially in the treatment of reperfusion-related and/or mitochondria-related disorders as well as cancer therapy-induced cardiotoxicity and prevention of such, respectively.

The invention includes all combinations of the recited particular embodiments as if each combination had been laboriously separately recited.

The invention also provides a method of inhibiting BNIP3 in a subject comprising contacting the BNIP3 with one or more of any of the peptides or pharmaceutical compositions disclosed herein in an amount effective to inhibit BNIP3. Preferably, the BNIP3 is in a subject, and the one or more peptides or compositions is administered to the subject.

The invention also provides a method of inhibiting BAX in a subject comprising contacting the BAX with one or more of any of the peptides or pharmaceutical compositions disclosed herein in an amount effective to inhibit BAX. Preferably, the BAX is in a subject, and the one or more peptides or compositions is administered to the subject.

The invention also provides a method of inhibiting BNIP3/BAX dimer and/or oligomer activity in a subject comprising contacting the BNIP3/BAX dimers and/or oligomers with one or more of any of the peptides or pharmaceutical compositions disclosed herein in an amount effective to inhibit BNIP3/BAX dimer/oligomer activity. Preferably, the BNIP3 and the BAX is in a subject, and the one or more peptides or compositions is administered to the subject.

The invention also provides a method of treatment of reperfusion-related and/or mitochondria-related disorders in a subject, comprising administering the peptide or pharmaceutical composition according to the invention to the subject in a therapeutically effective amount.

The invention also provides a method of the treatment or prevention of tissue damage due to mitochondria-induced apoptosis or necrosis in a subject, comprising administering the peptide or pharmaceutical composition according to the invention to the subject in a therapeutically effective amount. The peptide may be administered to the subject before, during and/or after occurrence of cell death or damage.

The subject being administered the peptide or pharmaceutical composition, and being treated, may have, for example, a disease or condition selected from the group consisting of hypoxic and/or ischemic cells; cardiac, brain, liver, kidney, bowel, limb ischemia, limb vessel occlusion; cardiac, brain, liver and kidney, bowel, limb reperfusion injury; myocardial infarction and reperfusion injury; chemotherapy-, radiotherapy-, targeted therapy-, and immunotherapy-induced cardiotoxicity; atherosclerosis; heart failure; heart, liver, kidney transplantation; aneurism; chronic pulmonary disease; ischemic heart disease; hypertension; pulmonary hypertension; embolisms; thrombosis; cardiomyopathy; stroke; neurodegenerative disease or disorder; an immunological disorder; renal hypoxia; hepatitis; a liver disease; a kidney disease; cerebellar degeneration; organ transplantation rejection, and a disease or disorder involving cell death and/or tissue damage. In certain embodiments, the subject has an ischemia-, reperfusion- and/or mitochondria-related disorder, especially after vessel occlusion, especially myocardial infarction, ischemic stroke, acute kidney injury, trauma, circulatory arrest, and ischemia during organ transplantation. In further embodiments, the subject suffers from cancer therapy-induced cardiotoxicity, for example cardiotoxicity induced by chemotherapy, radiotherapy, immunotherapy and/or targeted therapy. Or the subject may undergo any kind of cancer therapy and the therapy may be applied for prevention of cardiotoxicity. Chemotherapy in particular refers to anthracycline-based chemotherapy such as therapy with doxorubicin. In a specific embodiment, the subject suffers from cardiotoxicity induced by anthracycline-based chemotherapy such as chemotherapy with doxorubicin.

A reperfusion-related disorder may generally refer to a disorder which involves reperfusion injury. Reperfusion injury is tissue damage caused when e.g. blood supply returns to tissue after a period of ischemia, in which the restoration of circulation results in inflammation and oxidative damage through the induction of oxidative stress rather than restoration of normal function. The invention thus provides a method of treatment of reperfusion injury in a subject, comprising administering the peptide or pharmaceutical composition according to the invention to the subject in a therapeutically effective amount.

The invention also provides a method of treating an acute myocardial infarction, a myocardial reperfusion injury or heart failure in a subject comprising administering to the subject one or more of the peptides or pharmaceutical compositions disclosed herein in an amount effective to treat an acute myocardial infarction, a myocardial reperfusion injury or heart failure in a subject in need thereof. Preferably, the one or more peptides or the pharmaceutical composition is administered in an amount effective to inhibit BNIP3, BAX or BNIP3/BAX dimer/oligomer activity, respectively in a subject.

In certain embodiments, the treatment includes alleviation and/or prevention of reperfusion and mitochondria-related injury. In further embodiments, the treatment includes alleviation and/or prevention of cancer therapy-induced cardiotoxicity.

The subject can be, for example, a mammal, and is preferably a human.

As used herein "treating" or to "treat" a disease or disorder means to alleviate or ameliorate or eliminate a sign or symptom of the disease or disorder that is being treated. When the peptides or composition is administered to a subject before or at the onset of the disease or disorder, the peptides or composition can prevent or reduce the severity of the disease or disorder. For example, administration of the peptides or composition to a subject can prevent or reduce the severity of cancer therapy-induced cardiotoxicity, such as chemo-, radio-, targeted-, or immunotherapy-induced cardiotoxicity. In these embodiments, the peptide according to the invention can be administered before, during and/or after cancer therapy. Administration of the peptides can include preventive and/or therapeutic administration.

The peptides and compositions of the present invention can be administered to subjects using routes of administration known in the art. The administration can systemic of localized to a specific site. Routes of administration include, but are not limited to, intravenous, intramuscular, intracardial, intrathecal or subcutaneous injection, oral or rectal administration, and injection into a specific site.

In specific embodiments, the peptide or pharmaceutical composition according to the invention is administered to the subject during or after occurrence of impaired blood supply, ischemia or vessel occlusion, especially prior to reperfusion of the tissue affected by vessel occlusion. In certain embodiments, the peptide or pharmaceutical composition is administered within 6 hours prior to reperfusion, in particular within 4 hours, within 2 hours or within 1 hour prior to reperfusion. In specific embodiments the peptide or pharmaceutical composition is administered within 45 minutes, especially within 30 minutes prior to reperfusion.

All combinations of the various elements described herein are within the scope of the invention unless otherwise indicated herein or otherwise clearly contradicted by context.

The method may include expressing in a cell an effective amount of the peptide according to the invention, wherein apoptosis, necrosis, or the combination thereof, is altered in the cell compared to a control cell. The expressing may include, for instance, introducing a polynucleotide encoding the peptide into the cell. The cell may be ex vivo or in vivo, and may be a cardiac cell. Apoptosis, necrosis, or the combination thereof may be decreased in the cell.

The present invention provides a method that includes administering to a subject in need thereof an effective amount of a composition comprising a polynucleotide encoding the peptide according to the invention, wherein apoptosis, necrosis, or the combination thereof, is increased in the subject. The administering may include delivery of the polynucleotide to cardiac tissue, brain tissue, liver tissue and kidney tissue. The subject may have signs of or is at risk of a disease chosen from acute infarction, hypoxia, ischemia, stroke, or vascular disease. The method may result in a reduction of a sign of disease.

As used herein, the term "polynucleotide" refers to a polymeric form of nucleotides of any length, either ribonucleotides or deoxynucleotides, and includes both double- and single-stranded RNA and DNA. A polynucleotide can be obtained directly from a natural source, or can be prepared with the aid of recombinant, enzymatic, or chemical techniques. A polynucleotide can be linear or circular in topology. A polynucleotide may be, for example, a portion of a vector, such as an expression or cloning vector, or a fragment. A polynucleotide may include nucleotide sequences having different functions, including, for instance, coding regions, and non-coding regions such as regulatory regions.

As used herein, "gene" refers to a nucleotide sequence that encodes a mRNA. A gene has at its 5' end a transcription initiation site and a transcription terminator at its 3' end. As used herein, a "target gene" refers to a specific gene whose expression is inhibited by a polynucleotide as described herein. As used herein, a "target mRNA" is a mRNA encoded by a target gene. Unless noted otherwise, a target gene can result in multiple mRNAs distinguished by the use of different combinations of exons. Such related mRNAs are referred to as splice variants or transcript variants of a gene.

As used herein, the terms "coding region" and "coding sequence" are used interchangeably and refer to a nucleotide sequence that encodes a polypeptide and, when placed under the control of appropriate regulatory sequences expresses the encoded polypeptide. The boundaries of a coding region are generally determined by a translation start codon at its 5' end and a translation stop codon at its 3' end. A "regulatory sequence" is a nucleotide sequence that regulates expression of a coding sequence to which it is operably linked. Non-limiting examples of regulatory sequences include promoters, enhancers, transcription initiation sites, translation start sites, translation stop sites, and transcription terminators. The term "operably linked" refers to a juxtaposition of components such that they are in a relationship permitting them to function in their intended manner. A regulatory sequence is "operably linked" to a coding region when it is joined in such a way that expression of the coding region is achieved under conditions compatible with the regulatory sequence.

A polynucleotide that includes a coding region may include heterologous nucleotides that flank one or both sides of the coding region. As used herein, "heterologous nucleotides" refer to nucleotides that are not normally present flanking a coding region that is present in a wild-type cell. For instance, a coding region present in a wild-type microbe and encoding a polypeptide is flanked by homologous sequences, and any other nucleotide sequence flanking the coding region is considered to be heterologous. Examples of heterologous nucleotides include, but are not limited to regulatory sequences. Typically, heterologous nucleotides are present in a polynucleotide of the present invention through the use of standard genetic and/or recombinant methodologies well known to one skilled in the art. A polynucleotide of the present invention may be included in a suitable vector. The presence of heterologous nucleotides flanking one or both sides of a polynucleotide described herein result from human manipulation.

The terms "complement" and "complementary" as used herein, refer to the ability of two single stranded polynucleotides to base pair with each other, where an adenine on one strand of a polynucleotide will base pair to a thymine or uracil on a strand of a second polynucleotide and a cytosine on one strand of a polynucleotide will base pair to a guanine on a strand of a second polynucleotide. Two polynucleotides are complementary to each other when a nucleotide sequence in one polynucleotide can base pair with a nucleotide sequence in a second polynucleotide. For instance, 5'-ATGC and 5'-GCAT are complementary. The term "substantial complement" and cognates thereof as used herein, refer to a polynucleotide that is capable of selectively hybridizing to a specified polynucleotide under stringent hybridization conditions. Stringent hybridization can take place under a number of pH, salt and temperature conditions. The pH can vary from 6 to 9, preferably 6.8 to 8.5. The salt concentration can vary from 0.15 M sodium to 0.9 M sodium, and other cations can be used as long as the ionic strength is equivalent to that specified for sodium. The temperature of the hybridization reaction can vary from 30° C. to 80° C., preferably from 45° C. to 70° C. Additionally, other compounds can be added to a hybridization reaction to promote specific hybridization at lower temperatures, such as at or approaching room temperature. Among the compounds contemplated for lowering the temperature requirements is formamide. Thus, a polynucleotide is typically substantially complementary to a second polynucleotide if hybridization occurs between the polynucleotide and the second polynucleotide. As used herein, "specific hybridization" refers to hybridization between two polynucleotides under stringent hybridization conditions.

A polynucleotide that includes a coding region may include heterologous nucleotides that flank one or both sides of the coding region. As used herein, "heterologous nucleotides" refer to nucleotides that are not normally present flanking a coding region that is present in a wild-type cell. For instance, a coding region present in a wild-type microbe and encoding a polypeptide is flanked by homologous sequences, and any other nucleotide sequence flanking the coding region is considered to be heterologous. Examples of heterologous nucleotides include, but are not limited to regulatory sequences. Typically, heterologous nucleotides are present in a polynucleotide of the present invention through the use of standard genetic and/or recombinant methodologies well known to one skilled in the art. A polynucleotide of the present invention may be included in a suitable vector. The presence of heterologous nucleotides flanking one or both sides of a polynucleotide described herein result from human manipulation.

The present invention further provides a method for preventing cell damage or cell death, comprising contacting the cell with the peptide according to the invention. The method may be performed in vitro or in vivo, and in particular is performed ex vivo.

The present invention further provides a method of screening for a compound suitable for prevention of reperfusion injury and/or mitochondria-related disorders and/or cancer therapy-induced cardiotoxicity, comprising
(i) providing one or more candidate compounds;
(ii) determining the ability of the candidate compounds to interfere with the binding of BNIP3 and BAX;
(iii) selecting those candidate compounds which interfere with the binding of BNIP3 and BAX.

The candidate compounds may be any suitable compounds, especially including peptides and small molecule compounds.

EXAMPLES

Example 1: BNIP3 Represents a Therapeutic Target for I/R Injury

A combination of necrotic and apoptotic cardiomyocyte death is a hallmark of the early phase of reperfusion injury. Mitochondria play major roles in both processes. The BH-only BCL2-family member BNIP3 is a potential activator of mitochondrial-driven necrotic and apoptotic cell death cascades in cell culture and isolated rat hearts[31,32,36-38]. BNIP3 has been previously implicated in left ventricular remodeling post-acute myocardial infarction and in heart failure with preserved ejection fraction[33,39,40]. To investigate the involvement of BNIP3 in I/R injury and whether BNIP3 provides an attractive target for therapeutic intervention, wild-type and BNIP3 deficient mice were subjected to 24 h of reperfusion after occlusion of the left anterior descending coronary artery in a clinical relevant in vivo model[41-44] (FIG. 1A). For delineation of the affected area from the non-affected zone, Evans blue dye was injected into the aorta and coronary arteries. For demarcation of the non-viable myocardium, the infarcted area within the risk zone, heart sections were stained by triphenyl tetrazolium chloride (FIG. 1B). Consistently with a previous study in isolated rat hearts using a well-established dominant negative inhibitor of BNIP3[31], genetic ablation of BNIP3 generated a significantly reduced infarct size by 46% in comparison to the wild-type mice (FIG. 1C). Correspondingly, restitution of BNIP3 to the BNIP3 deficient mice caused infarct sizes comparable to wild-type mice in a dose-dependent manner and excluded possible side-effects of the genetic deletion of BNIP3 (FIG. 1C). These results indicate that BNIP3 plays an important role in the evolution of infarction in vivo.

Example 2: BNIP3 is a Mediator of BAX-Induced Cell Death in I/R Injury

Figure 2:
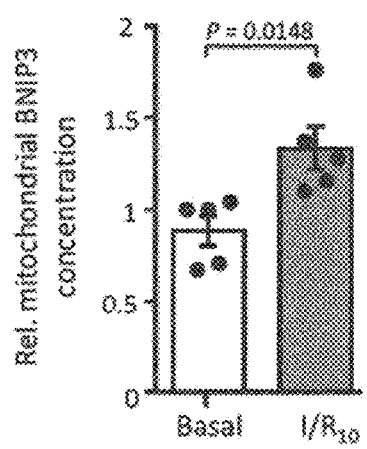
FIG. 2. BNIP3 is a mediator of BAX activity in myocardial reperfusion injury. Mice were exposed to indicated reperfusion time durations in vivo after vessel occlusion. Increasing mitochondrial BNIP3 level (A) and mitochondrial BAX concentration (B) in the area at risk at baseline and after 10 min of reperfusion were observed (n=5-7 mice). C Western blot monitoring revealed that BNIP3 is co-immunoprecipitated with BAX at baseline and after 10 and 30 min of reperfusion. D Quantification of mitochondrial BAX level in the area at risk of BNIP3 deficient (Bnip3$^{-/-}$) mice at baseline and post 10 min of reperfusion untreated and treated with BNIP3 (n=3 mice). Translocation of BAX is dependent on the presence of BNIP3. Data are mean±s.e.m. Statistical analyses are two-way analysis of variance (ANOVA) with Bonferroni's correction.
Figure 2:
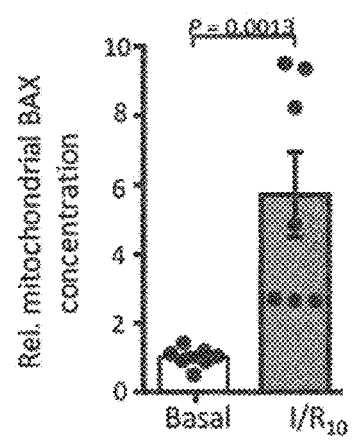
Figure 2:
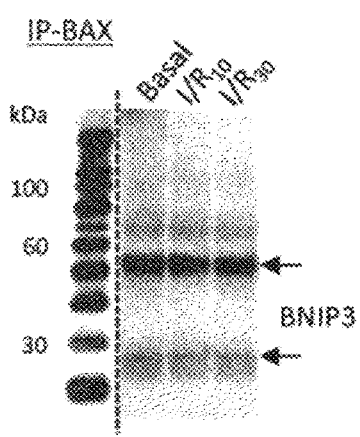
Figure 2:
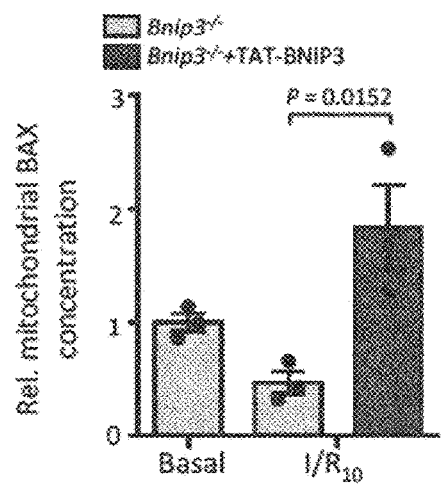

The pro-death BCL-2 family member BAX seems to be placed at the intersection of mitochondrial-dependent necrosis and apoptosis as an effector protein[5]. For this, the translocation of BAX from the cytosol to mitochondria is the critical step[37,45,46]. We recently demonstrated a basal interaction of BAX with BNIP3 taking place in the MOM in cardiomyocytes in vivo[35]. To determine whether the translocation of BAX to mitochondria as most relevant step in cell death occurs in I/R and is dependent on BNIP3, first changes in mitochondrial BAX and BNIP3 concentration were investigated. After 10 min of reperfusion following vessel occlusion the level of BAX in the MOM increases markedly together with augmented mitochondrial concentration of BNIP3 (FIGS. 2A and B). Co-immunoprecipitation revealed that BNIP3 and BAX form heterodimers in the MOM (FIG. 2C). By taking advantage of the BNIP3 deficient mice, next we examined whether BNIP3 is the upstream mediator of BAX for this translocation during reperfusion injury. No increase of mitochondrial BAX was observed within the early phase of reperfusion under genetic ablation of BNIP3 demonstrating the direct impact of BNIP3 (FIG. 2D). To verify that this effect really be achieved by BNIP3, we administered BNIP3 to BNIP3 deficient mouse hearts 5 min before starting the myocardial infarction procedure. The addition of BNIP3 restored the BAX translocation in BNIP3 deficient mouse hearts in the early phase of reperfusion and excluded possible side-effects of the genetic deletion of BNIP3 (FIG. 2D).

Figure 3:
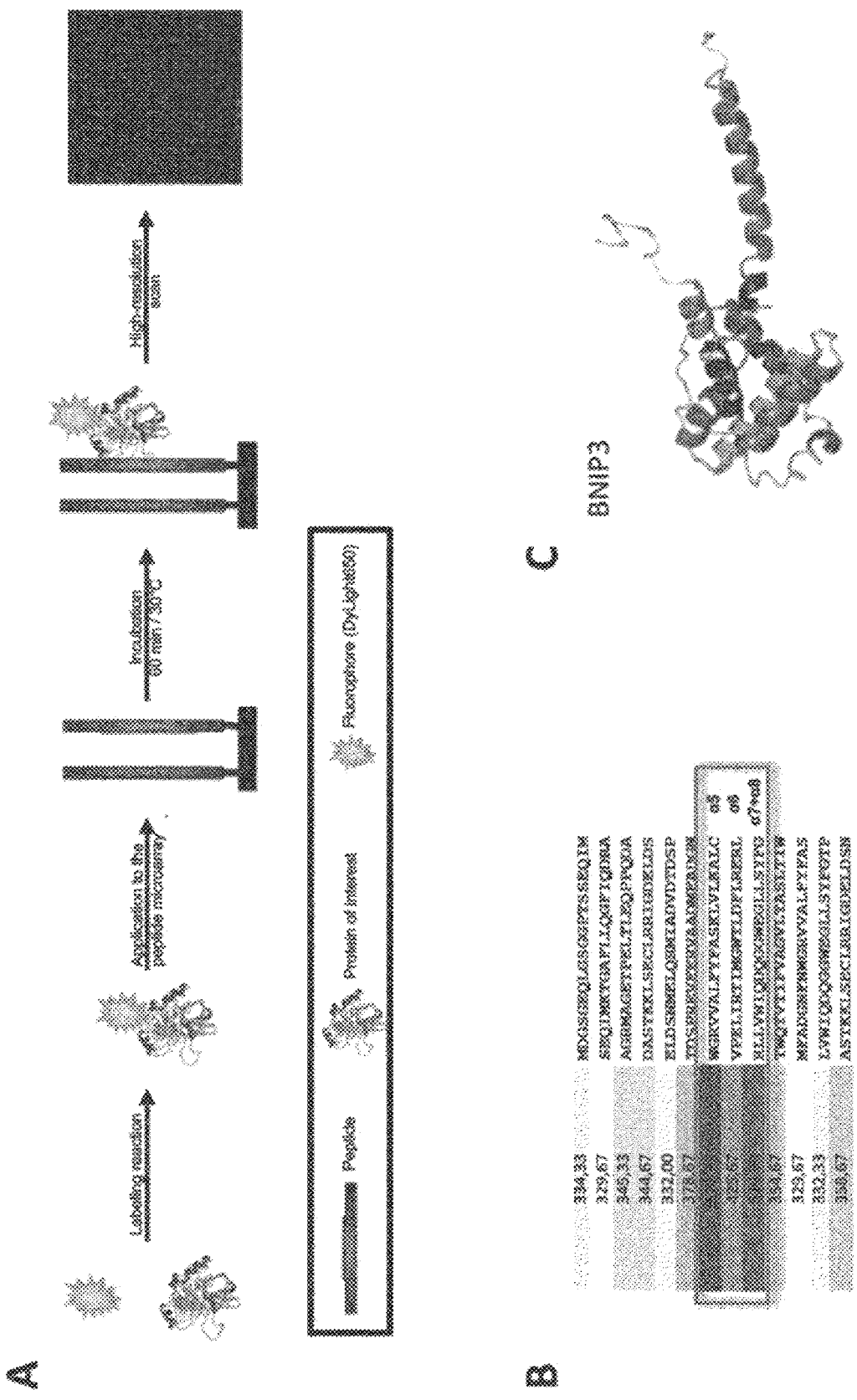
FIG. 3. Interaction sites, secondary structure and in silico docking. A Schematic of the experimental set-up (JPT, Berlin, Germany, Berlin). B Heat map depiction of BNIP3 incubation with the BAX peptide library displaying the helices α5, α6 and α7+α8 as interaction sites. Colour coding ranges from white (0 or low intensity) over light gray (middle intensity) to dark gray (high intensity). Figure discloses SEQ ID NOS 76-88, respectively, in order of appearance. C The three-dimensional structure model of BNIP3 obtained by homology modelling using Modeller 9.15. D Circular dichroism (CD) spectroscopic analysis of BNIP3. E, F Cartoon representations of BAX/BNIP3 interactions with indicated binding sites resulting from in silico docking experiments using HADDOCK. Figures disclose SEQ ID NOS 82-83, 21, 21, 84, 21, and 89-90, respectively, in order of appearance. G Structure of TAT sequence. Figure discloses SEQ ID NO: 31. H Structure of BNIP3-20A structure. Figure discloses SEQ ID NO: 21. I Structure of BNIP3-20C structure. Figure discloses SEQ ID NO: 91. J Representative images of transmural distribution of TAT-BNIP3-20A (green) post 10 min of reperfusion in vivo. Scale bars, 1 mm. K Western blot monitoring of TAT-BNIP3-20A co-immunoprecipitated with BNIP3 after 5 min of reperfusion post vessel occlusion in vivo.

Example 3: Identification of the Critical BNIP3 Sequence Required for the BNIP3 Inhibition in I/R Injury As the BNIP3 interaction with BAX was recognized as a substantial activity in reperfusion injury in vivo evaluated by co-immunoprecipitation, we identified the helices α5, α6, α7 and α8 in BAX as potential binding sites by assessing a peptide microarray with a library of 13 BAX-peptides synthesized (FIGS. 3A and B). For this study, we predicted the 3D structure of BNIP3 in silico by homology modelling using Modeller 9.15[47] (FIG. 3C). The created model was energy minimized using NAMD2.9 and the CHARMM36 force field. The BNIP3 model depicts 9 α-helices of variable length representing 64%, followed by random coils 19% and unidentified structures 17%, which was confirmed by circular dichroism spectroscopy (FIG. 3D). Computational docking simulations suggested the BAX helices α5, α6, α7 and α8 and the BNIP3 sequence MSQSGEENLQGSWVELHFSN (amino acids 1-20; SEQ ID NO: 21) as interaction sites (FIG. 3E), while the first 10 amino acids alone failed to bind to BAX (FIG. 3F). We hypothesized that amino acids 1-20 of BNIP3 may be sufficient to antagonize the activity of BNIP3, so we designed a cell-permeable peptide, TAT-BNIP3-20A peptide, composed of the HIV-1 TAT protein transduction domain (PTD, GRKKRRQRRRPQ (SEQ ID NO: 31), FIG. 3G)[48,49] attached via a covalent bond to 20 amino acids derived from amino acids 1-20 of BNIP3 (FIG. 3H). The amino acids 42-61 of BNIP3 were used to generate the control peptide, TAT-BNIP3-20C (FIG. 3I). The peptide fragments were capped at the N-terminus with an acetyl group and at the C-terminus with an amide group. Treatment of wild-type mice with the TAT-BNIP3-20A demonstrated that the peptide is taken up by the myocardium (FIG. 3J) and interacts there with endogenous BNIP3.

Figure 4:
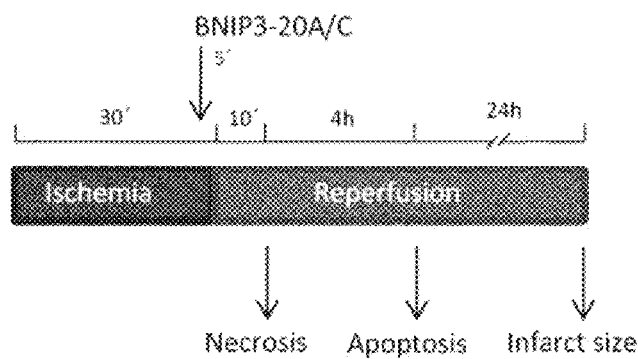
FIG. 4. TAT-BNIP3-20A reduces myocardial reperfusion injury in vivo. A Schematic of the in vivo myocardial infarction model. Mice were exposed to the indicated reperfusion time durations after vessel occlusion in vivo. The peptide was given into the left ventricle 5 min before reperfusion. B Infarct sizes post 24 h of reperfusion in wild-type mice treated with vehicle, the control peptide TAT-BNIP3-20C and TAT-BNIP3-20A (n=7-10 mice). TAT-BNIP3-20A significantly reduces the infarct size. BNIP3-20C and vehicle are not effective to attenuate the infarction. TAT-BNIP3-20A inhibits BNIP3 interaction with mitochondria after 10 min of reperfusion (C) and caspase-3 activity after 4 h of reperfusion (D), whereas the control peptide TAT-BNIP3-20C does not (n=6 mice). Data are mean±s.e.m. Statistical analyses are two-way analysis of variance (ANOVA) with Bonferroni's correction.
Figure 4:
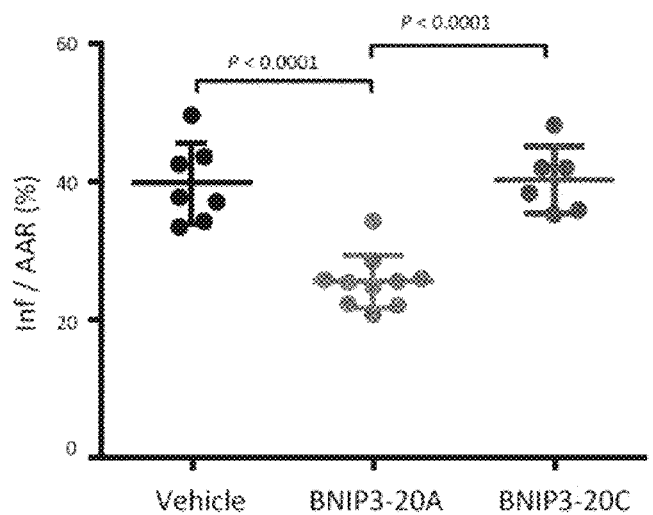
Figure 4:
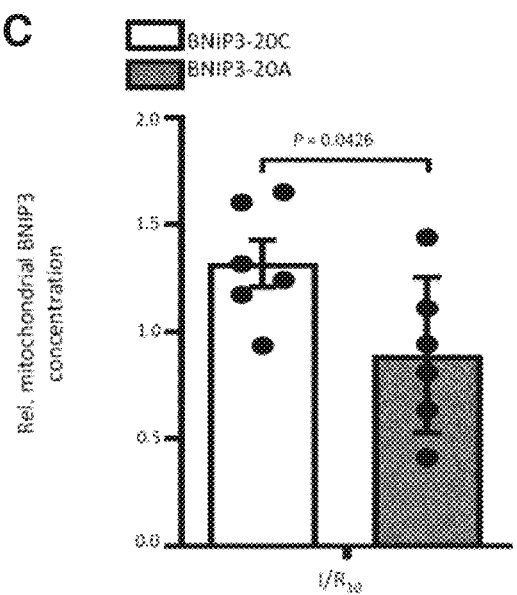
Figure 4:
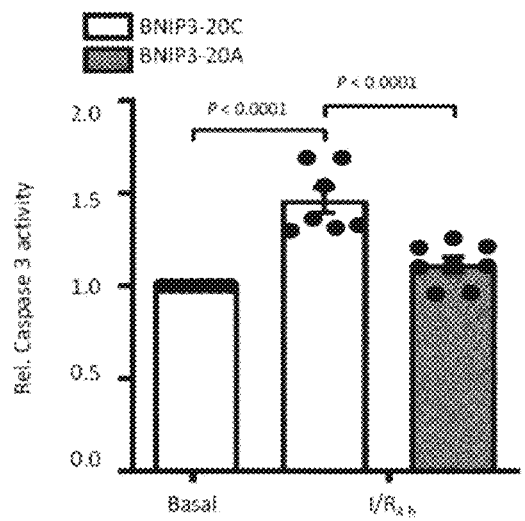

To examine whether the TAT-BNIP3-20A, given 5 min before reperfusion—a time point relevant for clinical practice, has the ability to antagonize BNIP3 activity and to reduce reperfusion injury in vivo, we used the given myocardial infarction model in mice (FIG. 4A). Treatment with TAT-BNIP3-20A, but neither vehicle nor TAT-BNIP3-20C, resulted in reduction of infarct size by 37% (FIG. 4B). This was due to the prevention of BNIP3 translocation to mitochondria by the TAT-BNIP3-20A peptide fragment (FIG. 4C) leading to a markedly inhibited caspase-3 activity, which is a key event in I/R after mitochondrial membrane perturbation (FIG. 4D).

Figure 5:
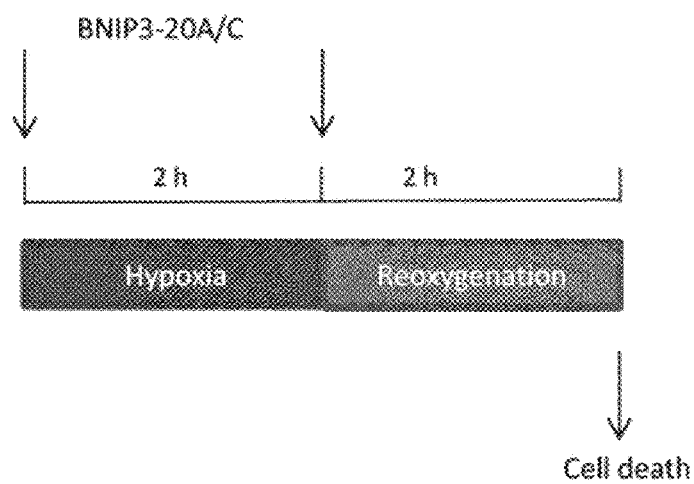
FIG. 5. A Schematic of the in vitro reoxygenation (study design in human ventricular cardiomyocytes derived from human induced pluripotent stem cells (humanCM). HumanCM were exposed to normoxia and 2 h of reoxygenation after hypoxia and were treated with the TAT-BNIP3-20A and the control peptide BNIP3-20C. B TAT-BNIP3-20A markedly inhibits the interaction of BNIP3 with mitochondria. C Representative images of apoptotic, necrotic and healthy humanCM. Scale bars, 1 mm (left), 200 μm (right). TAT-BNIP3-20A potently prevents humanCM death in reoxygenation. D Representative images of depolarized mitochondria, healthy mitochondria, nucleus. TAT-BNIP3-20A diminishes the loss of mitochondrial inner membrane potential induced by reoxygenation. Scale bars, 400 μm (left), 100 μm (right). Control peptide TAT-BNIP3-20C was not effective to inhibit BNIP3 interaction with mitochondria, loss of mitochondrial inner membrane potential and cell death. Data are mean±s.e.m. Statistical analyses are two-way analysis of variance (ANOVA) with Bonferroni's correction.
Figure 5:
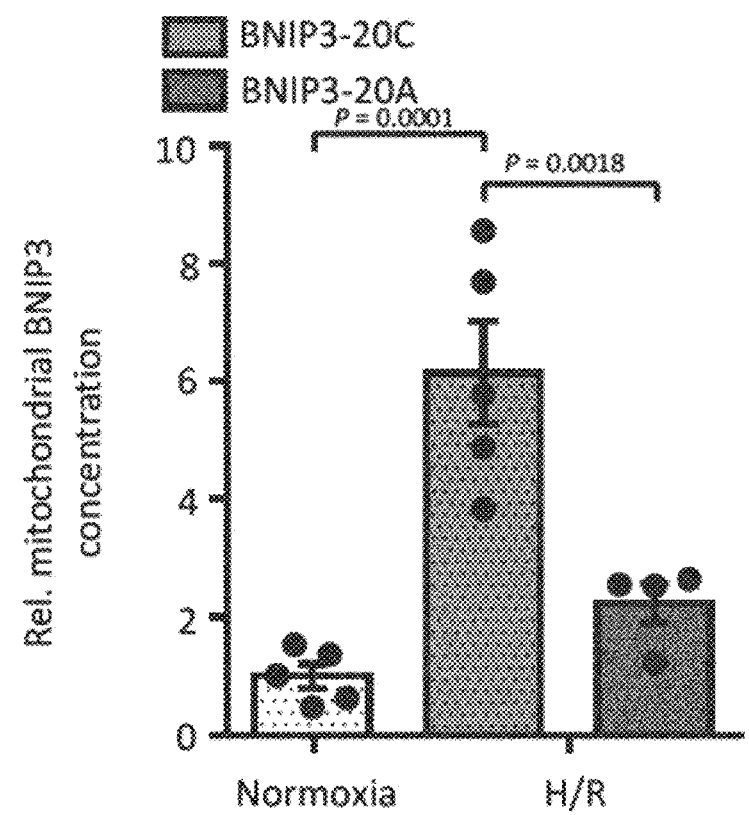

Example 4: TAT-BNIP3-20A Peptide Fragment Inhibits Apoptotic and Necrotic Human Cardiomyocyte Death To meet the translational need, reoxygenation experiments in human ventricular cardiomyocytes derived from human induced pluripotent stem cells (humanCM) were conducted (FIG. 5A). The humanCM were exposed to 2h of reoxygenation after hypoxia. Notably, even in humanCM TAT-BNIP3-20A exhibits its protective properties. BNIP3-20A is capable of prevention the translocation of human BNIP3 to mitochondria (FIG. 5B) resulting in a considerable protection of mitochondria evidenced by a low mitochondrial inner membrane depolarization (FIG. 5C) and fewer apoptotic and necrotic cells (FIG. 5D).

Example 5: Identification and Design of a Peptide Fragment Inhibitor of BNIP3/BAX Activity N-terminal truncations of the BNIP3-20A peptide sequence followed by exchanging single residues revealed that a peptide containing the amino acids 13-20 in combination with a Ser-to-Phe-substitution at position 19 displayed a substantially higher BNIP3 binding in peptide microarrays (see Table 1).

TABLE 1

Truncated BNIP3-20A fragments showing the highest binding capacities to BNIP3

| Sequence (SEQ ID NO) | Fluorescence intensity |
|---|---|
| MSQSGEENLQGSWVELHFSN (21) | 1040.33 |
| SGEENLQGSWVELHFSN (25) | 2656.33 |
| SWVELHFSN (29) | 4889.33 |
| WVELHFSN (7) | 14410.00 |

Figure 6:
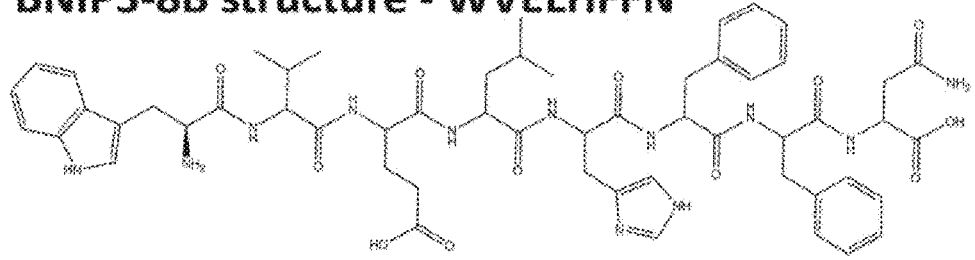
FIG. 6. A Structure of the BNIP3-8B sequence. Figure discloses SEQ ID NO: 8. B Structure of the BNIP3-8C sequence. Figure discloses SEQ ID NO: 92. C Circular dichroism (CD) spectroscopic analysis of the BNIP3-8B.
Figure 6:
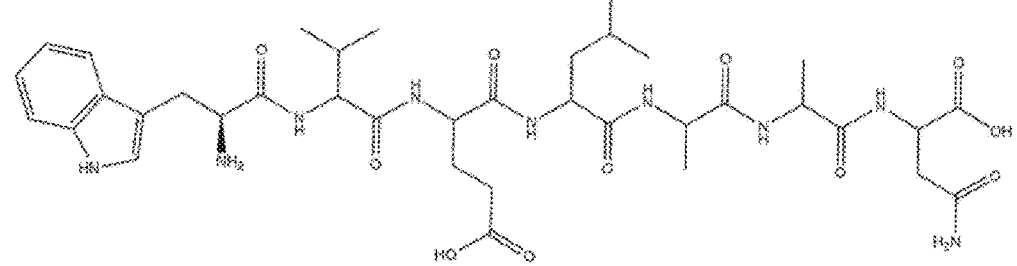
Figure 6:
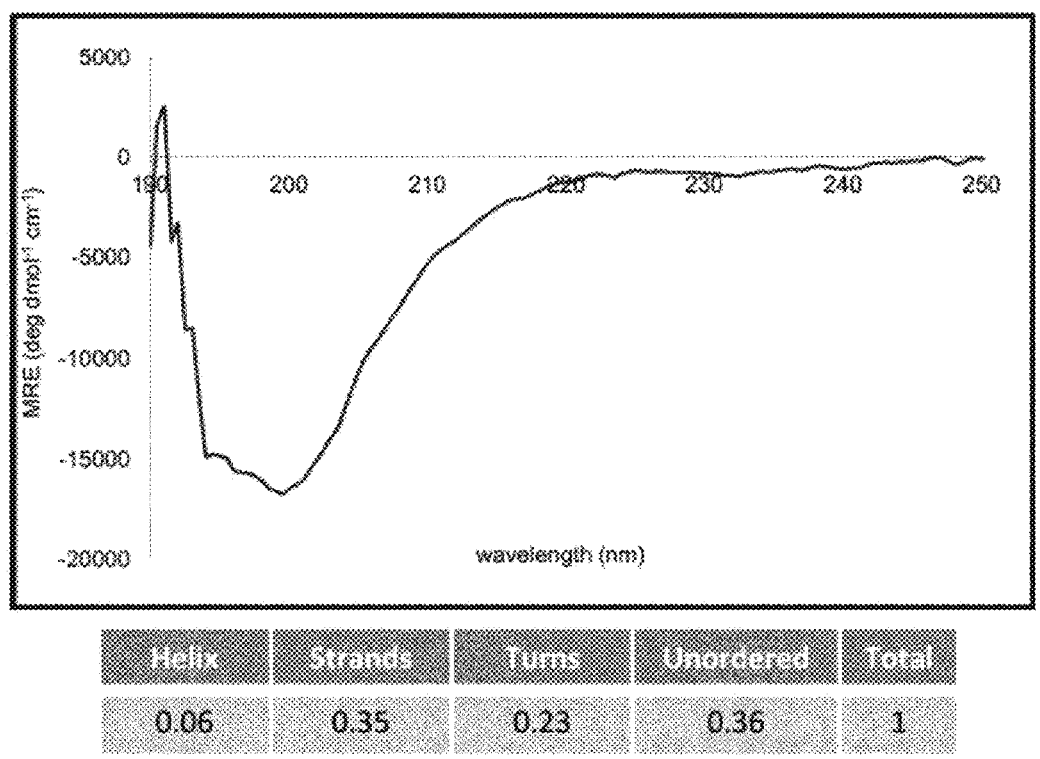

Based on these results, we designed the BNIP3-8B peptide, composed of the PTD attached via a covalent bond to 8 amino acids derived from amino acids 13-20 of BNIP3 with the Ser-19 to Phe-19 substitution (WVELHFFN (SEQ ID NO: 8); FIG. 6A). To demonstrate the need for the residue phenylalanine in the peptide sequence, we substituted Phe-18 to Ala-18, additionally His-17 to Ala-17, and generated the BNIP3-8C peptide (FIG. 6B). Circular dichroism spectrum of BNIP3-8B showed that the peptide exhibits a random coil conformation (FIG. 6C).

Furthermore, BNIP3/BNIP3 interaction studies were performed with the BNIP3-20A peptide in which single residues of the wild-type sequence of BNIP3 1-20 were exchanged for 18 neutral amino acids. BNIP3 peptides with specific amino acid substitutions showed an increased binding capacity to BNIP3 (exemplary data shown in Table 2).

TABLE 2

Substituted BNIP3-20A peptides showing the highest binding capacities to BNIP3

| Sequence (SEQ ID NO) | Amino acid substitution | Fluorescence intensity |
| --- | --- | --- |
| MSQSGEENLQG SWVELHFSN (21) | — | 1040.33 |
| MSQSGEENLQG SWVELCFSN (70) | H17 -> C | 6787.00 |
| MSQSGEENLQG CWVELHFSN (71) | S12 -> C | 7038.00 |
| MSQSGEENLQG SWVCLHFSN (72) | E15 -> C | 7149.00 |
| MSQSGEENLQG SWVELYFSN (73) | H17 -> Y | 7988.00 |
| MSQSGYENLQG SWVELHFSN (74) | E6 -> Y | 13122.50 |
| MSQSGEENLQY SWVELHFSN (75) | G11 -> Y | 10230.33 |
| MSQSGEENLQG SWVELHFFN (22) | S19 -> F | 15000.00 |

Figure 7:
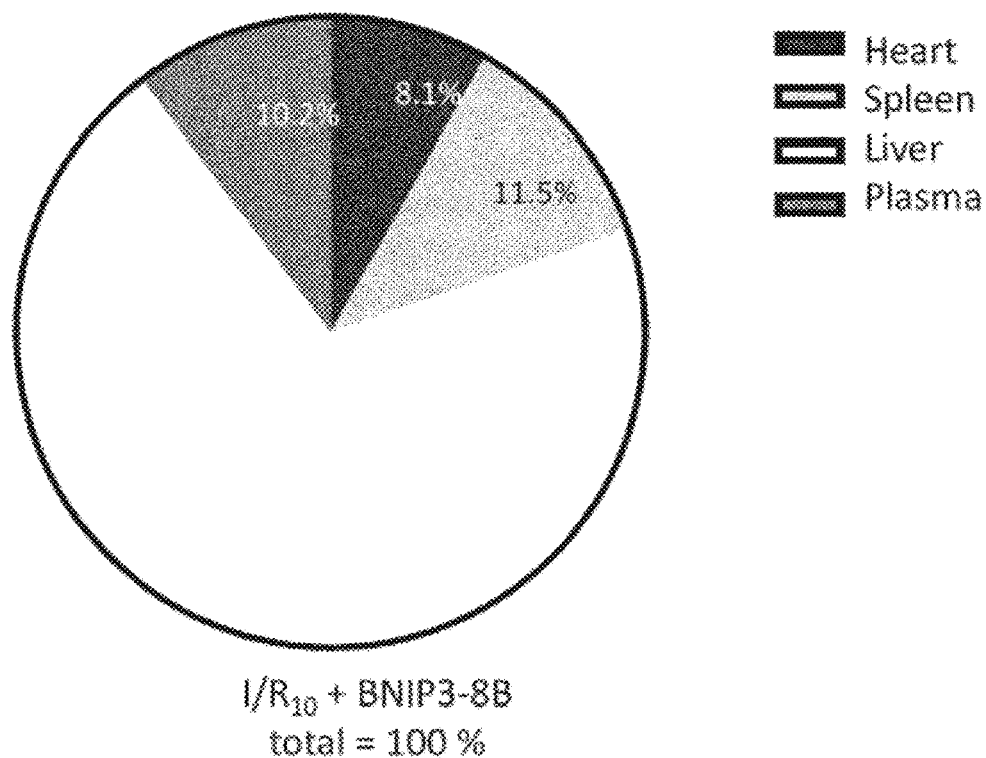
FIG. 7. A Uptake of fluorescence labelled TAT-BNIP3-8B in different organs after 5 min of reperfusion post vessel occlusion. TAT-BNIP3-8B was given 5 min before starting reperfusion. B Survival of isolated adult cardiomyocytes treated with TAT-BNIP3-8B and TAT-BNIP3-8C control peptide after 24 h.
Figure 7:
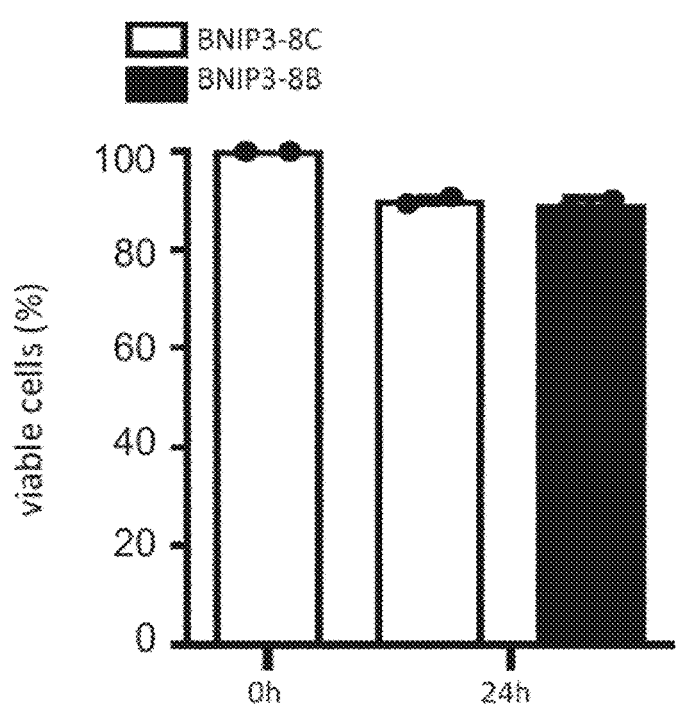
Figure 8:
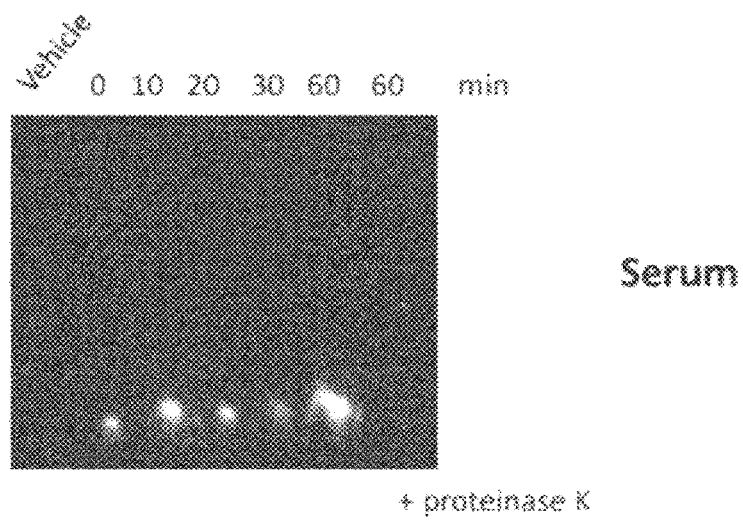
FIG. 8. TAT-BNIP3-8B pharmacokinetics. Fluorescence labelled BNIP3-8B was incubated in human serum (A), plasma (B), and whole blood (C) at 37° C. for indicated time durations and monitored by Western blot. Proteinase K treatment served as control.
Figure 8:
Figure 8:
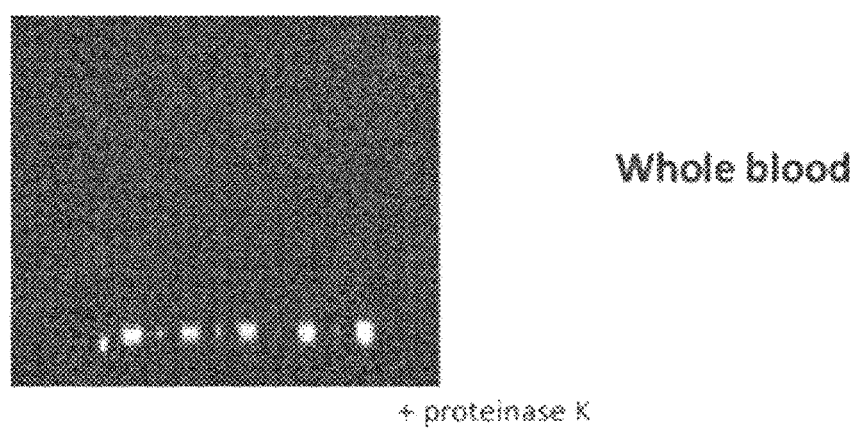

Example 6: In Vitro and In Vivo Effects of TAT-BNIP3-8B Peptide Fragment Up-Take, Toxicity and Stability First, we assessed the distribution and presence of BNIP3-8B on intracardiac injection at the time of desired effect in vivo. We next evaluated the pharmacokinetic profile of TAT-BNIP3-8B in human serum, plasma and whole blood and evaluated the toxicity in isolated adult cardiomyocytes. The TAT-BNIP3-8B is taken up by the heart, spleen and liver and is present in the plasma (FIG. 7A). Thus, TAT-BNIP3-8B is present in the heart 10 min after reperfusion, the time point when the BNIP3-BAX-mitochondria triangle cell death cascade occurs; cardiomyocytes showed no signs of overt toxicity (FIG. 7B), and the half-life of TAT-BNIP3-8B in human serum, plasma and whole blood enables its in vivo inhibitory capacity (FIG. 8A-C). Incubation of TAT-BNIP3-8B with proteinase K served as control.

Example 7: TAT-BNIP3-8B Peptide Mechanism of Action

It was hypothesized that TAT-BNIP3-8B binds to BNIP3 and BAX monomers and homodimers and to BNIP3/BAX heterodimers and heterooligomers to interrupt their activity. To assess the interaction behavior of TAT-BNIP3-8B, BNIP3/TAT-BNIP3-8B as well as BAX/TAT-BNIP3-8B-overlay assays and docking simulations were performed. Both results suggested that TAT-BNIP3-8B binds to BNIP3 and to BAX (Data not shown).

Figure 9:
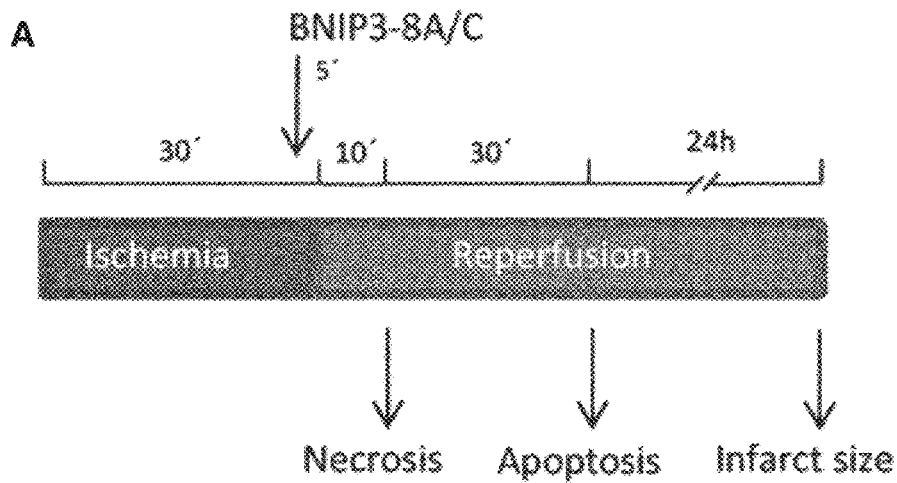
FIG. 9. TAT-BNIP3-20A reduces myocardial infarct size in vivo. A Schematic of the in vivo myocardial infarction model. Mice were exposed to 5 min and 24 h of reperfusion after vessel occlusion, respectively. The peptide was given into the left ventricle 5 min before starting reperfusion. B Western blot monitoring of TAT-BNIP3-8B co-immunoprecipitated with BNIP3 and BAX 5 min after reperfusion. C Immunoblot for cytosolic BNIP3 and BAX in the area at risk following blue native-PAGE at baseline and 10 minutes reperfusion. Mice were treated with vehicle (NaCl) and TAT-BNIP3-8B. Sham operated mice served as controls. Figure discloses SEQ ID NO: 8. D, E Infarct sizes post 24 h of reperfusion in wild-type mice treated with vehicle, TAT-ß-Gal, control peptide TAT-BNIP3-8C and indicated TAT-BNIP3-8B doses (n=7-10 mice). TAT-BNIP3-8B significantly reduces the infarct size in a dose-dependent manner. Vehicle, TAT-β-Gal, and TAT-BNIP3-8C were not effective to attenuate the infarction.
Figure 9:
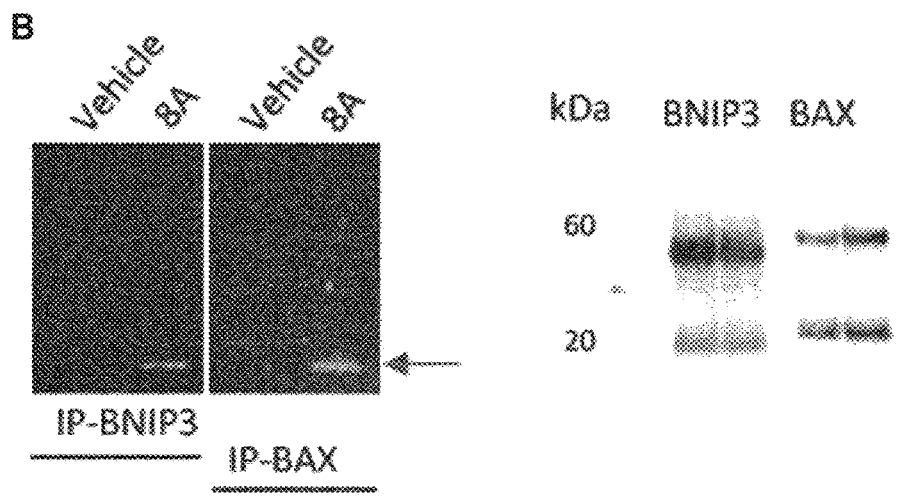
Figure 9:
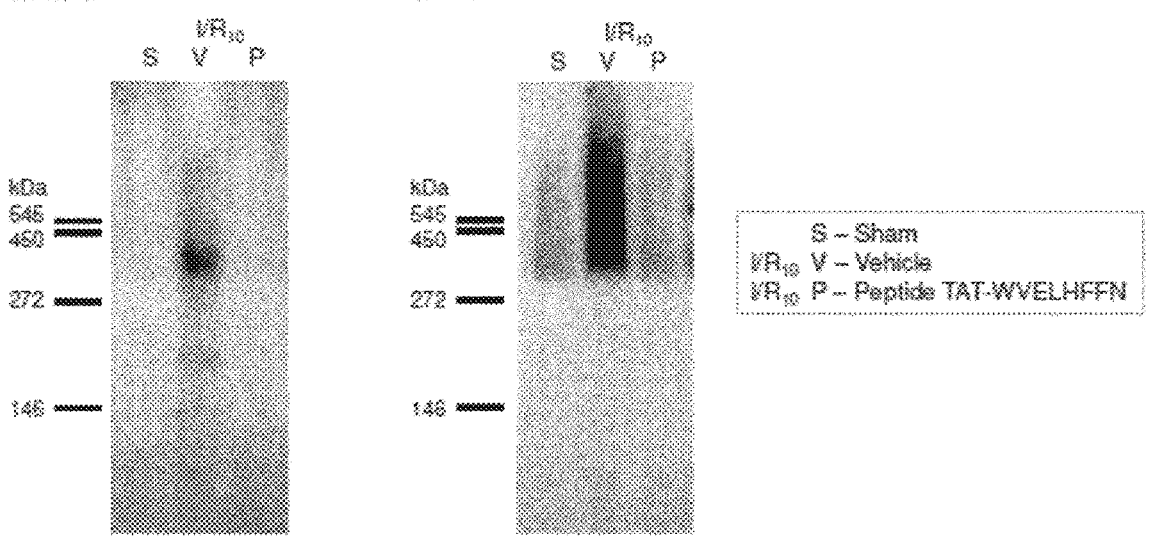
Figure 10:
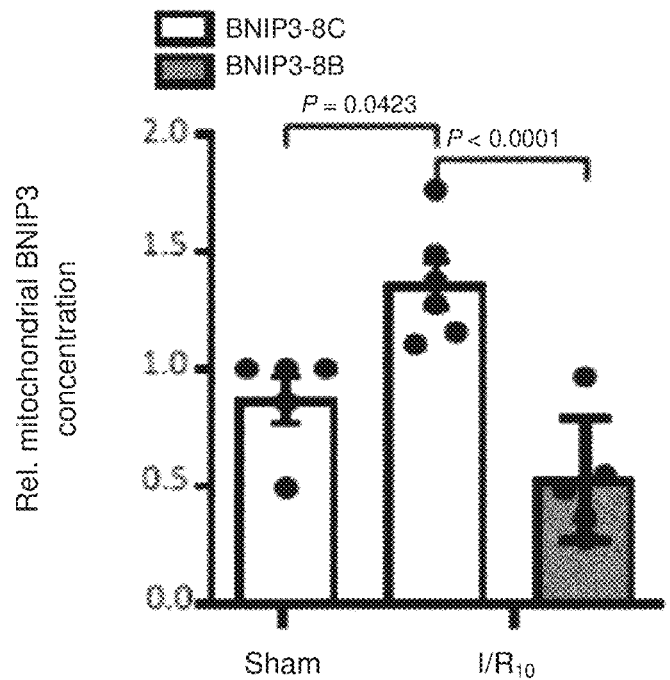
FIG. 10. BNIP3-8B diminishes myocardial reperfusion injury in vivo. Mice were exposed to the indicated reperfusion time durations after vessel occlusion in vivo. The peptide was given into the left ventricle 5 min before starting reperfusion. TAT-BNIP3-8B inhibits BNIP3 (A) and BAX (B) interaction with mitochondria after 10 min of reperfusion, mitochondrial swelling after 10 min of reperfusion (C), BAX activation after 30 min of reperfusion (D), cytochrome c release after 30 min of reperfusion (E), and caspase-3 activity after 4 h of reperfusion (F), whereas the control peptide TAT-BNIP3-8C does not (n=5-12 mice). Sham-operated mice served as control (n=5-8 mice). Data are mean±s.e.m. Statistical analyses are two-way analysis of variance (ANOVA) with Bonferroni's correction.
Figure 10:
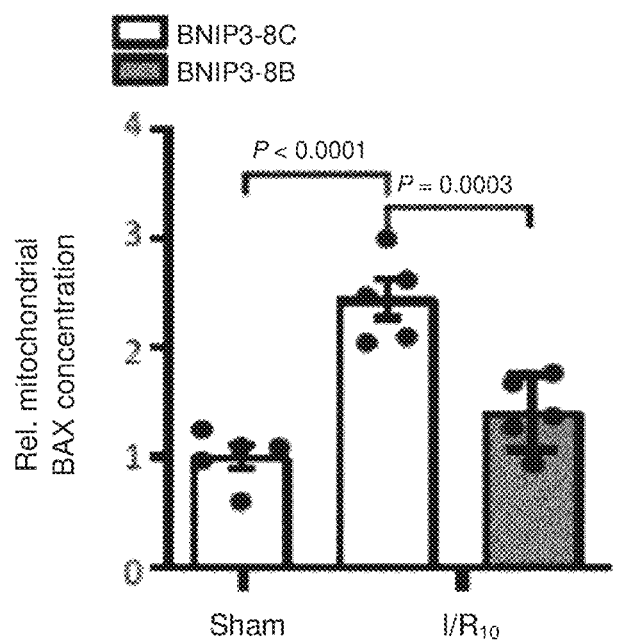

Notably, in the myocardial infarction model (FIG. 9A), 5 min post reperfusion endogenous BNIP3 and BAX mono, homo- and heterodimers co-immunoprecipitated with the fluorescence-labelled TAT-BNIP3-8B (FIG. 9B). Furthermore, reperfusion drove BNIP3 and BAX to oligomerize evidenced by large-scale formation of oligomers consisting of BNIP3 and 3 BAX (FIG. 9C). SDS-PAGE and co-immunoprecipitation experiments unmask BNIP3/BAX hetero-interactions in higher order oligomeric complexes, and this oligomerization was strongly inhibited by treatment with TAT-BNIP3-8B (FIG. 9C).

Example 8: TAT-BNIP3-8B Reduces Myocardial Infarct Size

Then we studied the efficacy and the effect of TAT-BNIP3-8B treatment given 5 min before starting reperfusion in the appropriate myocardial infarction model (FIG. 9A). Notably, TAT-BNIP3-8B reduces the infarct size in a dose-dependent manner up to 40% in comparison to vehicle, and TAT-ß-Gal treatment (FIGS. 9D and E). TAT-BNIP3-8C treatment does not appreciably affect the infarct size relative to TAT-BNIP-8B pointing to the importance of the phenylalanine residue (FIG. 9D).

Example 9: TAT-BNIP3-8B Reduces Mitochondrial Perturbation and Cell-Death Cascade Mitochondrial damage can occur by perturbation of the mitochondrial inner membrane (MIM) and the MOM. The critical mitochondrial event in necrosis is the early opening of the mitochondrial permeability transition pore (mPTP) in the MIM[50] causing a time-dependent dissipation of electrical potential difference across the MIM followed by mitochondrial swelling and cell disruption. The key mitochondrial event in apoptosis is BAX activation inducing its transmembrane domain exposure and MOM permeabilization allowing apoptogen release, e.g., cytochrome c and subsequent caspase activation[51]. TAT-BNIP3-8B injected into the left ventricle 5 min before reperfusion in the given I/R model in vivo prevents BNIP3 and BAX translocation to the mitochondria resulting in the inhibition of the downstream cell death machinery including mitochondrial swelling, BAX activation, cytochrome c release and caspase-3 activity.

Figure 11:
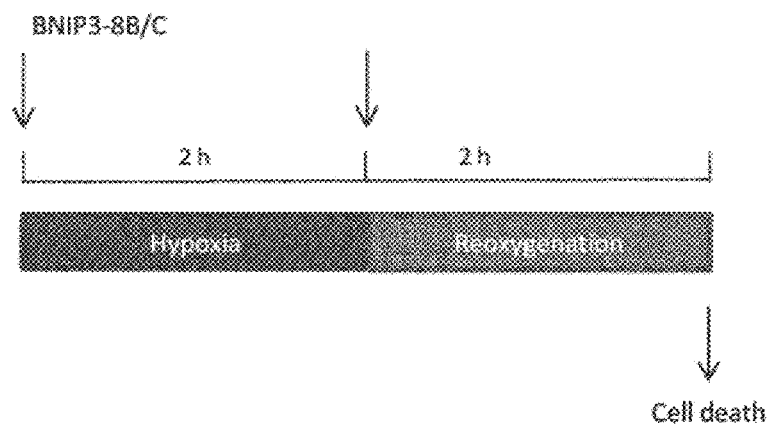
FIG. 11. A Schematic of the in vitro reoxygenation study design in human ventricular cardiomyocytes derived from human induced pluripotent stem cells (humanCM). HumanCM were exposed to normoxia and 2 h of reoxygenation after hypoxia and were treated with the TAT-BNIP3-8B and the control peptide TAT-BNIP3-8C. B TAT-BNIP3-8B potently inhibits humanCM death in reoxygenation. Representative images of apoptotic, necrotic and healthy humanCM. C TAT-BNIP3-8B attenuates loss of mitochondrial inner membrane potential induced by reoxygenation. Representative images of depolarized mitochondria, healthy mitochondria, nucleus. Scale bars, 200 μm. Control peptide BNIP3-8C was not effective to inhibit cell death and loss of mitochondrial inner membrane potential. Data are mean±s.e.m. Statistical analyses are two-way analysis of variance (ANOVA) with Bonferroni's correction.
Figure 11:
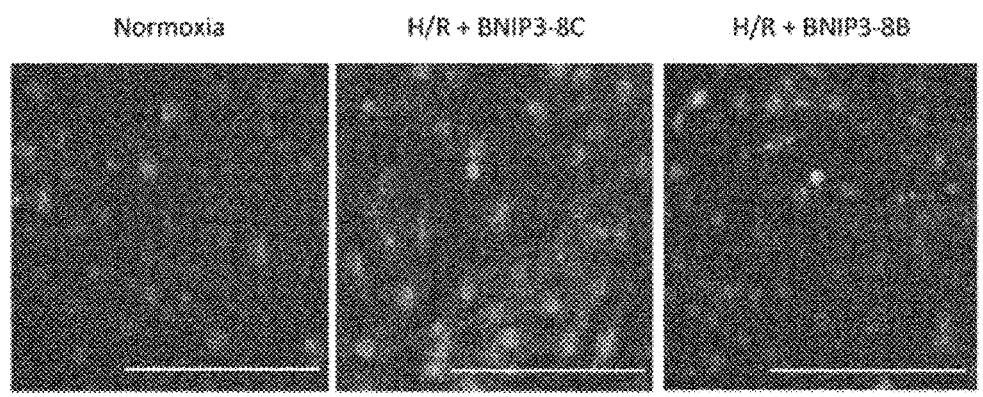
Figure 11:
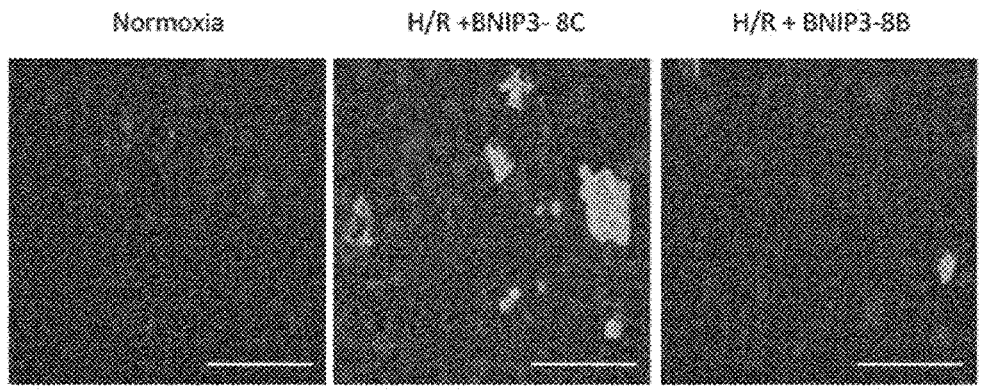

Example 10: TAT-BNIP3-8B Inhibits Apoptotic and Necrotic Cardiomyocyte Death It was tested if TAT-BNIP3-8B can inhibit cell death in humanCM. The humanCM were exposed to 2 h of reoxygenation after hypoxia (FIG. 11A). BNIP3-8B markedly inhibits necrotic and apoptotic cell death (FIG. 11B) and loss of mitochondrial inner membrane potential (FIG. 11C).

Example 11: TAT-BNIP3-8B Reduces Cerebral Infarct Size

Figure 12:
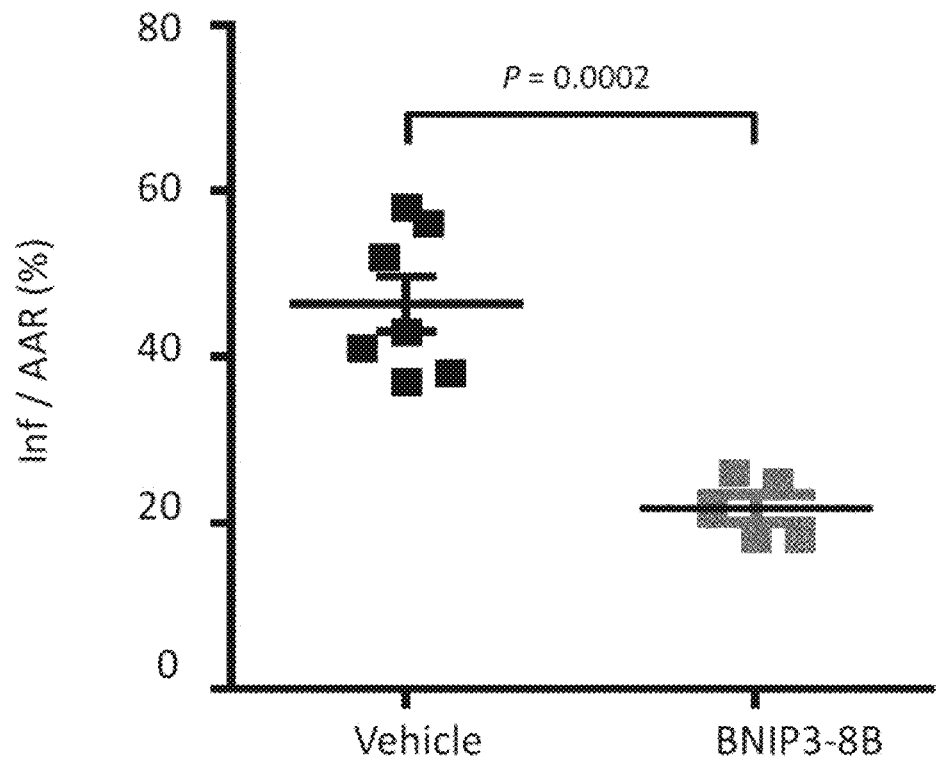
FIG. 12. TAT-BNIP3-8B reduces brain infarct sizes after 24 h of reperfusion following a transient middle cerebral artery occlusion and in comparison to vehicle treatment. TAT-BNIP3-8B and vehicle were given immediately before reperfusion. Data are mean±s.e.m. Unpaired Student's t-test was used, and statistical significance was set at the level of P<0.05.

Since BNIP3 is suggested to play a critical role in cerebral ischemia[38], we also evaluated the effects of the BNIP3-8B peptide on clinical outcome in a mouse model of focal cerebral reperfusion. We subjected mice to 24 h of reperfusion after a 30-min transient middle cerebral artery occlusion (tMCAO). BNIP3-8B treatment immediately post tMCAO markedly reduces the infarct size by 52% (FIG. 12).

Example 12: TAT-BNIP3-8B Reduces Myocardial Infarct Size in Swine

Figure 13:
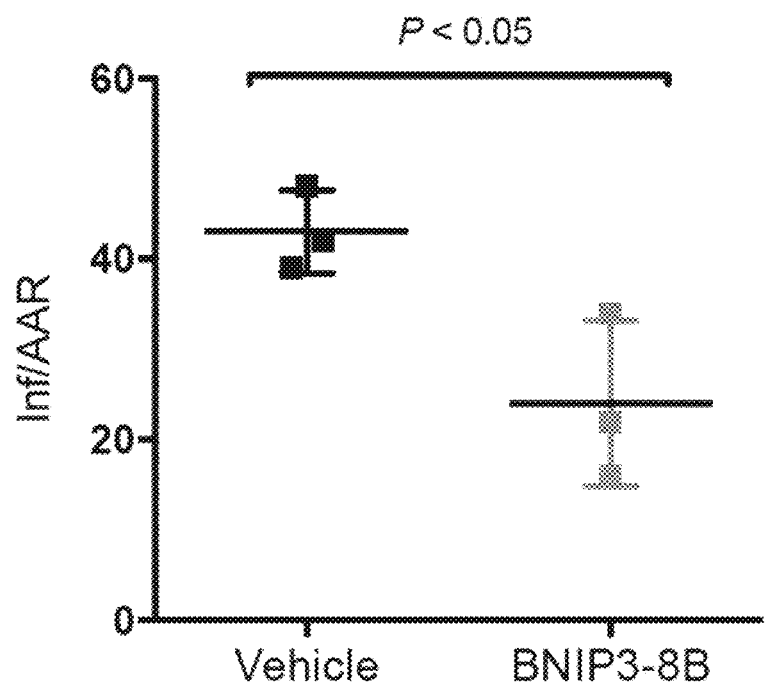
FIG. 13. TAT-BNIP3-8B reduces myocardial infarct sizes after 4 h of reperfusion following left coronary artery occlusion and in comparison to vehicle treatment in swine. TAT-BNIP3-8B and vehicle were given 5 min before reperfusion. Data are mean±s.e.m. Unpaired Student's t-test was used, and statistical significance was set at the level of P<0.05.

Then we studied the efficacy and the effect of TAT-BNIP3-8B treatment given 5 min before starting reperfusion in a myocardial infarction model in swine. Pigs were subjected to a 60 min occlusion of the left anterior descending coronary artery followed by 4 h of reperfusion. Notably, TAT-BNIP3-8B markedly reduces the infarct size by 56% in comparison to vehicle (FIG. 13).

Figure 14:
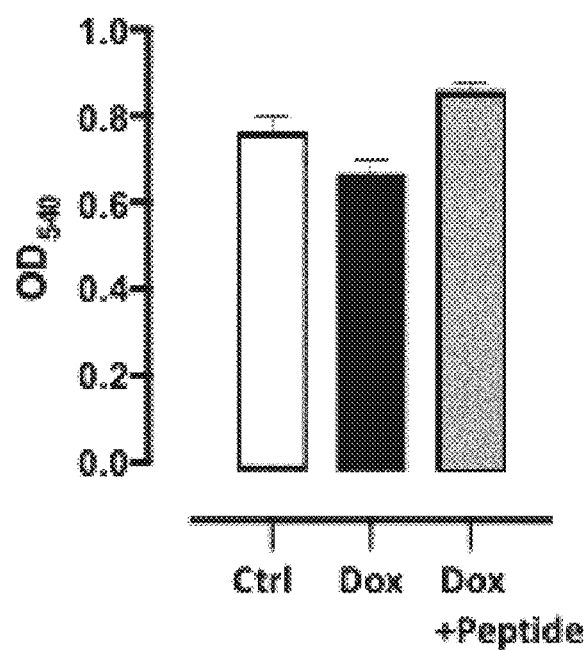
FIG. 14. TAT-BNIP3-8B protects against Doxorubicin-induced mitochondrial injury by preventing mitochondrial swelling. HL-1 cells were treated with 5 μM Doxorubicin without or together with TAT-BNIP3-8B and swelling of the mitochondria was determined by optical density, wherein swollen mitochondria have a lower $OD_{540}$. Untreated cells were used as control.

Example 13: TAT-BNIP3-8B Protects Against Doxorubicin-Induced Mitochondrial Injury We evaluated the effects of the BNIP3-8B peptide on Doxorubicin-induced mitochondrial injury in HL-1 cells. To monitor mitochondrial swelling, HL-1 cells were treated with 5 µM Doxorubicin, reproducing the plasma peak concentration reached by standard infusion in patients. Swelling of mitochondria was measured by optical density at 540 nm, where increased mitochondrial volume due to swelling results in reduced optical density. TAT-BNIP3-8B given simultaneously with Doxorubicin prevents mitochondrial swelling, as indicated by increased $OD_{540}$ (FIG. 14). These data indicate that TAT-BNIP3-8B can protect mitochondria against damage mediated by chemotherapies such as anthracyclines.

Example 14: Methods

Chemicals were obtained from Sigma Aldrich. Antibodies against BNIP3, tubulin, cytochrome c, and BAX were obtained from Abcam and activated BAX from Enzo.

Animals. Male mice with similar age (12±3 weeks) and an average body weight of 30 g were used. C57BL/6 wild-type mice were obtained from Jackson Laboratory (Bar Harbor, ME, USA) and kept for one week in the local animal house for acclimatization.

C57BL/6J-TgH (Bnip3$^{-/-}$) mice were obtained from Prof. Gerald W. Dorn, Center for Molecular Cardiovascular Research and Department of Pediatrics, University of Cincinnati, Cincinnati, Ohio, USA. The mice were generated by replacing exons 2 and 3 with a neomycin resistance cassette[33]. The mice were bred and hold in the local animal house of the University Hospital Essen. All experiments were approved by the local ethics committee in compliance with the European Convention for the Protection of Vertebrate Animals Used for Experimental and other Scientific Purposes (Directive 2010/63/EU).

In vivo myocardial infarction model in mice. Wild-type and Bnip3 deficient (Bnip3$^{-/-}$) mice were anesthetized by i.p. injection of ketamine (100 mg/kg) and xylazin (10 mg/kg) and intubated. Mechanical ventilation parameters were set to a tidal volume of 2.1 to 2.5 ml and a respiratory rate of 140 breaths per min using a mouse mini-ventilator. Deep anaesthesia was maintained by adding 2 vol % isoflurane to the ventilation gas. The chest was opened through a lateral thoracotomy (1 cm left lateral incision between the 3rd and 4th ribs). A 6-0 prolene suture was placed around the left coronary artery (LCA) and a piece of soft silicon tubing placed over the artery. Coronary occlusion was achieved by tightening and tying the suture. After 30 min of occlusion, the silicon tubing was removed and the suture left in place. For longer reperfusion times the chest were closed using 4-0 prolene. 2, 6 and 9 nmol (in 50 µl 0.9% sodium chloride) BNIP3 were injected into the left ventricular cavity 5 min before vessel occlusion. Peptides with 20 amino acids (2 nmol/50 µl) and peptides with 8 amino acids (8 nmol/50 µl) in NaCl were injected 5 min before reperfusion. Sodium chloride injection (50 µl) served as control treatment.

In vivo myocardial infarction model in pigs. Following induction of anesthesia, a small incision was made over the femoral artery and vein; the vessels were isolated. A small opening was made in the artery and a sheath was introduced. In addition, a sheath was placed in the femoral vein or other appropriate vein to allow for emergency drug administration if necessary. A blood sample was taken prior to administration of heparin and was used to establish a baseline Activated Clotting Time (ACT) which was recorded. Subsequently, as directed by the surgeon, heparin (250 to 350 IU/kg) was administered as needed to achieve and maintain an ACT that is two times the level of the baseline ACT. Following the initial bolus of heparin ACT was recorded again and monitored at least every 60 minutes thereafter, until completion of surgery.

An appropriate guide catheter was advanced into the ostium of the left anterior descending artery (LAD) using visual guidance provided by fluoroscopy. Non-ionic contrast was used for all procedures. A balloon catheter was introduced by advancing it through the guide catheter to the left anterior descending (LAD) coronary artery. The balloon was advanced into the coronary arteries through a guide catheter to a suitable place above the 1st diagonal branch of the LAD. The balloon was then be inflated to a pressure sufficient to ensure complete occlusion of the artery. Occlusion of the artery was verified using fluoroscopy. After verification of occlusion, the balloon was left inflated in the artery for 60 minutes. Incidence supportive drugs and defibrillation were recorded in the study record. The peptide and the vehicle, respectively was administered via IV injection 5 minutes prior to reperfusion. At the end of the vessel occlusion period, the balloon was deflated and the ischemic area was allowed to reperfuse. Complete balloon deflation was verified with fluoroscopy. At the end of the procedure all catheters were removed and the artery and vein was ligated and the incision was closed in a standard fashion. 4 hours after reperfusion, animals were euthanized.

Infarct size measurement. For analysis of infarct size, mice were euthanized after 24 hours of reperfusion; hearts were excised and perfused with PBS over 5 min. After perfusion, the LCA was re-ligated in the same location as explicated before. Evans blue dye (1 ml of a 1% solution) was injected into the aorta and coronary arteries for delineation of the ischemic AAR from the non-ischemic zone. The tissue was wrapped in a clear food wrap and stored for one hour in a −20° C. freezer. The heart was then serially sectioned perpendicularly to the long axis in 1 mm slices, and each slice was weighed. The sections were incubated in 1% TTC for 5 min at 37° C. for demarcation of the viable and non-viable myocardium within the risk zone. Infarction, AAR, and non-ischemic left ventricle were assessed with computer-assisted planimetry by an observer blinded to sample identity. The size of the myocardial infarction was expressed as a percentage of the AAR.

Immunoblotting. Tissue and human CM cells were lysed in a RIPS buffer (50 mM Tris-HCl, 150 mM NaCl, 0.5 mM EDTA, 1% NP-40 and protease- and phosphatase inhibitor, pH 7.4). Isolated mitochondria were lysed in a Mito-lyse buffer (200 mM sucrose, 10 mM HEPES, 1 mM EGTA, 1% Triton-X100 and protease- and phosphatase inhibitor, pH 7.4). The lysates were cleared by centrifugation (20.000×g, 15 min, 4° C.). Protein concentrations in supernatant were measured using DC Protein Assay (Bio-Rad). Samples were diluted into 4×LDS sample buffer and 10× Reducing Agent (Invitrogen) and were prepared for SDS-PAGE by heating to 95° C. for 5 min. Equivalent amounts of protein were separated using 4-12% Bis-Tris Gels (Invitrogen), transferred on to nitrocellulose and immunoblotted with primary antibodies. The used secondary antibodies were horseradish peroxidise conjugated goat anti-mouse or anti-rabbit IgG (Invitrogen). Immunoblotting was detected by ECL (Thermo Scientific) and imaged on an Imager 600 (Amersham).

Interaction studies. For protein-peptide interaction studies, peptide libraries were synthesised and immobilised on microarray slides. Recombinant BNIP3 was used at concentrations of 1 µg/ml. Peptides were synthesised and immobilised for: (i) the BNIP3/BAX interaction study; (ii) the BNIP3/BNIP3 interaction study, in which C-, N- or C/N-terminal truncations of the wild-type sequence of BNIP3 1-20 were performed; and (iii) the BNIP3/BNIP3 interaction study, in which single residues of the wild-type sequence of BNIP3 1-20 were exchanged for 18 neutral amino acids.

Microarray. For protein-peptide binding studies recombinant BNIP3 (cusabio) and BAX (MyBioSource) were used in a concentration of 10 µg/ml resp. 1 µm/ml. As labelling kit a DyLight Microscale Antibody Labeling Kit (Thermo) with label Dylight 650 was used. The assay was performed using the automated TECAN HS4800 microarray processing station. Microarrays were incubated with customer provided samples diluted in blocking buffer for 2 h at 30° C. Before each step, microarrays were washed with washing buffer. Microarrays were scanned using a high-resolution fluorescence scanner. Laser settings and applied resolution were identical for all performed measurements. The resulting images were analyzed und quantified using spot-recognition software GenePix (Molecular Devices). For each spot, the mean signal intensity was extracted (between 0 and 65535 arbitrary units). For further data evaluation, the so called MMC2 values were determined. The MMC2 equals the mean value of all three instances on the microarray except when the coefficient of variation (CV)—standard-deviation divided by the mean value—is larger 0.5. In this case the mean of the two closest values (MC2) is assigned to MMC2. All steps were performed by JPT Peptide Technologies (Berlin, Germany).

Three dimensional (3D) structure modelling of BNIP3 in silico. The predicted in silico 3D structure of BNIP3 was obtained by homology modelling using Modeller9.15 and the created model was energy minimized using NAMD2.9 and the CHARMM36 force field.

Circular dichroism (CD) spectroscopy. CD spectra of the BNIP3 protein and BNIP3-8B peptide were recorded on a Jasco J-715 spectropolarimeter at 37° C., pH=7.4, 1×PBS.

Docking Simulation. Experiments were performed using Autodock Vina[52] and HADDOCK[53]. The structure of BAX (pdb-ID: 4S0O) was taken from the Protein Data Bank, whereas the structure of BNIP3 and peptide BNIP3-8B were modelled using Modeller9.15[47]. The template structures correspond to PDB codes 2k7w and 2ka1. The created model was energy minimized using NAMD2.9[54] and the CHARMM36 force field.

Immunoprecipitation. Immunoprecipitation were performed using protein G-coupled Dynabeads (Invitrogen). 500 µg lysed proteins were incubated with 2 µg antibody over night at 4° C. with shaking in PBS buffer containing 1 mM DTT, 0.005% Brij35 and protease-phosphatase inhibitors. Next day 20 µl Dynabeads were added and the solution was incubated again for 1 h. The precipitated immune complex was washed 2 times and then resuspended in eluation buffer containing LDS-Sample Buffer (1:4) und Reducing Agent (1:10) (Invitrogen) in PBS and heated for 5 min at 95° C. After removal of the Dynabeads the Eluate were analysed via immunoblotting.

Caspase-3 activity was measured using the Caspase 3 Assay Kit from Abcam (#ab39401). Murine hearts were harvested after 30 min ischemia and 4 h reperfusion, area at risk was isolated, lysed in containing buffer and the assay was performed according to manufacturer's instructions.

Cell culture. Human iPSC-derived ventricular cardiomyocytes (humanCM) were obtained from (axol) and were cultivated according to the manufacture's specification.

To simulate vessel occlusion, cells were incubated in buffer (113 mM NaCl, 4.7 mM KCl, 12 mM HEPES, 1.2 mM $MgSO_4$, 30 mM taurine, 1.3 mM $CaCl_2$), pH 7.4) under 1% $O_2$, 37° C. Reoxygenation was performed in buffer supplemented with 5.5 mM glucose under 21% $O_2$, 37° C.

HL-1 cells were cultured in Claycomb medium as per manufacturer's protocol. The cells were treated with 5 µM Doxorubicin and 2 nmol TAT-BNIP3-8B for 30 min.

JC-1 Assay. To analyze mitochondrial inner membrane potential in humanCM cells were stained with 5',6,6'-tetrachloro-1,1',3,3'-tetraethylbenzimidazolylcarbocyanin Iodid (JC-1). Cells were incubated with 6 µM JC-1 in media at 37° C. for 30 min. After washing cells with PBS buffer at 37° C. they were fixed with 4% PFA for 15 min at room temperature. DAPI staining was performed and cells were analysed using EVOS FL (life Technologies).

Swelling Assay. Mitochondrial swelling was measured by light scattering at 540 nm in a microplate absorbance reader FLUOstar Omega (BMG Labtech) at RT. The final assay volume was 200 µl, containing mitochondria at 0.5 mg/ml in buffer containing 250 mM sucrose, 10 mM HEPES, 1 m EGTA, pH 7.4.

Peptides. The peptides were generated by the resin synthesis procedure (JPT International, Berlin, Germany). They were capped at the N-terminus with an acetyl group and at the C-terminus with an ameide. For delivery, the peptides were attached via a covalent bond to the TAT-sequence GRKKRRQRRRPQ (SEQ ID NO: 31). For uptake and binding studies, peptides were labelled with a fluorophore. A complete peptide list is attached as appendix 1.

BIBLIOGRAPHY

1 Zipes, D., Libby, P., Bonow, R. & Mann, D. Braunwald's Heart Disease: A Textbook of Cardiovascular Medicine. Elsevier/Saunders 10th Edition (2015).
2 Yellon, D. M. & Hausenloy, D. J. Myocardial reperfusion injury. N Engl J Med 357, 1121-1135, (2007).
3 Cahill, T. J. & Kharbanda, R. K. Heart failure after myocardial infarction in the era of primary percutaneous coronary intervention: Mechanisms, incidence and identification of patients at risk. World J Cardiol 9, 407-415, (2017).
4 Christia, P. & Frangogiannis, N. G. Targeting inflammatory pathways in myocardial infarction. Eur J Clin Invest 43, 986-995, (2013).
5 Whelan, R. S. et al. Bax regulates primary necrosis through mitochondrial dynamics. Proc Natl Acad Sci USA 109, 6566-6571, (2012).
6 Avila, M. S. et al. Carvedilol for Prevention of Chemotherapy-Related Cardiotoxicity: The CECCY Trial. J Am Coll Cardiol 71, 2281-2290, (2018).

7 Gulati, G. et al. Prevention of cardiac dysfunction during adjuvant breast cancer therapy (PRADA): a 2×2 factorial, randomized, placebo-controlled, double-blind clinical trial of candesartan and metoprolol. Eur Heart J 37, 1671-1680, (2016).

8 Pituskin, E. et al. Multidisciplinary Approach to Novel Therapies in Cardio-Oncology Research (MANTICORE 101-Breast): A Randomized Trial for the Prevention of Trastuzumab-Associated Cardiotoxicity. J Clin Oncol 35, 870-877, (2017).

9 Baines, C. P. The cardiac mitochondrion: *nexus* of stress. Annu Rev Physiol 72, 61-80, (2010).

10 Ong, S. B., Samangouei, P., Kalkhoran, S. B. & Hausenloy, D. J. The mitochondrial permeability transition pore and its role in myocardial ischemia reperfusion injury. J Mol Cell Cardiol 78, 23-34, (2015).

11 Kokoszka, J. E. et al. The ADP/ATP translocator is not essential for the mitochondrial permeability transition pore. Nature 427, 461-465, (2004).

12 Baines, C. P., Kaiser, R. A., Sheiko, T., Craigen, W. J. & Molkentin, J. D. Voltage-dependent anion channels are dispensable for mitochondrial-dependent cell death. Nat Cell Biol 9, 550-555, (2007).

13 Kwong, J. Q. et al. Genetic deletion of the mitochondrial phosphate carrier desensitizes the mitochondrial permeability transition pore and causes cardiomyopathy. Cell Death Differ 21, 1209-1217, (2014).

14 Basso, E. et al. Properties of the permeability transition pore in mitochondria devoid of Cyclophilin D. J Biol Chem 280, 18558-18561, (2005).

15 Bonora, M. et al. Role of the c subunit of the FO ATP synthase in mitochondrial permeability transition. Cell Cycle 12, 674-683, (2013).

16 Giorgio, V. et al. Dimers of mitochondrial ATP synthase form the permeability transition pore. Proc Natl Acad Sci USA 110, 5887-5892, (2013).

17 Argaud, L. et al. Specific inhibition of the mitochondrial permeability transition prevents lethal reperfusion injury. J Mol Cell Cardiol 38, 367-374, (2005).

18 Skyschally, A., Schulz, R. & Heusch, G. Cyclosporine A at reperfusion reduces infarct size in pigs. Cardiovasc Drugs Ther 24, 85-87, (2010).

19 Cung, T. T. et al. Cyclosporine before PCI in Patients with Acute Myocardial Infarction. N Engl J Med 373, 1021-1031, (2015).

20 Gibson, C. M. et al. EMBRACE STEMI study: a Phase 2a trial to evaluate the safety, tolerability, and efficacy of intravenous MTP-131 on reperfusion injury in patients undergoing primary percutaneous coronary intervention. Eur Heart J 37, 1296-1303, (2016).

21 Szeto, H. H. First-in-class cardiolipin-protective compound as a therapeutic agent to restore mitochondrial bioenergetics. Br J Pharmacol 171, 2029-2050, (2014).

22 Schaller, S. et al. TRO40303, a new cardioprotective compound, inhibits mitochondrial permeability transition. J Pharmacol Exp Ther 333, 696-706, (2010).

23 Atar, D. et al. Effect of intravenous TRO40303 as an adjunct to primary percutaneous coronary intervention for acute ST-elevation myocardial infarction: MITOCARE study results. Eur Heart J 36, 112-119, (2015).

24 Rupprecht, H. J. et al. Cardioprotective effects of the Na (+)/H (+) exchange inhibitor cariporide in patients with acute anterior myocardial infarction undergoing direct PTCA. Circulation 101, 2902-2908, (2000).

25 Chi, L. G. et al. Effect of superoxide dismutase on myocardial infarct size in the canine heart after 6 hours of regional ischemia and reperfusion: a demonstration of myocardial salvage. Circ Res 64, 665-675, (1989).

26 Arai, M. et al. An anti-CD18 antibody limits infarct size and preserves left ventricular function in dogs with ischemia and 48-hour reperfusion. J Am Coll Cardiol 27, 1278-1285, (1996).

27 Williams, F. M., Kus, M., Tanda, K. & Williams, T. J. Effect of duration of ischaemia on reduction of myocardial infarct size by inhibition of neutrophil accumulation using an anti-CD18 monoclonal antibody. Br J Pharmacol 111, 1123-1128, (1994).

28 Wei, M. C. et al. Proapoptotic BAX and BAK: a requisite gateway to mitochondrial dysfunction and death. Science 292, 727-730, (2001).

29 Ow, Y. P., Green, D. R., Hao, Z. & Mak, T. W. Cytochrome c: functions beyond respiration. Nat Rev Mol Cell Biol 9, 532-542, (2008).

30 Oberst, A., Bender, C. & Green, D. R. Living with death: the evolution of the mitochondrial pathway of apoptosis in animals. Cell Death Differ 15, 1139-1146, (2008).

31 Hamacher-Brady, A. et al. Response to myocardial ischemia/reperfusion injury involves Bnip3 and autophagy. Cell Death Differ 14, 146-157, (2007).

32 Kubli, D. A., Quinsay, M. N., Huang, C., Lee, Y. & Gustafsson, A. B. Bnip3 functions as a mitochondrial sensor of oxidative stress during myocardial ischemia and reperfusion. Am J Physiol Heart Circ Physiol 295, H2025-2031, (2008).

33 Diwan, A. et al. Inhibition of ischemic cardiomyocyte apoptosis through targeted ablation of Bnip3 restrains postinfarction remodeling in mice. J Clin Invest 117, 2825-2833, (2007).

34 Hochhauser, E. et al. Bax ablation protects against myocardial ischemia-reperfusion injury in transgenic mice. Am J Physiol Heart Circ Physiol 284, H2351-2359, (2003).

35 Hendgen-Cotta, U. B. et al. Cytosolic BNIP3 Dimer Interacts with Mitochondrial BAX Forming Heterodimers in the Mitochondrial Outer Membrane under Basal Conditions. Int J Mol Sci 18, (2017).

36 Ray, R. et al. BNIP3 heterodimerizes with Bcl-2/Bcl-X (L) and induces cell death independent of a Bcl-2 homology 3 (BH3) domain at both mitochondrial and nonmitochondrial sites. J Biol Chem 275, 1439-1448, (2000).

37 Kubli, D. A., Ycaza, J. E. & Gustafsson, A. B. Bnip3 mediates mitochondrial dysfunction and cell death through Bax and Bak. Biochem J 405, 407-415, (2007).

38 Zhang, J. & Ney, P. A. Role of BNIP3 and NIX in cell death, autophagy, and mitophagy. Cell Death & Differentiation 16, 939-946, (2009).

39 Chaanine, A. H. et al. Potential role of BNIP3 in cardiac remodeling, myocardial stiffness, and endoplasmic reticulum: mitochondrial calcium homeostasis in diastolic and systolic heart failure. Circ Heart Fail 6, 572-583, (2013).

40 Chaanine, A. H. et al. FOXO3a regulates BNIP3 and modulates mitochondrial calcium, dynamics, and function in cardiac stress. Am J Physiol Heart Circ Physiol 311, H1540-H1559, (2016).

41 Hendgen-Cotta, U. B. et al. Nitrite reductase activity of myoglobin regulates respiration and cellular viability in myocardial ischemia-reperfusion injury. Proc Natl Acad Sci USA 105, 10256-10261, (2008).

42 Luedike, P. et al. Cardioprotection through S-nitros(yl) ation of macrophage migration inhibitory factor. Circulation 125, 1880-1889, (2012).

43 Rassaf, T. et al. Nitrite reductase function of deoxymyoglobin: oxygen sensor and regulator of cardiac energetics and function. Circ Res 100, 1749-1754, (2007).
44 Totzeck, M. et al. Nitrite regulates hypoxic vasodilation via myoglobin-dependent nitric oxide generation. Circulation 126, 325-334, (2012).
45 Wolter, K. G. et al. Movement of Bax from the cytosol to mitochondria during apoptosis. J Cell Biol 139, 1281-1292, (1997).
46 Hou, Q. & Hsu, Y. T. Bax translocates from cytosol to mitochondria in cardiac cells during apoptosis: development of a GFP-Bax-stable H9c2 cell line for apoptosis analysis. Am J Physiol Heart Circ Physiol 289, H477-487, (2005).
47 Sali, A. & Blundell, T. L. Comparative protein modelling by satisfaction of spatial restraints. J Mol Biol 234, 779-815, (1993).
48 van den Berg, A. & Dowdy, S. F. Protein transduction domain delivery of therapeutic macromolecules. Curr Opin Biotechnol 22, 888-893, (2011).
49 Shoji-Kawata, S. et al. Identification of a candidate therapeutic autophagy-inducing peptide. Nature 494, 201-206, (2013).
50 Hausenloy, D. J. & Yellon, D. M. Myocardial ischemia-reperfusion injury: a neglected therapeutic target. J Clin Invest 123, 92-100, (2013).
51 Gottlieb, R. A. Cell death pathways in acute ischemia/reperfusion injury. J Cardiovasc Pharmacol Ther 16, 233-238, (2011).
52 Trott, O. & Olson, A. J. AutoDock Vina: improving the speed and accuracy of docking with a new scoring function, efficient optimization, and multithreading. J Comput Chem 31, 455-461, (2010).
53 Dominguez, C., Boelens, R. & Bonvin, A. M. HADDOCK: a protein-protein docking approach based on biochemical or biophysical information. J Am Chem Soc 125, 1731-1737, (2003).
54 Phillips, J. C. et al. Scalable molecular dynamics with NAMD. J Comput Chem 26, 1781-1802, (2005).

We claim:

1. A peptide comprising (i) a cellular uptake signal; and (ii) a BCL-2 adenovirus E1B 19 kDa interacting protein-3 (BNIP3) fragment that differs by no more than 2 residues from the BNIP3 fragment of SEQ ID NO:8, and wherein the residue at position 7 of the BNIP3 fragment is phenylalanine, and wherein the peptide has a length of no more than 50 amino acids.

2. The peptide according to claim 1, wherein the BNIP3 fragment differs by no more than 1 residue from SEQ ID NO: 8.

3. The peptide according to claim 2, wherein the BNIP3 fragment differs from SEQ ID NO: 8 at position 3 or at position 5.

4. The peptide according to claim 1, wherein the BNIP3 fragment of SEQ ID NO: 8 comprises
   (i) a residue selected from phenylalanine, isoleucine, leucine, valine, tyrosine, cysteine, histidine, arginine and threonine at position 3, and
   (ii) a valine at position 5.

5. The peptide according claim 1, wherein the BNIP3 fragment comprises SEQ ID NO: 8.

6. The peptide according to claim 1, wherein the cellular uptake signal comprises the sequence selected from the group consisting of SEQ ID NO: 31 to SEQ ID NO: 50.

7. The peptide according to claim 1, wherein the cellular uptake signal comprises a human immunodeficiency virus (HIV) trans-activator of transcription (TAT) cellular uptake signal.

8. The peptide according to claim 5, wherein the cellular uptake signal comprises SEQ ID NO: 31.

9. The peptide according to claim 5, wherein the cellular uptake signal comprises SEQ ID NO: 32.

10. A pharmaceutical composition comprising the peptide according to claim 1.

11. The pharmaceutical composition of claim 10, wherein the BNIP3 fragment comprises SEQ ID NO: 8.

12. The pharmaceutical composition of claim 10, wherein the cellular uptake signal comprises one of the sequences selected from the group consisting of SEQ ID NO: 31 to SEQ ID NO: 50.

13. The pharmaceutical composition of claim 10, wherein the cellular uptake signal comprises an HIV TAT cellular uptake signal.

14. The pharmaceutical composition of claim 10, wherein the cellular uptake signal comprises SEQ ID NO: 31.

15. The pharmaceutical composition of claim 10, wherein the cellular uptake signal comprises SEQ ID NO: 32.

16. A peptide of no more than 50 amino acids, the peptide comprising a cellular uptake signal comprising the amino acid sequence selected from the group consisting of SEQ ID NO: 31 to SEQ ID NO: 50, and a BNIP3 fragment comprising the amino acid sequence of SEQ ID NO:8.

17. The peptide of claim 16, wherein the cellular uptake signal comprises the amino acid sequence of SEQ ID NO: 31.

18. The peptide of claim 16, wherein the cellular uptake signal comprises the amino acid sequence of SEQ ID NO: 32.

* * * * *

SEQUENCE LISTING

```
<160> NUMBER OF SEQ ID NOS: 92

<210> SEQ ID NO 1
<211> LENGTH: 187
<212> TYPE: PRT
<213> ORGANISM: Mus musculus

<400> SEQUENCE: 1

Met Ser Gln Ser Gly Glu Glu Asn Leu Gln Gly Ser Trp Val Glu Leu
1               5                   10                  15

His Phe Ser Asn Gly Asn Gly Ser Ser Val Pro Ala Ser Val Ser Ile
            20                  25                  30

Tyr Asn Gly Asp Met Glu Lys Ile Leu Leu Asp Ala Gln His Glu Ser
        35                  40                  45

Gly Arg Ser Ser Ser Lys Ser Ser His Cys Asp Ser Pro Pro Arg Ser
    50                  55                  60

Gln Thr Pro Gln Asp Thr Asn Arg Ala Glu Ile Asp Ser His Ser Phe
65                  70                  75                  80

Gly Glu Lys Asn Ser Thr Leu Ser Glu Glu Asp Tyr Ile Glu Arg Arg
                85                  90                  95

Arg Glu Val Glu Ser Ile Leu Lys Lys Asn Ser Asp Trp Ile Trp Asp
            100                 105                 110

Trp Ser Ser Arg Pro Glu Asn Ile Pro Pro Lys Glu Phe Leu Phe Lys
        115                 120                 125

His Pro Lys Arg Thr Ala Thr Leu Ser Met Arg Asn Thr Ser Val Met
    130                 135                 140

Lys Lys Gly Gly Ile Phe Ser Ala Asp Phe Leu Lys Val Phe Leu Pro
145                 150                 155                 160

Ser Leu Leu Leu Ser His Leu Leu Ala Ile Gly Leu Gly Ile Tyr Ile
                165                 170                 175

Gly Arg Arg Leu Thr Thr Ser Thr Ser Thr Phe
            180                 185

<210> SEQ ID NO 2
<211> LENGTH: 259
<212> TYPE: PRT
<213> ORGANISM: Homo sapiens

<400> SEQUENCE: 2
```

```
Met Gly Asp Ala Ala Asp Pro Pro Gly Pro Ala Leu Pro Cys Glu
1               5                   10                  15

Phe Leu Arg Pro Gly Cys Gly Ala Pro Leu Ser Pro Gly Ala Gln Leu
            20                  25                  30

Gly Arg Gly Ala Pro Thr Ser Ala Phe Pro Pro Ala Ala Glu Ala
            35                  40                  45

His Pro Ala Ala Arg Arg Gly Leu Arg Ser Pro Gln Leu Pro Ser Gly
50                  55                  60

Ala Met Ser Gln Asn Gly Ala Pro Gly Met Gln Glu Ser Leu Gln
65                  70                  75                  80

Gly Ser Trp Val Glu Leu His Phe Ser Asn Asn Gly Asn Gly Gly Ser
                85                  90                  95

Val Pro Ala Ser Val Ser Ile Tyr Asn Gly Asp Met Glu Lys Ile Leu
            100                 105                 110

Leu Asp Ala Gln His Glu Ser Gly Arg Ser Ser Ser Lys Ser Ser His
            115                 120                 125

Cys Asp Ser Pro Pro Arg Ser Gln Thr Pro Gln Asp Thr Asn Arg Ala
130                 135                 140

Ser Glu Thr Asp Thr His Ser Ile Gly Glu Lys Asn Ser Ser Gln Ser
145                 150                 155                 160

Glu Glu Asp Asp Ile Glu Arg Arg Lys Glu Val Glu Ser Ile Leu Lys
                165                 170                 175

Lys Asn Ser Asp Trp Ile Trp Asp Trp Ser Ser Arg Pro Glu Asn Ile
            180                 185                 190

Pro Pro Lys Glu Phe Leu Phe Lys His Pro Lys Arg Thr Ala Thr Leu
            195                 200                 205

Ser Met Arg Asn Thr Ser Val Met Lys Lys Gly Gly Ile Phe Ser Ala
210                 215                 220

Glu Phe Leu Lys Val Phe Leu Pro Ser Leu Leu Leu Ser His Leu Leu
225                 230                 235                 240

Ala Ile Gly Leu Gly Ile Tyr Ile Gly Arg Arg Leu Thr Thr Ser Thr
            245                 250                 255

Ser Thr Phe

<210> SEQ ID NO 3
<211> LENGTH: 8
<212> TYPE: PRT
<213> ORGANISM: Artificial Sequence
<220> FEATURE:
<223> OTHER INFORMATION: 8 as BNIP3 peptide
<220> FEATURE:
<221> NAME/KEY: MISC_FEATURE
<222> LOCATION: (3)..(3)
<223> OTHER INFORMATION: Xaa is any amino acid
<220> FEATURE:
<221> NAME/KEY: MISC_FEATURE
<222> LOCATION: (5)..(5)
<223> OTHER INFORMATION: Xaa is any amino acid
<220> FEATURE:
<221> NAME/KEY: MISC_FEATURE
<222> LOCATION: (7)..(7)
<223> OTHER INFORMATION: Xaa is any amino acid

<400> SEQUENCE: 3

Trp Val Xaa Leu Xaa Phe Xaa Asn
1               5

<210> SEQ ID NO 4
<211> LENGTH: 8
```

```
<212> TYPE: PRT
<213> ORGANISM: Artificial Sequence
<220> FEATURE:
<223> OTHER INFORMATION: 8 as BNIP3 peptide
<220> FEATURE:
<221> NAME/KEY: MISC_FEATURE
<222> LOCATION: (3)..(3)
<223> OTHER INFORMATION: Xaa is Glu, Phe, Ile, Leu, Val, Tyr, Cys, His,
      Arg or Thr
<220> FEATURE:
<221> NAME/KEY: MISC_FEATURE
<222> LOCATION: (5)..(5)
<223> OTHER INFORMATION: Xaa is His or Val
<220> FEATURE:
<221> NAME/KEY: MISC_FEATURE
<222> LOCATION: (7)..(7)
<223> OTHER INFORMATION: Xaa is Ser, Tyr, Cys, Phe or His

<400> SEQUENCE: 4

Trp Val Xaa Leu Xaa Phe Xaa Asn
1               5

<210> SEQ ID NO 5
<211> LENGTH: 8
<212> TYPE: PRT
<213> ORGANISM: Artificial Sequence
<220> FEATURE:
<223> OTHER INFORMATION: 8 as BNIP3 peptide
<220> FEATURE:
<221> NAME/KEY: MISC_FEATURE
<222> LOCATION: (3)..(3)
<223> OTHER INFORMATION: Xaa is Glu, His, Ile, Leu, Val or Tyr
<220> FEATURE:
<221> NAME/KEY: MISC_FEATURE
<222> LOCATION: (7)..(7)
<223> OTHER INFORMATION: Xaa is Ser, Tyr, Cys or Phe

<400> SEQUENCE: 5

Trp Val Xaa Leu His Phe Xaa Asn
1               5

<210> SEQ ID NO 6
<211> LENGTH: 8
<212> TYPE: PRT
<213> ORGANISM: Artificial Sequence
<220> FEATURE:
<223> OTHER INFORMATION: 8 as BNIP3 peptide
<220> FEATURE:
<221> NAME/KEY: MISC_FEATURE
<222> LOCATION: (7)..(7)
<223> OTHER INFORMATION: Xaa is Ser, Tyr, Cys or Phe

<400> SEQUENCE: 6

Trp Val Glu Leu His Phe Xaa Asn
1               5

<210> SEQ ID NO 7
<211> LENGTH: 8
<212> TYPE: PRT
<213> ORGANISM: Artificial Sequence
<220> FEATURE:
<223> OTHER INFORMATION: 8 as BNIP3 peptide

<400> SEQUENCE: 7

Trp Val Glu Leu His Phe Ser Asn
1               5

<210> SEQ ID NO 8
<211> LENGTH: 8
<212> TYPE: PRT
<213> ORGANISM: Artificial Sequence
```

```
<220> FEATURE:
<223> OTHER INFORMATION: 8 as BNIP3 peptide

<400> SEQUENCE: 8

Trp Val Glu Leu His Phe Phe Asn
1               5

<210> SEQ ID NO 9
<211> LENGTH: 8
<212> TYPE: PRT
<213> ORGANISM: Artificial Sequence
<220> FEATURE:
<223> OTHER INFORMATION: 8 as BNIP3 peptide

<400> SEQUENCE: 9

Trp Val Glu Leu His Phe Cys Asn
1               5

<210> SEQ ID NO 10
<211> LENGTH: 8
<212> TYPE: PRT
<213> ORGANISM: Artificial Sequence
<220> FEATURE:
<223> OTHER INFORMATION: 8 as BNIP3 peptide

<400> SEQUENCE: 10

Trp Val Glu Leu His Phe Tyr Asn
1               5

<210> SEQ ID NO 11
<211> LENGTH: 8
<212> TYPE: PRT
<213> ORGANISM: Artificial Sequence
<220> FEATURE:
<223> OTHER INFORMATION: 8 as BNIP3 peptide

<400> SEQUENCE: 11

Trp Val His Leu His Phe Ser Asn
1               5

<210> SEQ ID NO 12
<211> LENGTH: 8
<212> TYPE: PRT
<213> ORGANISM: Artificial Sequence
<220> FEATURE:
<223> OTHER INFORMATION: 8 as BNIP3 peptide

<400> SEQUENCE: 12

Trp Val Ile Leu His Phe Ser Asn
1               5

<210> SEQ ID NO 13
<211> LENGTH: 8
<212> TYPE: PRT
<213> ORGANISM: Artificial Sequence
<220> FEATURE:
<223> OTHER INFORMATION: 8 as BNIP3 peptide

<400> SEQUENCE: 13

Trp Val Leu Leu His Phe Ser Asn
1               5

<210> SEQ ID NO 14
<211> LENGTH: 8
<212> TYPE: PRT
<213> ORGANISM: Artificial Sequence
<220> FEATURE:
```

```
<223> OTHER INFORMATION: 8 as BNIP3 peptide

<400> SEQUENCE: 14

Trp Val Val Leu His Phe Ser Asn
1               5

<210> SEQ ID NO 15
<211> LENGTH: 8
<212> TYPE: PRT
<213> ORGANISM: Artificial Sequence
<220> FEATURE:
<223> OTHER INFORMATION: 8 as BNIP3 peptide

<400> SEQUENCE: 15

Trp Val Tyr Leu His Phe Ser Asn
1               5

<210> SEQ ID NO 16
<211> LENGTH: 8
<212> TYPE: PRT
<213> ORGANISM: Artificial Sequence
<220> FEATURE:
<223> OTHER INFORMATION: 8 as BNIP3 peptide

<400> SEQUENCE: 16

Trp Val Tyr Leu His Phe Phe Asn
1               5

<210> SEQ ID NO 17
<211> LENGTH: 8
<212> TYPE: PRT
<213> ORGANISM: Artificial Sequence
<220> FEATURE:
<223> OTHER INFORMATION: 8 as BNIP3 peptide

<400> SEQUENCE: 17

Trp Val Tyr Leu His Phe Tyr Asn
1               5

<210> SEQ ID NO 18
<211> LENGTH: 20
<212> TYPE: PRT
<213> ORGANISM: Artificial Sequence
<220> FEATURE:
<223> OTHER INFORMATION: 20 as BNIP3 peptide
<220> FEATURE:
<221> NAME/KEY: MISC_FEATURE
<222> LOCATION: (4)..(4)
<223> OTHER INFORMATION: Xaa is any amino acid
<220> FEATURE:
<221> NAME/KEY: MISC_FEATURE
<222> LOCATION: (11)..(11)
<223> OTHER INFORMATION: Xaa is any amino acid
<220> FEATURE:
<221> NAME/KEY: MISC_FEATURE
<222> LOCATION: (12)..(12)
<223> OTHER INFORMATION: Xaa is any amino acid
<220> FEATURE:
<221> NAME/KEY: MISC_FEATURE
<222> LOCATION: (15)..(15)
<223> OTHER INFORMATION: Xaa is any amino acid
<220> FEATURE:
<221> NAME/KEY: MISC_FEATURE
<222> LOCATION: (17)..(17)
<223> OTHER INFORMATION: Xaa is any amino acid
<220> FEATURE:
<221> NAME/KEY: MISC_FEATURE
<222> LOCATION: (19)..(19)
<223> OTHER INFORMATION: Xaa is any amino acid

<400> SEQUENCE: 18
```

```
Met Ser Gln Xaa Gly Glu Glu Asn Leu Gln Xaa Xaa Trp Val Xaa Leu
1               5                   10                  15

Xaa Phe Xaa Asn
            20

<210> SEQ ID NO 19
<211> LENGTH: 20
<212> TYPE: PRT
<213> ORGANISM: Artificial Sequence
<220> FEATURE:
<223> OTHER INFORMATION: 20 as BNIP3 peptide
<220> FEATURE:
<221> NAME/KEY: MISC_FEATURE
<222> LOCATION: (15)..(15)
<223> OTHER INFORMATION: Xaa is Glu, His, Ile, Leu, Val or Tyr
<220> FEATURE:
<221> NAME/KEY: MISC_FEATURE
<222> LOCATION: (19)..(19)
<223> OTHER INFORMATION: Xaa is Ser, Tyr, Cys or Phe

<400> SEQUENCE: 19

Met Ser Gln Ser Gly Glu Glu Asn Leu Gln Gly Ser Trp Val Xaa Leu
1               5                   10                  15

His Phe Xaa Asn
            20

<210> SEQ ID NO 20
<211> LENGTH: 20
<212> TYPE: PRT
<213> ORGANISM: Artificial Sequence
<220> FEATURE:
<223> OTHER INFORMATION: 20 as BNIP3 peptide
<220> FEATURE:
<221> NAME/KEY: MISC_FEATURE
<222> LOCATION: (19)..(19)
<223> OTHER INFORMATION: Xaa is Ser, Tyr, Cys or Phe

<400> SEQUENCE: 20

Met Ser Gln Ser Gly Glu Glu Asn Leu Gln Gly Ser Trp Val Glu Leu
1               5                   10                  15

His Phe Xaa Asn
            20

<210> SEQ ID NO 21
<211> LENGTH: 20
<212> TYPE: PRT
<213> ORGANISM: Artificial Sequence
<220> FEATURE:
<223> OTHER INFORMATION: 20 as BNIP3 peptide

<400> SEQUENCE: 21

Met Ser Gln Ser Gly Glu Glu Asn Leu Gln Gly Ser Trp Val Glu Leu
1               5                   10                  15

His Phe Ser Asn
            20

<210> SEQ ID NO 22
<211> LENGTH: 20
<212> TYPE: PRT
<213> ORGANISM: Artificial Sequence
<220> FEATURE:
<223> OTHER INFORMATION: 20 as BNIP3 peptide

<400> SEQUENCE: 22

Met Ser Gln Ser Gly Glu Glu Asn Leu Gln Gly Ser Trp Val Glu Leu
1               5                   10                  15
```

His Phe Phe Asn
            20

```
<210> SEQ ID NO 23
<211> LENGTH: 17
<212> TYPE: PRT
<213> ORGANISM: Artificial Sequence
<220> FEATURE:
<223> OTHER INFORMATION: 17 as BNIP3 peptide
<220> FEATURE:
<221> NAME/KEY: MISC_FEATURE
<222> LOCATION: (1)..(1)
<223> OTHER INFORMATION: Xaa is any amino acid
<220> FEATURE:
<221> NAME/KEY: MISC_FEATURE
<222> LOCATION: (8)..(8)
<223> OTHER INFORMATION: Xaa is any amino acid
<220> FEATURE:
<221> NAME/KEY: MISC_FEATURE
<222> LOCATION: (9)..(9)
<223> OTHER INFORMATION: Xaa is any amino acid
<220> FEATURE:
<221> NAME/KEY: MISC_FEATURE
<222> LOCATION: (12)..(12)
<223> OTHER INFORMATION: Xaa is any amino acid
<220> FEATURE:
<221> NAME/KEY: MISC_FEATURE
<222> LOCATION: (14)..(14)
<223> OTHER INFORMATION: Xaa is any amino acid
<220> FEATURE:
<221> NAME/KEY: MISC_FEATURE
<222> LOCATION: (16)..(16)
<223> OTHER INFORMATION: Xaa is any amino acid

<400> SEQUENCE: 23

Xaa Gly Glu Glu Asn Leu Gln Xaa Xaa Trp Val Xaa Leu Xaa Phe Xaa
1               5                   10                  15

Asn

<210> SEQ ID NO 24
<211> LENGTH: 17
<212> TYPE: PRT
<213> ORGANISM: Artificial Sequence
<220> FEATURE:
<223> OTHER INFORMATION: 17 as BNIP3 peptide
<220> FEATURE:
<221> NAME/KEY: MISC_FEATURE
<222> LOCATION: (16)..(16)
<223> OTHER INFORMATION: Xaa is Ser, Tyr, Cys or Phe

<400> SEQUENCE: 24

Ser Gly Glu Glu Asn Leu Gln Gly Ser Trp Val Glu Leu His Phe Xaa
1               5                   10                  15

Asn

<210> SEQ ID NO 25
<211> LENGTH: 17
<212> TYPE: PRT
<213> ORGANISM: Artificial Sequence
<220> FEATURE:
<223> OTHER INFORMATION: 17 as BNIP3 peptide

<400> SEQUENCE: 25

Ser Gly Glu Glu Asn Leu Gln Gly Ser Trp Val Glu Leu His Phe Ser
1               5                   10                  15

Asn

<210> SEQ ID NO 26
```

```
<211> LENGTH: 17
<212> TYPE: PRT
<213> ORGANISM: Artificial Sequence
<220> FEATURE:
<223> OTHER INFORMATION: 17 as BNIP3 peptide

<400> SEQUENCE: 26

Ser Gly Glu Glu Asn Leu Gln Gly Ser Trp Val Glu Leu His Phe Phe
1               5                   10                  15

Asn

<210> SEQ ID NO 27
<211> LENGTH: 9
<212> TYPE: PRT
<213> ORGANISM: Artificial Sequence
<220> FEATURE:
<223> OTHER INFORMATION: 9 as BNIP3 peptide
<220> FEATURE:
<221> NAME/KEY: MISC_FEATURE
<222> LOCATION: (1)..(1)
<223> OTHER INFORMATION: Xaa is any amino acid
<220> FEATURE:
<221> NAME/KEY: MISC_FEATURE
<222> LOCATION: (4)..(4)
<223> OTHER INFORMATION: Xaa is any amino acid
<220> FEATURE:
<221> NAME/KEY: MISC_FEATURE
<222> LOCATION: (6)..(6)
<223> OTHER INFORMATION: Xaa is any amino acid
<220> FEATURE:
<221> NAME/KEY: MISC_FEATURE
<222> LOCATION: (8)..(8)
<223> OTHER INFORMATION: Xaa is any amino acid

<400> SEQUENCE: 27

Xaa Trp Val Xaa Leu Xaa Phe Xaa Asn
1               5

<210> SEQ ID NO 28
<211> LENGTH: 9
<212> TYPE: PRT
<213> ORGANISM: Artificial Sequence
<220> FEATURE:
<223> OTHER INFORMATION: 9 as BNIP3 peptide
<220> FEATURE:
<221> NAME/KEY: MISC_FEATURE
<222> LOCATION: (8)..(8)
<223> OTHER INFORMATION: Xaa is Ser, Tyr, Cys or Phe

<400> SEQUENCE: 28

Ser Trp Val Glu Leu His Phe Xaa Asn
1               5

<210> SEQ ID NO 29
<211> LENGTH: 9
<212> TYPE: PRT
<213> ORGANISM: Artificial Sequence
<220> FEATURE:
<223> OTHER INFORMATION: 9 as BNIP3 peptide

<400> SEQUENCE: 29

Ser Trp Val Glu Leu His Phe Ser Asn
1               5

<210> SEQ ID NO 30
<211> LENGTH: 9
<212> TYPE: PRT
<213> ORGANISM: Artificial Sequence
<220> FEATURE:
<223> OTHER INFORMATION: 9 as BNIP3 peptide
```

```
<400> SEQUENCE: 30

Ser Trp Val Glu Leu His Phe Phe Asn
1               5

<210> SEQ ID NO 31
<211> LENGTH: 12
<212> TYPE: PRT
<213> ORGANISM: Artificial Sequence
<220> FEATURE:
<223> OTHER INFORMATION: protein transduction domain of the TAT protein
      of HIV

<400> SEQUENCE: 31

Gly Arg Lys Lys Arg Arg Gln Arg Arg Arg Pro Gln
1               5                   10

<210> SEQ ID NO 32
<211> LENGTH: 11
<212> TYPE: PRT
<213> ORGANISM: Artificial Sequence
<220> FEATURE:
<223> OTHER INFORMATION: protein transduction domain of the TAT protein
      of HIV

<400> SEQUENCE: 32

Tyr Gly Arg Lys Lys Arg Arg Gln Arg Arg Arg
1               5                   10

<210> SEQ ID NO 33
<211> LENGTH: 15
<212> TYPE: PRT
<213> ORGANISM: Artificial Sequence
<220> FEATURE:
<223> OTHER INFORMATION: Penetratin or Antenapedia protein transduction
      domain

<400> SEQUENCE: 33

Arg Gln Ile Lys Trp Phe Gln Asn Arg Arg Met Lys Trp Lys Lys
1               5                   10                  15

<210> SEQ ID NO 34
<211> LENGTH: 18
<212> TYPE: PRT
<213> ORGANISM: Artificial Sequence
<220> FEATURE:
<223> OTHER INFORMATION: SynB1 protein transduction domain

<400> SEQUENCE: 34

Arg Gly Gly Arg Leu Ser Tyr Ser Arg Arg Arg Phe Ser Thr Ser Thr
1               5                   10                  15

Gly Arg

<210> SEQ ID NO 35
<211> LENGTH: 10
<212> TYPE: PRT
<213> ORGANISM: Artificial Sequence
<220> FEATURE:
<223> OTHER INFORMATION: SynB3 protein transduction domain

<400> SEQUENCE: 35

Arg Arg Leu Ser Tyr Ser Arg Arg Arg Phe
1               5                   10

<210> SEQ ID NO 36
<211> LENGTH: 12
```

```
<212> TYPE: PRT
<213> ORGANISM: Artificial Sequence
<220> FEATURE:
<223> OTHER INFORMATION: PTD-4 protein transduction domain

<400> SEQUENCE: 36

Pro Ile Arg Arg Arg Lys Lys Leu Arg Arg Leu Lys
1               5                   10

<210> SEQ ID NO 37
<211> LENGTH: 12
<212> TYPE: PRT
<213> ORGANISM: Artificial Sequence
<220> FEATURE:
<223> OTHER INFORMATION: PTD-5 protein transduction domain

<400> SEQUENCE: 37

Arg Arg Gln Arg Arg Thr Ser Lys Leu Met Lys Arg
1               5                   10

<210> SEQ ID NO 38
<211> LENGTH: 15
<212> TYPE: PRT
<213> ORGANISM: Artificial Sequence
<220> FEATURE:
<223> OTHER INFORMATION: FHV Coat-(35-49) protein transduction domain

<400> SEQUENCE: 38

Arg Arg Arg Arg Asn Arg Thr Arg Arg Asn Arg Arg Arg Val Arg
1               5                   10                  15

<210> SEQ ID NO 39
<211> LENGTH: 19
<212> TYPE: PRT
<213> ORGANISM: Artificial Sequence
<220> FEATURE:
<223> OTHER INFORMATION: BMV Gag-(7-25) protein transduction domain

<400> SEQUENCE: 39

Lys Met Thr Arg Ala Gln Arg Arg Ala Ala Ala Arg Arg Asn Arg Trp
1               5                   10                  15

Thr Ala Arg

<210> SEQ ID NO 40
<211> LENGTH: 13
<212> TYPE: PRT
<213> ORGANISM: Artificial Sequence
<220> FEATURE:
<223> OTHER INFORMATION: HTLV-II Rex-(4-16) protein transduction domain

<400> SEQUENCE: 40

Thr Arg Arg Gln Arg Thr Arg Arg Ala Arg Arg Asn Arg
1               5                   10

<210> SEQ ID NO 41
<211> LENGTH: 13
<212> TYPE: PRT
<213> ORGANISM: Artificial Sequence
<220> FEATURE:
<223> OTHER INFORMATION: D-Tat protein transduction domain

<400> SEQUENCE: 41

Gly Arg Lys Lys Arg Arg Gln Arg Arg Arg Pro Pro Gln
1               5                   10

<210> SEQ ID NO 42
```

```
<211> LENGTH: 13
<212> TYPE: PRT
<213> ORGANISM: Artificial Sequence
<220> FEATURE:
<223> OTHER INFORMATION: R9-Tat protein transduction domain

<400> SEQUENCE: 42

Gly Arg Arg Arg Arg Arg Arg Arg Arg Pro Pro Gln
1               5                   10

<210> SEQ ID NO 43
<211> LENGTH: 27
<212> TYPE: PRT
<213> ORGANISM: Artificial Sequence
<220> FEATURE:
<223> OTHER INFORMATION: Transportan

<400> SEQUENCE: 43

Gly Trp Thr Leu Asn Ser Ala Gly Tyr Leu Leu Gly Lys Ile Asn Leu
1               5                   10                  15

Lys Ala Leu Ala Ala Leu Ala Lys Lys Ile Leu
            20                  25

<210> SEQ ID NO 44
<211> LENGTH: 17
<212> TYPE: PRT
<213> ORGANISM: Artificial Sequence
<220> FEATURE:
<223> OTHER INFORMATION: MAP protein transduction domain

<400> SEQUENCE: 44

Lys Leu Ala Leu Lys Leu Ala Leu Lys Leu Ala Leu Ala Leu Lys Leu
1               5                   10                  15

Ala

<210> SEQ ID NO 45
<211> LENGTH: 27
<212> TYPE: PRT
<213> ORGANISM: Artificial Sequence
<220> FEATURE:
<223> OTHER INFORMATION: SBP protein transduction domain

<400> SEQUENCE: 45

Met Gly Leu Gly Leu His Leu Leu Val Leu Ala Ala Ala Leu Gln Gly
1               5                   10                  15

Ala Trp Ser Gln Pro Lys Lys Lys Arg Lys Val
            20                  25

<210> SEQ ID NO 46
<211> LENGTH: 27
<212> TYPE: PRT
<213> ORGANISM: Artificial Sequence
<220> FEATURE:
<223> OTHER INFORMATION: FBP protein transduction domain

<400> SEQUENCE: 46

Gly Ala Leu Phe Leu Gly Trp Leu Gly Ala Ala Gly Ser Thr Met Gly
1               5                   10                  15

Ala Trp Ser Gln Pro Lys Lys Lys Arg Lys Val
            20                  25

<210> SEQ ID NO 47
<211> LENGTH: 27
<212> TYPE: PRT
<213> ORGANISM: Artificial Sequence
```

```
<220> FEATURE:
<223> OTHER INFORMATION: MPG protein transduction domain

<400> SEQUENCE: 47

Gly Ala Leu Phe Leu Gly Phe Leu Gly Ala Ala Gly Ser Thr Met Gly
1               5                   10                  15

Ala Trp Ser Gln Pro Lys Lys Arg Lys Val
            20                  25

<210> SEQ ID NO 48
<211> LENGTH: 27
<212> TYPE: PRT
<213> ORGANISM: Artificial Sequence
<220> FEATURE:
<223> OTHER INFORMATION: MPG deltaNLS protein transduction domain

<400> SEQUENCE: 48

Gly Ala Leu Phe Leu Gly Phe Leu Gly Ala Ala Gly Ser Thr Met Gly
1               5                   10                  15

Ala Trp Ser Gln Pro Lys Ser Lys Arg Lys Val
            20                  25

<210> SEQ ID NO 49
<211> LENGTH: 21
<212> TYPE: PRT
<213> ORGANISM: Artificial Sequence
<220> FEATURE:
<223> OTHER INFORMATION: Pep-1 protein transduction domain

<400> SEQUENCE: 49

Lys Glu Thr Trp Trp Glu Thr Trp Trp Thr Glu Trp Ser Gln Pro Lys
1               5                   10                  15

Lys Lys Arg Lys Val
            20

<210> SEQ ID NO 50
<211> LENGTH: 21
<212> TYPE: PRT
<213> ORGANISM: Artificial Sequence
<220> FEATURE:
<223> OTHER INFORMATION: Pep-2 protein transduction domain

<400> SEQUENCE: 50

Lys Glu Thr Trp Phe Glu Thr Trp Phe Thr Glu Trp Ser Gln Pro Lys
1               5                   10                  15

Lys Lys Arg Lys Val
            20

<210> SEQ ID NO 51
<211> LENGTH: 20
<212> TYPE: PRT
<213> ORGANISM: Artificial Sequence
<220> FEATURE:
<223> OTHER INFORMATION: peptide sequence

<400> SEQUENCE: 51

Gly Arg Lys Lys Arg Arg Gln Arg Arg Arg Pro Gln Trp Val Glu Leu
1               5                   10                  15

His Phe Ser Asn
            20

<210> SEQ ID NO 52
<211> LENGTH: 20
<212> TYPE: PRT
```

<213> ORGANISM: Artificial Sequence
<220> FEATURE:
<223> OTHER INFORMATION: peptide sequence

<400> SEQUENCE: 52

Gly Arg Lys Lys Arg Arg Gln Arg Arg Arg Pro Gln Trp Val Glu Leu
1               5                   10                  15

His Phe Phe Asn
            20

<210> SEQ ID NO 53
<211> LENGTH: 20
<212> TYPE: PRT
<213> ORGANISM: Artificial Sequence
<220> FEATURE:
<223> OTHER INFORMATION: peptide sequence

<400> SEQUENCE: 53

Gly Arg Lys Lys Arg Arg Gln Arg Arg Arg Pro Gln Trp Val Glu Leu
1               5                   10                  15

His Phe Cys Asn
            20

<210> SEQ ID NO 54
<211> LENGTH: 20
<212> TYPE: PRT
<213> ORGANISM: Artificial Sequence
<220> FEATURE:
<223> OTHER INFORMATION: peptide sequence

<400> SEQUENCE: 54

Gly Arg Lys Lys Arg Arg Gln Arg Arg Arg Pro Gln Trp Val Glu Leu
1               5                   10                  15

His Phe Tyr Asn
            20

<210> SEQ ID NO 55
<211> LENGTH: 20
<212> TYPE: PRT
<213> ORGANISM: Artificial Sequence
<220> FEATURE:
<223> OTHER INFORMATION: peptide sequence

<400> SEQUENCE: 55

Gly Arg Lys Lys Arg Arg Gln Arg Arg Arg Pro Gln Trp Val His Leu
1               5                   10                  15

His Phe Ser Asn
            20

<210> SEQ ID NO 56
<211> LENGTH: 20
<212> TYPE: PRT
<213> ORGANISM: Artificial Sequence
<220> FEATURE:
<223> OTHER INFORMATION: peptide sequence

<400> SEQUENCE: 56

Gly Arg Lys Lys Arg Arg Gln Arg Arg Arg Pro Gln Trp Val Ile Leu
1               5                   10                  15

His Phe Ser Asn
            20

<210> SEQ ID NO 57
<211> LENGTH: 20

<212> TYPE: PRT
<213> ORGANISM: Artificial Sequence
<220> FEATURE:
<223> OTHER INFORMATION: peptide sequence

<400> SEQUENCE: 57

Gly Arg Lys Lys Arg Arg Gln Arg Arg Arg Pro Gln Trp Val Leu Leu
1               5                   10                  15

His Phe Ser Asn
            20

<210> SEQ ID NO 58
<211> LENGTH: 20
<212> TYPE: PRT
<213> ORGANISM: Artificial Sequence
<220> FEATURE:
<223> OTHER INFORMATION: peptide sequence

<400> SEQUENCE: 58

Gly Arg Lys Lys Arg Arg Gln Arg Arg Arg Pro Gln Trp Val Val Leu
1               5                   10                  15

His Phe Ser Asn
            20

<210> SEQ ID NO 59
<211> LENGTH: 20
<212> TYPE: PRT
<213> ORGANISM: Artificial Sequence
<220> FEATURE:
<223> OTHER INFORMATION: peptide sequence

<400> SEQUENCE: 59

Gly Arg Lys Lys Arg Arg Gln Arg Arg Arg Pro Gln Trp Val Tyr Leu
1               5                   10                  15

His Phe Ser Asn
            20

<210> SEQ ID NO 60
<211> LENGTH: 20
<212> TYPE: PRT
<213> ORGANISM: Artificial Sequence
<220> FEATURE:
<223> OTHER INFORMATION: peptide sequence

<400> SEQUENCE: 60

Gly Arg Lys Lys Arg Arg Gln Arg Arg Arg Pro Gln Trp Val Tyr Leu
1               5                   10                  15

His Phe Phe Asn
            20

<210> SEQ ID NO 61
<211> LENGTH: 20
<212> TYPE: PRT
<213> ORGANISM: Artificial Sequence
<220> FEATURE:
<223> OTHER INFORMATION: peptide sequence

<400> SEQUENCE: 61

Gly Arg Lys Lys Arg Arg Gln Arg Arg Arg Pro Gln Trp Val Tyr Leu
1               5                   10                  15

His Phe Tyr Asn
            20

<210> SEQ ID NO 62

```
<210> SEQ ID NO 62
<211> LENGTH: 32
<212> TYPE: PRT
<213> ORGANISM: Artificial Sequence
<220> FEATURE:
<223> OTHER INFORMATION: peptide sequence

<400> SEQUENCE: 62

Gly Arg Lys Lys Arg Arg Gln Arg Arg Pro Gln Met Ser Gln Ser
1               5                   10                  15

Gly Glu Glu Asn Leu Gln Gly Ser Trp Val Glu Leu His Phe Ser Asn
            20                  25                  30

<210> SEQ ID NO 63
<211> LENGTH: 32
<212> TYPE: PRT
<213> ORGANISM: Artificial Sequence
<220> FEATURE:
<223> OTHER INFORMATION: peptide sequence

<400> SEQUENCE: 63

Gly Arg Lys Lys Arg Arg Gln Arg Arg Pro Gln Met Ser Gln Ser
1               5                   10                  15

Gly Glu Glu Asn Leu Gln Gly Ser Trp Val Glu Leu His Phe Phe Asn
            20                  25                  30

<210> SEQ ID NO 64
<211> LENGTH: 29
<212> TYPE: PRT
<213> ORGANISM: Artificial Sequence
<220> FEATURE:
<223> OTHER INFORMATION: peptide sequence

<400> SEQUENCE: 64

Gly Arg Lys Lys Arg Arg Gln Arg Arg Pro Gln Ser Gly Glu Glu
1               5                   10                  15

Asn Leu Gln Gly Ser Trp Val Glu Leu His Phe Ser Asn
            20                  25

<210> SEQ ID NO 65
<211> LENGTH: 29
<212> TYPE: PRT
<213> ORGANISM: Artificial Sequence
<220> FEATURE:
<223> OTHER INFORMATION: peptide sequence

<400> SEQUENCE: 65

Gly Arg Lys Lys Arg Arg Gln Arg Arg Pro Gln Ser Gly Glu Glu
1               5                   10                  15

Asn Leu Gln Gly Ser Trp Val Glu Leu His Phe Phe Asn
            20                  25

<210> SEQ ID NO 66
<211> LENGTH: 21
<212> TYPE: PRT
<213> ORGANISM: Artificial Sequence
<220> FEATURE:
<223> OTHER INFORMATION: peptide sequence

<400> SEQUENCE: 66

Gly Arg Lys Lys Arg Arg Gln Arg Arg Pro Gln Ser Trp Val Glu
1               5                   10                  15

Leu His Phe Ser Asn
            20
```

```
<210> SEQ ID NO 67
<211> LENGTH: 21
<212> TYPE: PRT
<213> ORGANISM: Artificial Sequence
<220> FEATURE:
<223> OTHER INFORMATION: peptide sequence

<400> SEQUENCE: 67

Gly Arg Lys Lys Arg Arg Gln Arg Arg Pro Gln Ser Trp Val Glu
1               5                   10                  15

Leu His Phe Phe Asn
            20

<210> SEQ ID NO 68
<211> LENGTH: 32
<212> TYPE: PRT
<213> ORGANISM: Artificial Sequence
<220> FEATURE:
<223> OTHER INFORMATION: D-retro-inverso sequence

<400> SEQUENCE: 68

Gln Pro Arg Arg Arg Gln Arg Arg Lys Lys Arg Gly Asn Ser Phe His
1               5                   10                  15

Leu Glu Val Trp Ser Gly Gln Leu Asn Glu Glu Gly Ser Gln Ser Met
            20                  25                  30

<210> SEQ ID NO 69
<211> LENGTH: 20
<212> TYPE: PRT
<213> ORGANISM: Artificial Sequence
<220> FEATURE:
<223> OTHER INFORMATION: D-retro-inverso sequence

<400> SEQUENCE: 69

Gln Pro Arg Arg Arg Gln Arg Arg Lys Lys Arg Gly Asn Ser Phe His
1               5                   10                  15

Leu Glu Val Trp
            20

<210> SEQ ID NO 70
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 70

Met Ser Gln Ser Gly Glu Glu Asn Leu Gln Gly Ser Trp Val Glu Leu
1               5                   10                  15

Cys Phe Ser Asn
            20

<210> SEQ ID NO 71
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 71

Met Ser Gln Ser Gly Glu Glu Asn Leu Gln Gly Cys Trp Val Glu Leu
1               5                   10                  15

His Phe Ser Asn
```

20

<210> SEQ ID NO 72
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 72

Met Ser Gln Ser Gly Glu Glu Asn Leu Gln Gly Ser Trp Val Cys Leu
1               5                   10                  15

His Phe Ser Asn
            20

<210> SEQ ID NO 73
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 73

Met Ser Gln Ser Gly Glu Glu Asn Leu Gln Gly Ser Trp Val Glu Leu
1               5                   10                  15

Tyr Phe Ser Asn
            20

<210> SEQ ID NO 74
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 74

Met Ser Gln Ser Gly Tyr Glu Asn Leu Gln Gly Ser Trp Val Glu Leu
1               5                   10                  15

His Phe Ser Asn
            20

<210> SEQ ID NO 75
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 75

Met Ser Gln Ser Gly Glu Glu Asn Leu Gln Tyr Ser Trp Val Glu Leu
1               5                   10                  15

His Phe Ser Asn
            20

<210> SEQ ID NO 76
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

```
<400> SEQUENCE: 76

Met Asp Gly Ser Gly Glu Gln Leu Gly Ser Gly Gly Pro Thr Ser Ser
1               5                   10                  15

Glu Gln Ile Met
            20

<210> SEQ ID NO 77
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 77

Ser Glu Gln Ile Met Lys Thr Gly Ala Phe Leu Leu Gln Gly Phe Ile
1               5                   10                  15

Gln Asp Arg Ala
            20

<210> SEQ ID NO 78
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 78

Ala Gly Arg Met Ala Gly Glu Thr Pro Glu Leu Thr Leu Glu Gln Pro
1               5                   10                  15

Pro Gln Asp Ala
            20

<210> SEQ ID NO 79
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 79

Asp Ala Ser Thr Lys Lys Leu Ser Glu Cys Leu Arg Arg Ile Gly Asp
1               5                   10                  15

Glu Leu Asp Ser
            20

<210> SEQ ID NO 80
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 80

Glu Leu Asp Ser Asn Met Glu Leu Gln Arg Met Ile Ala Asp Val Asp
1               5                   10                  15

Thr Asp Ser Pro
            20

<210> SEQ ID NO 81
<211> LENGTH: 20
```

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 81

Thr Asp Ser Pro Arg Glu Val Phe Phe Arg Val Ala Ala Asp Met Phe
1               5                   10                  15

Ala Asp Gly Asn
            20

<210> SEQ ID NO 82
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 82

Trp Gly Arg Val Val Ala Leu Phe Tyr Phe Ala Ser Lys Leu Val Leu
1               5                   10                  15

Lys Ala Leu Cys
            20

<210> SEQ ID NO 83
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 83

Val Pro Glu Leu Ile Arg Thr Ile Met Gly Trp Thr Leu Asp Phe Leu
1               5                   10                  15

Arg Glu Arg Leu
            20

<210> SEQ ID NO 84
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 84

Arg Leu Leu Val Trp Ile Gln Asp Gln Gly Gly Trp Glu Gly Leu Leu
1               5                   10                  15

Ser Tyr Phe Gly
            20

<210> SEQ ID NO 85
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 85

Thr Trp Gln Thr Val Thr Ile Phe Val Ala Gly Val Leu Thr Ala Ser
1               5                   10                  15
```

Leu Thr Ile Trp
            20

<210> SEQ ID NO 86
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 86

Met Phe Ala Asp Gly Asn Phe Asn Trp Gly Arg Val Val Ala Leu Phe
1               5                   10                  15

Tyr Phe Ala Ser
            20

<210> SEQ ID NO 87
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 87

Leu Val Trp Ile Gln Asp Gln Gly Gly Trp Glu Gly Leu Leu Ser Tyr
1               5                   10                  15

Phe Gly Thr Pro
            20

<210> SEQ ID NO 88
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 88

Ala Ser Thr Lys Lys Leu Ser Glu Cys Leu Arg Arg Ile Gly Asp Glu
1               5                   10                  15

Leu Asp Ser Asn
            20

<210> SEQ ID NO 89
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 89

Cys Leu Lys Arg Ile Gly Asp Glu Leu
1               5

<210> SEQ ID NO 90
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 90

```
Met Ser Gln Ser Gly Glu Glu Asn Leu Gln
1               5                   10
```

<210> SEQ ID NO 91
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 91

```
Leu Asp Ala Gln His Glu Ser Gly Arg Ser Ser Lys Ser Ser His
1               5                   10                  15

Cys Asp Ser Pro
            20
```

<210> SEQ ID NO 92
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 92

```
Trp Val Glu Leu Ala Ala Ser Asn
1               5
```